(12) United States Patent
Fujita

(10) Patent No.: US 7,885,518 B2
(45) Date of Patent: Feb. 8, 2011

(54) RECORDING CONTROL DEVICE AND METHOD, RECORDING MEDIUM, AND PROGRAM

(75) Inventor: Koji Fujita, Tokyo (JP)

(73) Assignee: Sony Corporation (JP)

(*) Notice: Subject to any disclaimer, the term of this patent is extended or adjusted under 35 U.S.C. 154(b) by 1129 days.

(21) Appl. No.: 11/300,442

(22) Filed: Dec. 15, 2005

(65) Prior Publication Data

US 2006/0159419 A1 Jul. 20, 2006

(30) Foreign Application Priority Data

Dec. 15, 2004 (JP) ............................ P2004-362324
Dec. 15, 2004 (JP) ............................ P2004-362325

(51) Int. Cl.
H04N 5/76 (2006.01)
B41J 2/47 (2006.01)
G06F 13/00 (2006.01)
G11B 19/02 (2006.01)
H04B 1/18 (2006.01)

(52) U.S. Cl. .................... 386/296; 386/293; 347/240; 360/69; 455/186.1; 725/58

(58) Field of Classification Search ................ 386/83, 386/46, E5.001, E5.043; 360/69; 455/186.1; 725/58; 347/240
See application file for complete search history.

(56) References Cited

U.S. PATENT DOCUMENTS

| | | | | |
|---|---|---|---|---|
| 5,555,138 A | * | 9/1996 | Kim ............................ | 360/69 |
| 6,118,926 A | * | 9/2000 | Kim et al. ................... | 386/83 |
| 6,208,800 B1 | * | 3/2001 | Katsuyama et al. .......... | 386/83 |
| 6,388,698 B1 | * | 5/2002 | Deguchi et al. ............. | 347/240 |
| 6,523,176 B1 | | 2/2003 | Yamane et al. | |
| 7,385,884 B2 | * | 6/2008 | Hamada et al. ........... | 369/30.27 |

(Continued)

FOREIGN PATENT DOCUMENTS

JP          10-3778          1/1998

(Continued)

OTHER PUBLICATIONS

A European Search Report dated Sep. 17, 2007, which was issued in corresponding European Patent Application No. 05027199.

Primary Examiner—Thai Tran
Assistant Examiner—Syed Y Hasan
(74) Attorney, Agent, or Firm—Finnegan Henderson Farabow Garrett & Dunner LLP

(57) ABSTRACT

A recording control device records a program to be reserved for recording on the basis of reservation information including recording start time information indicating a time, at which recording starts, and recording end time information indicating a time, at which recording ends. The recording control device includes a setting unit that, when it is judged that the program is not recorded after recording is reserved, sets the same time as the time, indicated by the recording start time information, at which recording starts, in the recording end time information of the reservation information for recording the program; and a recording control unit that, when the time, indicated by the recording start time information, at which recording starts, is the same as the time, indicated by the recording end time information, at which recording ends, controls recording of the program such that recording of the program is suppressed.

14 Claims, 61 Drawing Sheets

U.S. PATENT DOCUMENTS

| | | | |
|---|---|---|---|
| 7,474,831 B2 * | 1/2009 | Nishida | 386/46 |
| 2001/0004418 A1 | 6/2001 | Nagano et al. | |
| 2002/0081096 A1 * | 6/2002 | Watanabe et al. | 386/83 |
| 2002/0191954 A1 | 12/2002 | Beach et al. | |
| 2005/0084241 A1 * | 4/2005 | Ishibashi et al. | 386/83 |
| 2005/0152678 A1 | 7/2005 | Sugai et al. | |

FOREIGN PATENT DOCUMENTS

| | | |
|---|---|---|
| JP | 2002-112142 | 4/2002 |
| JP | A-2004-32128 | 1/2004 |
| JP | 2004-173004 | 6/2004 |
| JP | 2004-274685 | 9/2004 |

\* cited by examiner

FIG. 10

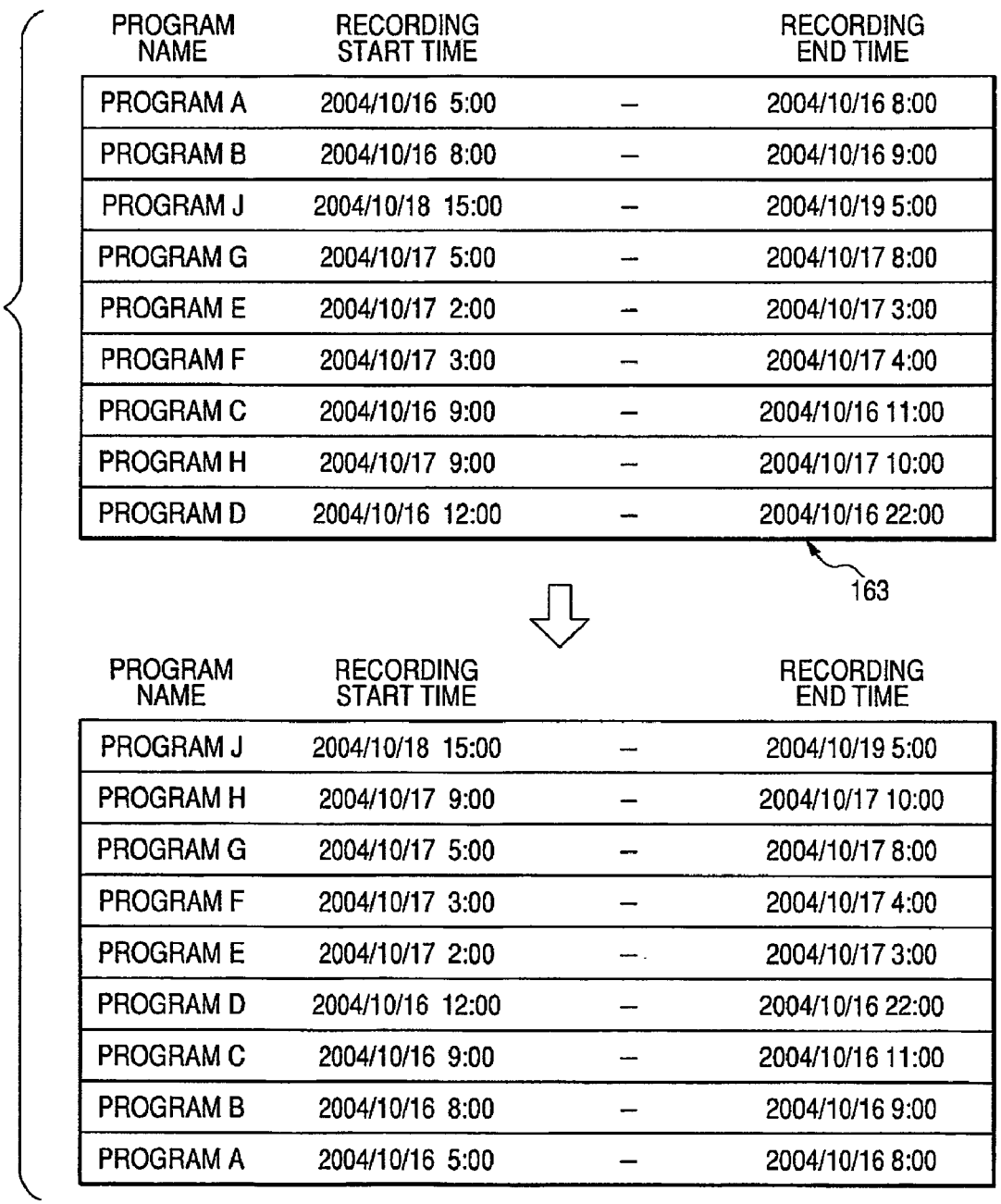

| PROGRAM NAME | RECORDING START TIME | | RECORDING END TIME |
|---|---|---|---|
| PROGRAM A | 2004/10/16 5:00 | — | 2004/10/16 8:00 |
| PROGRAM B | 2004/10/16 8:00 | — | 2004/10/16 9:00 |
| PROGRAM J | 2004/10/18 15:00 | — | 2004/10/19 5:00 |
| PROGRAM G | 2004/10/17 5:00 | — | 2004/10/17 8:00 |
| PROGRAM E | 2004/10/17 2:00 | — | 2004/10/17 3:00 |
| PROGRAM F | 2004/10/17 3:00 | — | 2004/10/17 4:00 |
| PROGRAM C | 2004/10/16 9:00 | — | 2004/10/16 11:00 |
| PROGRAM H | 2004/10/17 9:00 | — | 2004/10/17 10:00 |
| PROGRAM D | 2004/10/16 12:00 | — | 2004/10/16 22:00 |

163

⇩

| PROGRAM NAME | RECORDING START TIME | | RECORDING END TIME |
|---|---|---|---|
| PROGRAM J | 2004/10/18 15:00 | — | 2004/10/19 5:00 |
| PROGRAM H | 2004/10/17 9:00 | — | 2004/10/17 10:00 |
| PROGRAM G | 2004/10/17 5:00 | — | 2004/10/17 8:00 |
| PROGRAM F | 2004/10/17 3:00 | — | 2004/10/17 4:00 |
| PROGRAM E | 2004/10/17 2:00 | — | 2004/10/17 3:00 |
| PROGRAM D | 2004/10/16 12:00 | — | 2004/10/16 22:00 |
| PROGRAM C | 2004/10/16 9:00 | — | 2004/10/16 11:00 |
| PROGRAM B | 2004/10/16 8:00 | — | 2004/10/16 9:00 |
| PROGRAM A | 2004/10/16 5:00 | — | 2004/10/16 8:00 |

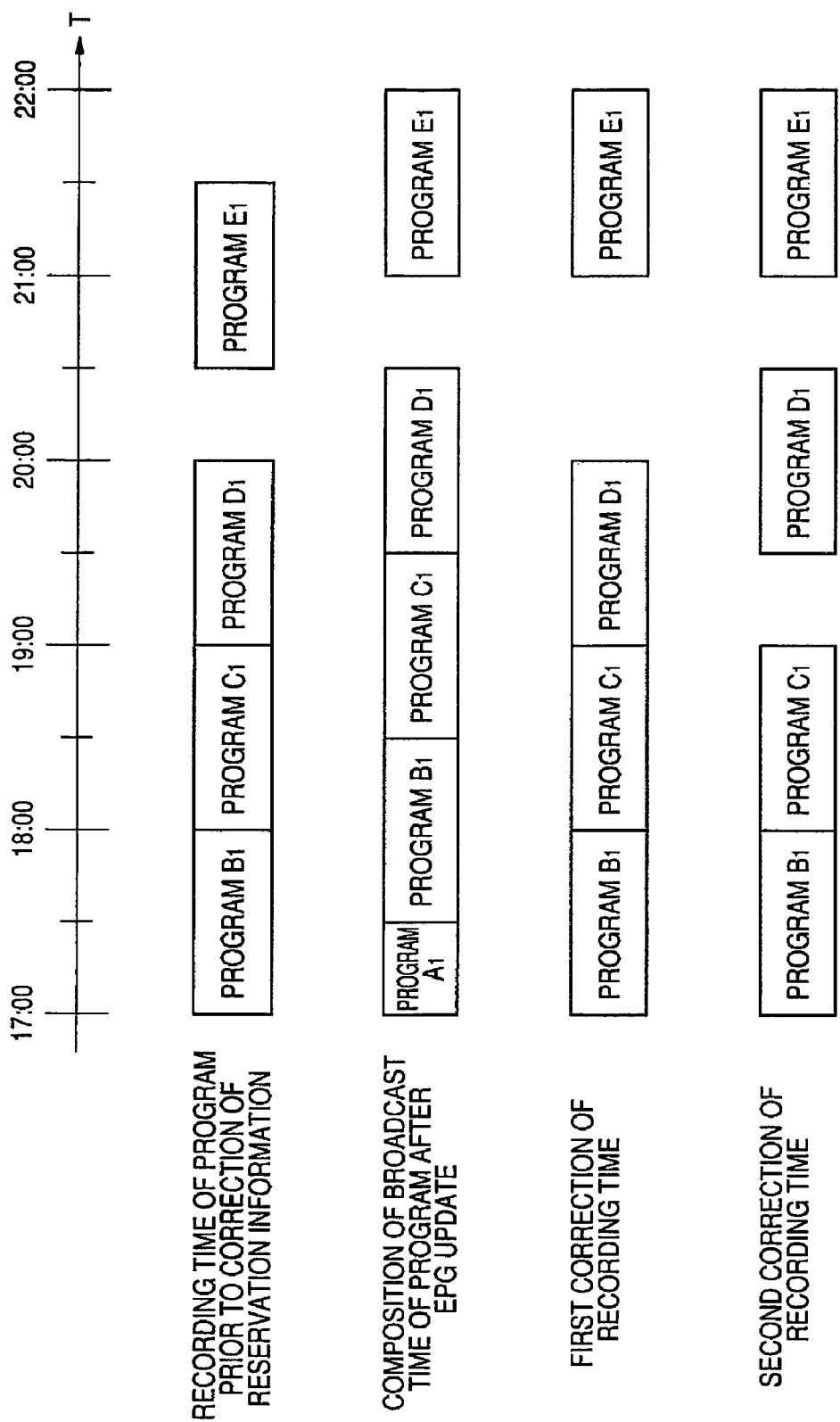

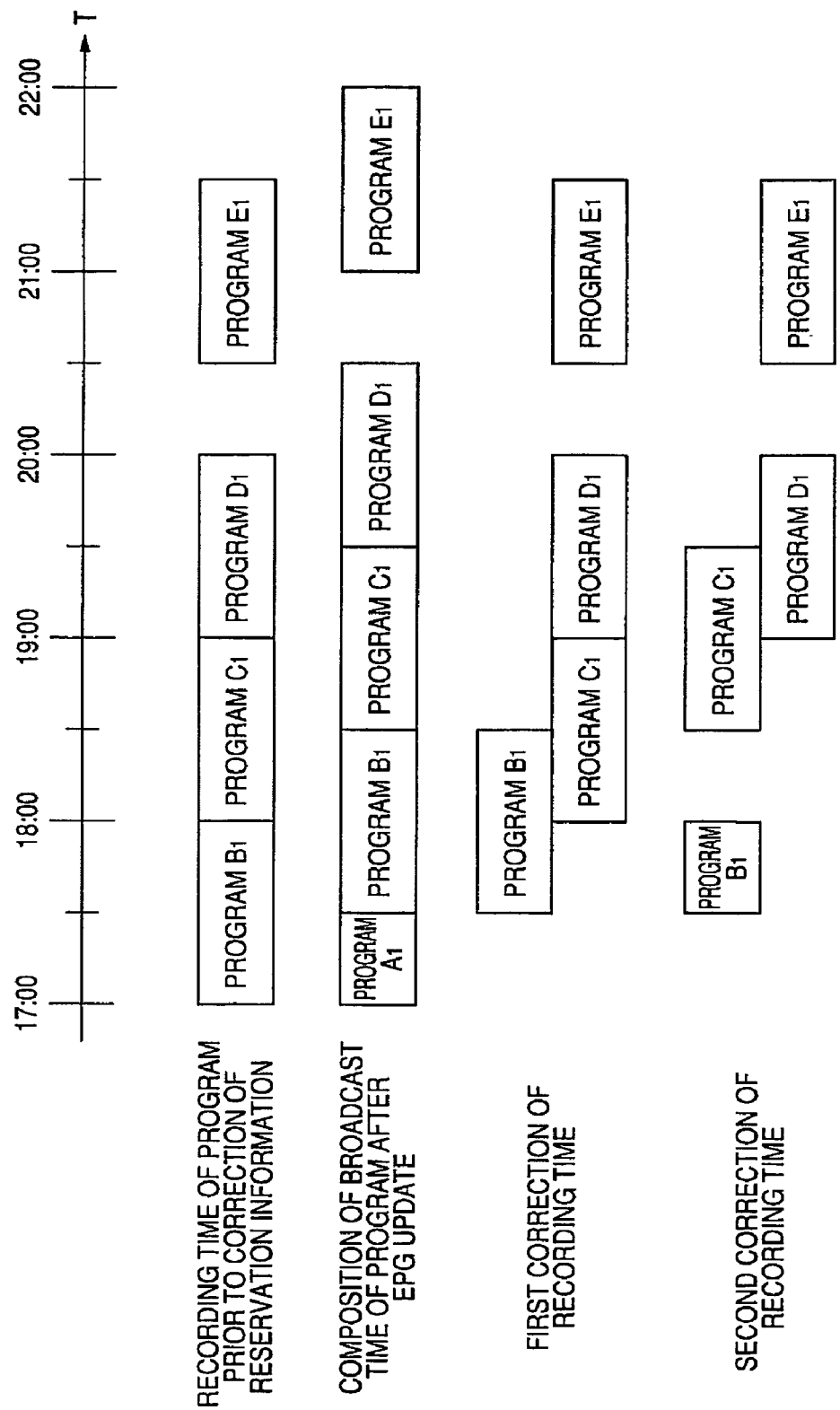

FIG. 56

|  | BEFORE RECORDING | IN RECORDING |
|---|---|---|
| EXTENSION OF BROADCAST TIME | CORRECTION OF RECORDING END TIME | CORRECTION OF RECORDING END TIME |
| ACCELERATION OF BROADCAST TIME | CORRECTION OF RECORDING START TIME AND RECORDING END TIME | CORRECTION OF RECORDING END TIME |
| RECORDING START TIME MATCHES WITH RECORDING END TIME | CORRECTION OF RECORDING START TIME AND RECORDING END TIME | |
| NOT CORRESPONDENCE | NO ACTION | NO ACTION |

FIG. 57

| | BEFORE RECORDING | IN RECORDING |
|---|---|---|
| REAR PART OF BROADCAST TIME OVERLAPS RECORDING TIME OF ANOTHER PROGRAM | CORRECTION OF RECORDING END TIME | CORRECTION OF RECORDING END TIME |
| FRONT PART OF BROADCAST TIME OVERLAPS RECORDING TIME OF ANOTHER PROGRAM | CORRECTION OF RECORDING START TIME | STOP RECORDING |
| FRONT PART AND REAR PART OF BROADCAST TIME OVERLAP RECORDING TIME OF ANOTHER PROGRAM | CORRECTION OF RECORDING START TIME AND RECORDING END TIME | STOP RECORDING |
| ALL BROADCAST TIME OVERLAP RECORDING TIME OF ANOTHER PROGRAM | CORRECT RECORDING START TIME AND RECORDING END TIME TO MATCH WITH EACH OTHER | STOP RECORDING |

FIG. 58

| | BEFORE RECORDING | IN RECORDING |
|---|---|---|
| REAR PART OF BROADCAST TIME OVERLAPS RECORDING TIME OF ANOTHER PROGRAM | CORRECT RECORDING START TIME AND RECORDING END TIME TO MATCH WITH EACH OTHER | CONTINUE RECORDING |
| FRONT PART OF BROADCAST TIME OVERLAPS RECORDING TIME OF ANOTHER PROGRAM | CORRECT RECORDING START TIME AND RECORDING END TIME TO MATCH WITH EACH OTHER | CONTINUE RECORDING |
| FRONT PART AND REAR PART OF BROADCAST TIME OVERLAP RECORDING TIME OF ANOTHER PROGRAM | CORRECT RECORDING START TIME AND RECORDING END TIME TO MATCH WITH EACH OTHER | CONTINUE RECORDING |
| ALL BROADCAST TIME OVERLAP RECORDING TIME OF ANOTHER PROGRAM | CORRECT RECORDING START TIME AND RECORDING END TIME TO MATCH WITH EACH OTHER | CONTINUE RECORDING |

FIG. 59

| | BEFORE RECORDING | IN RECORDING |
|---|---|---|
| REAR PART OF BROADCAST TIME OVERLAPS RECORDING TIME OF ANOTHER PROGRAM | DELETION OF RESERVATION INFORMATION | STOP RECORDING |
| FRONT PART OF BROADCAST TIME OVERLAPS RECORDING TIME OF ANOTHER PROGRAM | DELETION OF RESERVATION INFORMATION | STOP RECORDING |
| FRONT PART AND REAR PART OF BROADCAST TIME OVERLAP RECORDING TIME OF ANOTHER PROGRAM | DELETION OF RESERVATION INFORMATION | STOP RECORDING |
| ALL BROADCAST TIME OVERLAP RECORDING TIME OF ANOTHER PROGRAM | DELETION OF RESERVATION INFORMATION | STOP RECORDING |

RECORDING CONTROL DEVICE AND METHOD, RECORDING MEDIUM, AND PROGRAM

CROSS REFERENCES TO RELATED APPLICATIONS

The present invention contains subject matter related to Japanese Patent Application JP 2004-362324 and JP 2004-362325 filed in the Japanese Patent Office on Dec. 15, 2004, the entire contents of which being incorporated herein by reference.

BACKGROUND OF THE INVENTION

1. Field of the Invention

The present invention relates to a recording control device and a method, a recording medium, and a program, and more particularly, to a recording control device and a method in which a program reserved to be recorded can be more reliably recorded, to a recording medium, and to a program.

2. Description of the Related Art

In related art, for example, when a television broadcast (distribution) program from a broadcast station is recorded by a recording and reproducing apparatus, such as a hard disk drive (hereinafter, referred to as HDD) video recorder or the like, a user operates a remote controller which is appended to the recording and reproducing apparatus, such that, on the basis of broadcast start time, at which the broadcast of the program starts, and broadcast end time, at which the broadcast of the program ends, included in EPG (Electronic Program Guide) data, recording start time at which recording of the program starts and recording end time at which recording of the program ends are set, and recording of the program is reserved.

A composition of program broadcast time may be changed according to circumstances of the broadcast station. For example, as regards broadcast time of the television broadcast program, a program (hereinafter, referred to as special program) for an unexpected incident or an accident may be urgently composed, and then program broadcast time after the special program may be changed. Further, as for a program (hereinafter, referred to as sports relay program) which relays a sports game, such as soccer or baseball, from the nature, since end time of the game may extend, broadcast time of the sports relay program extends, and thus program broadcast time after the sports relay program may be changed.

If the composition of program broadcast time is changed, broadcast start time or broadcast end time of the program is changed, and the recording and reproducing apparatus may record a separate program from a program to be reserved for recording. Therefore, various technologies are proposed which are for recording a program de sired to be recorded by a user appropriately, even if the composition of program broadcast time is changed.

For example, in JP-A-2004-32128, a technology has been disclosed in which, when end time of a second contents prior to a first contents, which corresponds to the program through a television broadcast and the like to be reserved for recording, extends, end time of the first contents is assumed, and recording time of the first contents extends.

At present, pervasion of a terrestrial digital television broadcast (hereinafter, referred to as terrestrial digital broadcast) is in progress. As features of the terrestrial digital broadcast, for example, the number of channels and the number of programs are larger than those in a current terrestrial analog television broadcast (hereinafter, referred to as terrestrial analog broadcast).

Further, in the terrestrial digital broadcast, a video with high image quality and high sound quality is realized, an influence by ghost or noise is little, and a clear video is supplied, as compared with a program by the current terrestrial analog broadcast. For this reason, it is expected that the number of users who record the program is increased. On the other hand, when the number of programs is increased, it is expected that the possibility that program broadcast time for one day or one week may be changed increases. That is, it is expected that broadcast time of more programs is changed.

Like the program of the terrestrial digital broadcast, when broadcast time of plural programs are frequently changed, as for the correction of recording time to be reserved, there are technologies, such as the technology disclosed in JP-A-2004-32128, which has been currently suggested, in which recording time simply extends, or a method in which, when recording time of plural programs overlap one another, recording reservation of the program whose recording time overlaps is simply cancelled. However, they cannot be a best method.

In the related art, the cancellation of recording reservation of the program whose recording time overlaps means that, broadcast time of plural programs to be reserved for recording, that is, recording time of plural programs overlap one another, due to the change of the composition of program broadcast for example, when broadcast time (recording time) of two programs overlap each other, recording reservation of one program is cancelled.

At this time, with the change in broadcast time of the program again, for example, even when one or both of the two programs whose broadcast time (recording time) overlap each other are shifted, and recording of the two programs can be performed, the program whose recording reservation is cancelled once with the change in broadcast time is not recorded until the user reserves for recording of the program again.

As such, in the terrestrial digital broadcast, when program broadcast time (the composition of broadcast time) is changed according to the circumstances of the broadcast station, broadcast time of plural programs to be reserved for recording, that is, recording time of plural programs may overlap one another.

At this time, until the user notices that program broadcast time (the composition of broadcast time) is changed, and recording time of the program is corrected, a desired program is not suitably recorded.

For this reason, in order to reliably record the programs as much as possible, the user reserves recording of the program, and then confirms the composition of program broadcast time with reference to a composition table (list of program broadcast time), such as the EPG, such that a trouble arises.

Further, when, as for the program whose recording reservation is cancelled once, program broadcast time is changed again, in order to restore cancelled program recording reservation, a separate device (function) needs to be provided, in addition to a device (function) which corrects recording time of the program. That is, for example, there is a need for a device (function) which performs processing for holding (managing) a history of the cancellation of recording reservation of the program and, after the change in broadcast time again, for restoring cancelled program recording reservation on the basis of the stored history. Accordingly, in the recording and reproducing apparatus, such as the HDD video recorder, a more complex processing needs to be executed, and costs of the recording and reproducing apparatus is higher.

SUMMARY OF THE INVENTION

The present invention addresses the above-described problems, and it is desirable to reduce a user's load and to restore program recording reservation, which is cancelled once, by a simple processing.

Further, the present invention addresses the above-described problems, and it is desirable to reduce a user's load and to record a program to be reserved for recording more reliably and more suitably.

According to an aspect of the present invention, there is provided a recording control device which records a program to be reserved for recording on the basis of reservation information including recording start time information indicating a time, at which recording starts, and recording end time information indicating a time, at which recording ends. The recording control device includes setting unit that, when it is judged that the program is not recorded after recording is reserved, sets the same time as the time, indicated by the recording start time information, at which recording starts, in the recording end time information of the reservation information for recording the program, and a recording control unit that, when the time, indicated by the recording start time information, at which recording starts, is the same as the time, indicated by the recording end time information, at which recording ends, controls recording of the program such that recording of the program is suppressed. In this case, after setting the same time as the time, indicated by the recording start time information, at which recording starts, in the recording end time information of the reservation information, when it is judged that the program is recorded, the setting unit sets a time later than the time, indicated by the recording start time information, at which recording starts, in the recording end time information of the reservation information.

In the recording control device according to the aspect of the present invention, when the time, indicated by the recording start time information, at which recording starts, is the same as the time, indicated by the recording end time information, at which recording ends, the recording control unit may give, to a user, a notice that recording of the program is controlled such that recording of the program is suppressed.

Further, according to another aspect of the present invention, a recording control device includes a first recording control unit that controls recording of first recording start time at which recording of a first contents starts and first recording end time at which recording of the first contents ends, and second recording start time at which recording of a second contents starts and second recording end time at which recording of the second contents ends, a reception control unit that controls reception of first distribution time information indicating first distribution start time at which distribution of the first contents starts and first distribution end time at which the distribution of the first contents ends, a correcting unit that, when all or a part of distribution time from first distribution start time to first distribution end time overlaps recording time from second recording start time to second recording end time, corrects one or both of first recording start time and first recording end time of the first contents to predetermined time within distribution time, and a second recording control unit that controls recording of the first contents on the basis of corrected first recording start time and second recording end time.

In the recording control device according to another aspect of the present invention, the first recording control unit may control recording of first identification information for identifying the first contents, first contents information including information of first recording start time and information of first recording end time, second identification information for identifying the second contents, and second contents information including information of second recording start time and information of second recording end time in a predetermined list. Further, the reception control unit controls reception of the first distribution time information indicating first distribution start time and first distribution end time of the first contents, and second distribution time information indicating second distribution start time at which distribution of the second contents starts and second distribution end time at which the distribution of the second contents ends. In addition, when the second distribution time information is received, first recording start time of the first contents information recorded in the list is later than second recording start time of the second contents information, and all or a part of distribution time from first distribution start time to first distribution end time overlaps recording time from second recording start time to second recording end time, the correcting unit corrects one or both of first recording start time and first recording end time of the first contents to predetermined time within distribution time.

Further, in the recording control device according to another aspect of the present invention, when recording of the first content starts, the first distribution time information is received, first distribution end time in the first distribution time information is a time within recording time of the second contents, and a recording priority of the first contents is higher than that of the second contents, the second recording control unit may correct first recording end time to first distribution end time, which is the time within recording time of the second contents.

Further, in the recording control device according to another aspect of the present invention, when recording of the first contents does not start, the first distribution time information is received, first distribution start time in the first distribution time information is a time within recording time of the second contents, and a recording priority of the second contents is higher than that of the first contents, the correcting unit may correct first recording start time to second recording end time of the second contents.

Further, in the recording control device according to another aspect of the present invention, when recording of the first contents does not start, the first distribution time information is received, first distribution end time in the first distribution time information is a time within recording time of the second contents, and a recording priority of the second contents is higher than that of the first contents, the correcting unit may correct first recording end time to second recording start time of the second contents.

Further, according to still another aspect of the present invention, there is provided a recording control method of a recording control device which records a program to be reserved for recording on the basis of reservation information including recording start time information indicating a time, at which recording starts, and recording end time information indicating a time, at which recording ends. The recording control method includes the steps of, when it is judged that the program is not recorded after recording is reserved, setting the same time as the time, indicated by the recording start time information, at which recording starts, as the recording end time information of the reservation information for recording the program, and, when the time, indicated by the recording start time information, at which recording starts, is the same as the time, indicated by the recording end time information, at which recording ends, controlling recording of the program such that recording of the program is suppressed. In this case, in the setting, after setting the same time as the time, indicated by the recording start time information, at which recording starts, in the recording end time information of the reservation information, when it is judged that the program is recorded, setting a time later than the time, indicated by the recording start time information, at which recording starts, in the recording end time information of the reservation information.

Further, according to a further aspect of the present invention, a recording control method of a recording control device includes the steps of controlling recording of first recording start time at which recording of a first contents starts and first recording end time at which recording of the first contents ends, and second recording start time at which recording of a second contents starts and second recording end time at which recording of the second contents ends, controlling reception of first distribution time information indicating first distribution start time at which distribution of the first contents starts and first distribution end time at which the distribution of the first contents ends, when all or a part of distribution time from first distribution start time to first distribution end time overlaps recording time from second recording start time to second recording end time, correcting one or both of first recording start time and first recording end time of the first contents to predetermined time within distribution time, and controlling recording of the first contents on the basis of corrected first recording start-time and second recording end time.

In a recording control device, a recording control method, a program of a recording medium, and a program according to an embodiment of the present invention, when it is judged that the program is not recorded after recording is reserved, the same time as the time, indicated by the recording start time information, at which recording starts, is set as the recording end time information of the reservation information for recording the program. Further, when the time, indicated by the recording start time information, at which recording starts, is the same as the time, indicated by the recording end time information, at which recording ends, recording of the program is controlled such that recording of the program is suppressed. In addition, after the same time as the time, indicated by the recording start time information, at which recording starts, is set as the recording end time information of the reservation information, when it is judged that the program is recorded, the time later than the time, indicated by the recording start time information, at which recording starts, is set as the recording end time information of the reservation information.

In a recording control device, a recording control method, a program of a recording medium, and a program according to an embodiment of the present invention, recording of first recording start time at which recording of a first contents starts and first recording end time at which recording of the first contents ends, and second recording start time at which recording of a second contents starts and second recording end time at which recording of the second contents ends is controlled. Further, reception of distribution time information indicating first distribution start time at which distribution of the first contents starts and first distribution end time at which the distribution of the first contents ends is controlled. Further, when all or a part of distribution time from first distribution start time to first distribution end time overlaps recording time from second recording start time to second recording end time, one or both of first recording start time and first recording end time of the first contents is corrected to predetermined time within distribution time. In addition, recording of the first contents is corrected on the basis of corrected first recording start time and second recording end time.

According to an embodiment of the present invention, recording of a program to be broadcasted can be reserved. Further, according to an embodiment of the present invention, a user's load can be reduced, and program recording reservation, which is cancelled once, can be restored by a simple processing.

BRIEF DESCRIPTION OF THE DRAWINGS

FIG. 10 is a diagram illustrating rearrangement of reservation information of a reservation information list;

FIG. 11 is a diagram illustrating movement of reservation information when the reservation information is sequentially corrected from one having late recording start time;

FIG. 12 is a diagram illustrating movement of reservation information when the reservation information is sequentially corrected from one having early recording start time;

FIG. 56 is a diagram illustrating a recording time correction method when changed broadcast time in a program does not overlap recording time of another program;

FIG. 57 is a diagram illustrating a recording time correction method when changed broadcast time in a free program overlaps recording time of another program;

FIG. 58 is a diagram illustrating a recording time correction method when changed broadcast time in a charged program overlaps recording time of another program;

FIG. 59 is a diagram illustrating a recording time correction method when changed broadcast time in an automatic recording reservation program overlaps recording time of another program;

DESCRIPTION OF THE PREFERRED EMBODIMENTS

Hereinafter, embodiments of the present invention will be described below, but correspondence relationship between constituents described in the claims and specified examples in the embodiments are exemplified, as described below. This description is to confirm that the specified examples supporting the inventions described in the claims are described in the embodiments of the present invention. Therefore, even when there exists a specified example, which is described in the embodiments of the present invention but is not described herein to correspond to the constituent, this does not mean that the specified example does not correspond to the constituent. To the contrary, even when the specified example is described herein to correspond to the constituent, this does not mean that the specified example does not correspond to a constituent other than the constituent.

In addition, this description does not mean that all inventions corresponding to the specified examples described in the embodiments of the present invention are described in the claims. Specifically, this description does not deny presence of the inventions, which are the inventions corresponding to the specified examples described in the embodiments of the present invention but not in the claims of the present application, that is, presence of the invention, which is under a division application in future or is added through a correction.

Figure 28:
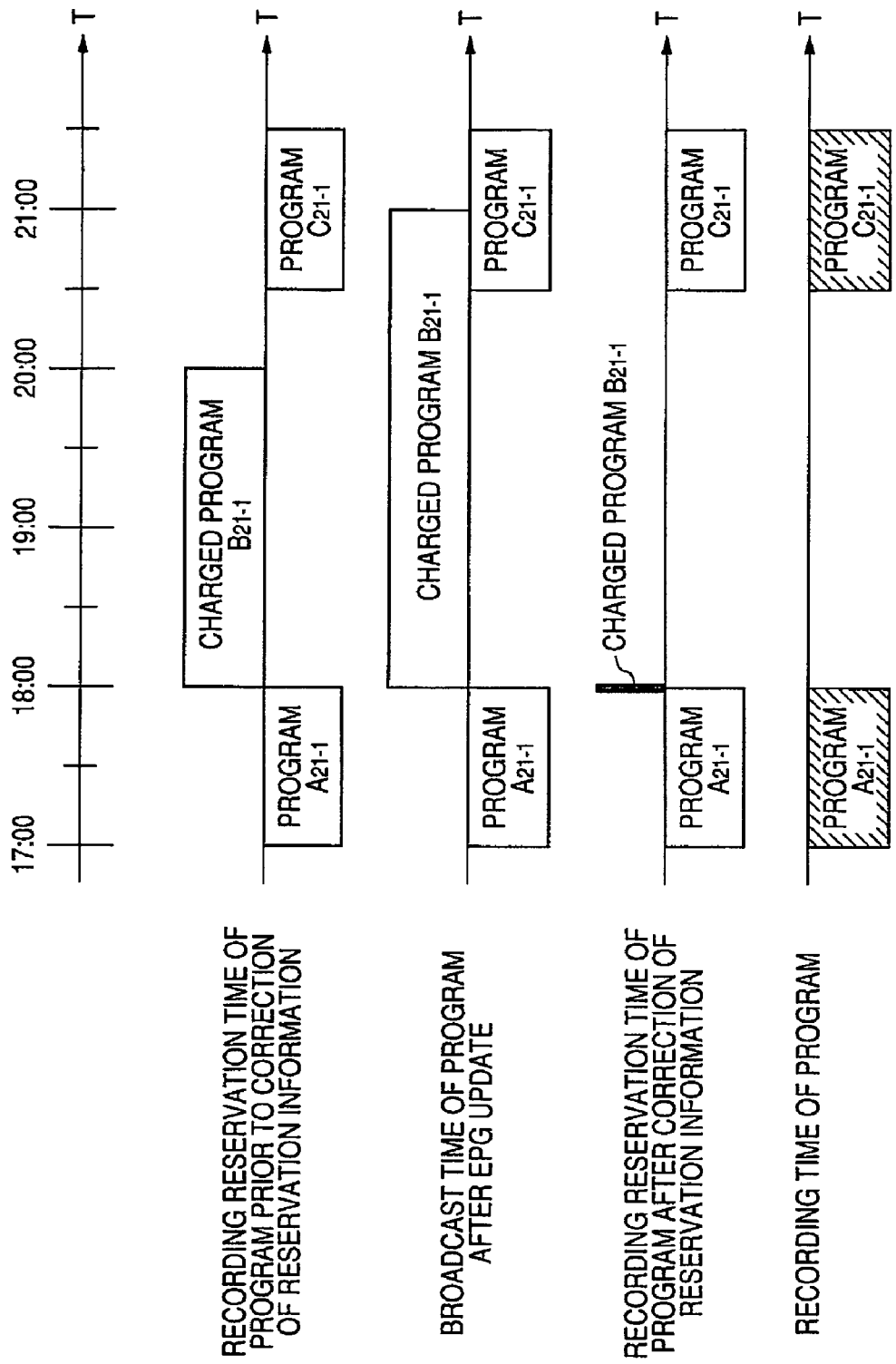
FIG. 28 is a diagram illustrating correction of reservation information on a charged program, which is not in recording.

According to a first aspect of the present invention, a recording control device (for example, an HDD video recorder 1 of FIG. 1) which records a program to be reserved for recording on the basis of reservation information (for example, information including "PROGRAM NAME", "RECORDING START TIME", and "RECORDING END TIME" of FIG. 10) including recording start time (for example, 18:00 in a charged program $B_{21\text{-}1}$ of FIG. 28) information indicating a time, at which recording starts, and recording end time (for example, 20:00 in the charged program $B_{21\text{-}1}$ of FIG. 28) information indicating a time, at which recording ends, includes setting unit (for example, a reservation correction manager 162 of FIG. 2) that, when it is judged that the program is not recorded after recording is reserved, sets the same time (for example, 18:00 in the charged program $B_{21-1}$ of FIG. 28) as the time, indicated by the recording start time information, at which recording starts, in the recording end time information of the reservation information for recording the program, and a recording control unit (for example, a recording manager 136 of FIG. 2) that, when the time, indicated by the recording start time information, at which recording starts, is the same as the time, indicated by the recording end time information, at which recording ends, controls recording of the program such that recording of the program is suppressed. In this case, after setting the same time (for example, 18:00 in a free program $B_{24-1}$ of FIG. 39) as the time, indicated by the recording start time information, at which recording starts, in the recording end time information of the reservation information, when it is judged that the program is recorded, the setting unit sets a time (for example, 20:30 in the free program $B_{24-1}$ of FIG. 39) later than the time, indicated by the recording start time information, at which recording starts, in the recording end time information of the reservation information.

Figure 61:
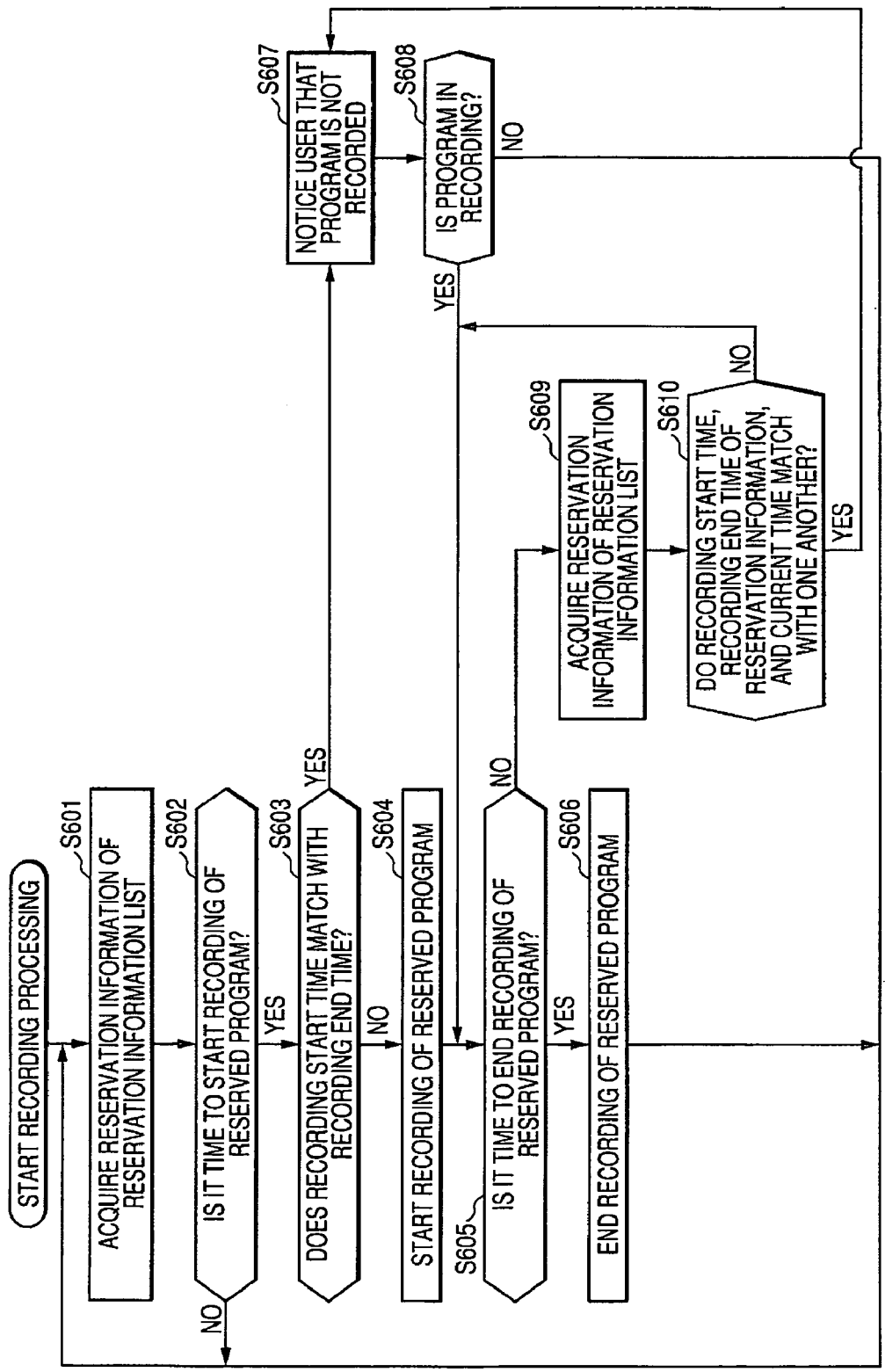
FIG. 61 is a flowchart illustrating a recording processing.

According to a second aspect of the present invention, when the time, indicated by the recording start time information, at which recording starts, is the same as the time, indicated by the recording end time information, at which recording ends, the recording control unit gives, to a user, a notice that recording of the program is controlled such that recording of the program is suppressed (for example, a processing of a step S607 of FIG. 61).

According to a third aspect of the present invention, a recording control method of a recording control device (for example, the HDD video recorder 1 of FIG. 1), which records a program to be reserved for recording on the basis of reservation information (for example, information including "PROGRAM NAME", "RECORDING START TIME", and "RECORDING END TIME" of FIG. 10) including recording start time (for example, 18:00 in the charged program $B_{21-1}$ of FIG. 28) information indicating a time, at which recording starts, and recording end time (for example, 20:00 in the charged program $B_{21-1}$ of FIG. 28) information indicating a time, at which recording ends, includes the steps of, when it is judged that the program is not recorded after recording is reserved, setting the same time (for example, 18:00 in the charged program $B_{21-1}$ of FIG. 28) as the time, indicated by the recording start time information, at which recording starts, as the recording end time information of the reservation information for recording the program (for example, a processing of a step S487 of FIG. 47), and, when the time, indicated by the recording start time information, at which recording starts, is the same as the time, indicated by the recording end time information, at which recording ends, controlling recording of the program such that recording of the program is suppressed (for example, a processing of steps S603 and S607 of FIG. 61). In this case, in the setting, after setting the same time (for example, 18:00 in the free program $B_{24-1}$ of FIG. 39) as the time, indicated by the recording start time information, at which recording starts, as the recording end time information of the reservation information, when it is judged that the program is recorded, setting a time (for example, 20:30 in the free program $B_{24-1}$ of FIG. 39) later than the time, indicated by the recording start time information, at which recording starts, as the recording end time information of the reservation information.

According to a fourth aspect of the present invention, a program of a recording medium for recording control of a recording control device (for example, the HDD video recorder 1 of FIG. 1), which records a program to be reserved for recording on the basis of reservation information (for example, information including "PROGRAM NAME", "RECORDING START TIME", and "RECORDING END TIME" of FIG. 10) including recording start time (for example, 18:00 in the charged program $B_{21-1}$ of FIG. 28) information indicating a time, at which recording starts, and recording end time (for example, 20:00 in the charged program $B_{21-1}$ of FIG. 28) information indicating a time, at which recording ends, includes the steps of, when it is judged that the program is not recorded after recording is reserved, setting the same time (for example, 18:00 in the charged-program $B_{21-1}$ of FIG. 28) as the time, indicated by the recording start time information, at which recording starts, as the recording end time information of the reservation information for recording the program (for example, the processing of the step S487 of FIG. 47), and, when the time, indicated by the recording start time information, at which recording starts, is the same as the time, indicated by the recording end time information, at which recording ends, controlling recording of the program such that recording of the program is suppressed (for example, the processing of the steps S603 and S607 of FIG. 61). In this case, in the setting, after setting the same time (for example, 18:00 in the free program $B_{24-1}$ of FIG. 39) as the time, indicated by the recording start time information, at which recording starts, as the recording end time information of the reservation information, when it is judged that the program is recorded, setting a time (for example, 20:30 in the free program $B_{24-1}$ of FIG. 39) later than the time, indicated by the recording start time information, at which recording starts, as the recording end time information of the reservation information.

According to a fifth aspect of the present invention, a program causing a computer of a recording control device (for example, the HDD video recorder 1 of FIG. 1), which records a program to be reserved for recording on the basis of reservation information (for example, information including "PROGRAM NAME", "RECORDING START TIME", and "RECORDING END TIME" of FIG. 10) including recording start time (for example, 18:00 in the charged program $B_{21-1}$ of FIG. 28) information indicating a time, at which recording starts, and recording end time (for example, 20:00 in the charged program $B_{21-1}$ of FIG. 28) information indicating a time, at which recording ends, to executes recording control including the steps of, when it is judged that the program is not recorded after recording is reserved, setting the same time (for example, 18:00 in the charged program $B_{21-1}$ of FIG. 28) as the time, indicated by the recording start time information, at which recording starts, as the recording end time information of the reservation information for recording the program (for example, the processing of the step S487 of FIG. 47), and, when the time, indicated by the recording start time information, at which recording starts, is the same as the time, indicated by the recording end time information, at which recording ends, controlling recording of the program such that recording of the program is suppressed (for example, the processing of the steps S603 and S607 of FIG. 61). In this case, in the setting, after setting the same time (for example, 18:00 in the free program $B_{24-1}$ of FIG. 39) as the time, indicated by the recording start time information, at which recording starts, as the recording end time information of the reservation information, when it is judged that the program is recorded, setting a time (for example, 20:30 in the free program $B_{24-1}$ of FIG. 39) later than the time, indicated by the recording start time information, at which recording starts, as the recording end time information of the reservation information.

Hereinafter, embodiments of the present invention will be described with reference to the drawings.

Figure 1:
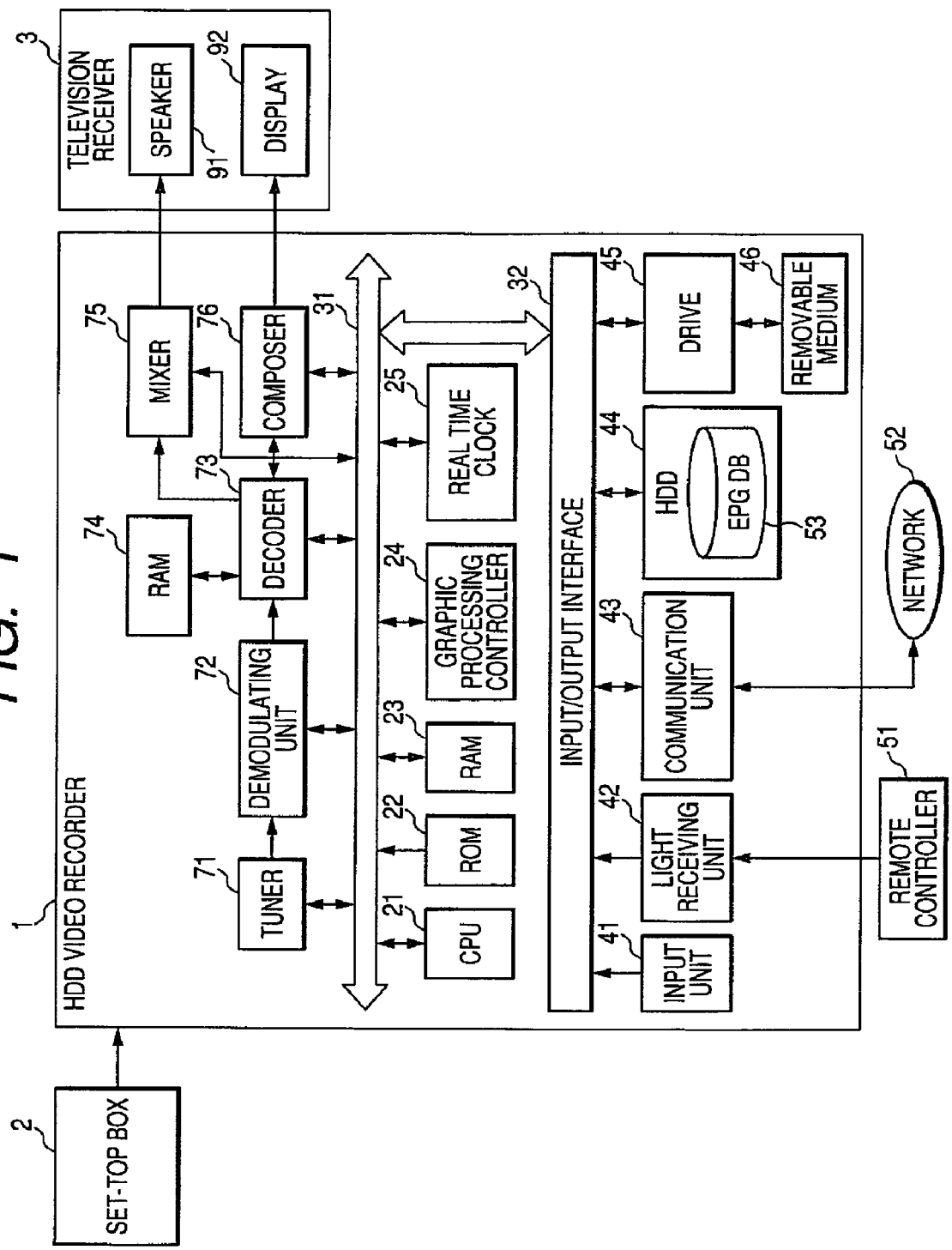
FIG. 1 is a block diagram showing an example of a configuration of an HDD video recorder according to an embodiment of the present invention.

FIG. 1 is a block diagram showing an example of the configuration of an HDD video recorder 1, which is an embodiment of a recording control device according to an embodiment of the present invention.

To the HDD video recorder 1, a set-top box 2 and a television receiver (hereinafter, referred to as TV receiver) 3 are connected. Here, the set-top box 2 is a separate HDD video recorder, tuner or the like from the HDD video recorder 1, for example. The set-top box 2 supplies EPG data, for example, which is acquired (received) by itself (the set-top box 2), to the HDD video recorder 1 to be stored therein.

The HDD video recorder 1 is configured to record a television broadcast program according to recording reservation set by a user, sound-record a radio broadcast program according to set sound-recording reservation, or receive and record predetermined data or the like, which is transmitted by broadcasting distribution through a network, such as Internet, according to set recording reservation.

Hereinafter, recording will be described as an example, but sound-recording can be similarly executed. Further, recording of a broadcast program will be described as an example, but recording of a program to be distributed through a network can be similarly executed. In addition, video, sound, or data to be processed by the HDD video recorder 1, such as video and sound of a television broadcast program, sound of a radio program, predetermined data to be received through the network, is referred to as contents.

The HDD video recorder 1 is configured to extract a user preference on the basis of an operation from the user. That is, the HDD video recorder 1 can record plural programs (contents) in an HDD 44 having a huge memory capacity, and can exactly grasp a user's intension so as to manage a record of a recorded program (manage a history of a watched program or an operation history). Further, the HDD video recorder 1 is configured to automatically reserve recording of a program on the basis of the user's preference, and to detect a change in broadcast time of a program so as to reserve recording, that is, to change recording time of a program.

Moreover, the HDD video recorder 1 can be implemented by AV (Audio Visual) instruments or can be integrated into the TV receiver 3, for example.

A CPU (Central Processing Unit) 21 is a main controller which controls the operation of the entire HDD video recorder 1, and executes various application programs on a platform, which is provided by an operating system (hereinafter, referred to as OS).

A ROM (Read Only Memory) 22 is a nonvolatile writable memory which stores a self-test or initialization program to be executed when the HDD video recorder 1 is powered on, hardware operation control codes, or the like. A RAM (Random Access Memory) 23 is a volatile programmable memory which is used to load an execution program of the CPU 21 and to write job data of the execution program.

A graphic processing controller 24 has a DSP (Digital Signal Processor), a general GPU (Graphics Processing Unit), or the like, and is a controller which generates image data. Further, the graphic processing controller 24 has a high-definition drawing function, such as SVGA (Super Video Graphic Array), XGA (extended Graphic Array). In addition, the graphic processing controller 24 generates, for example, images of a GUI (Graphical User Interface), through which the user can input various kinds of setting.

A real time clock 25 output current date and time (data representing current date and time).

The CPU 21, the ROM 22, the RAM 23, the graphic processing controller 24, and the real time clock 25 are connected to one another through a bus 31. Further, to the bus 31, an input/output interface 32 is connected.

To the input/output interface 32, an input unit 41, a light-receiving unit 42, a communication unit 43, and the HDD 44 are connected.

The input unit 41 has, for example, buttons, switches, a keyboard, and outputs an input signal corresponding to a user operation, that is, an input signal indicating a user instruction (operation information), to the CPU 21 through the input/output interface 32 and the bus 31.

The light-receiving unit 42 receives an infrared signal corresponding to the user operation, which is transmitted from a remote controller 51, converts the infrared signal into an electrical signal, and outputs the electrical signal to the CPU 21.

The communication unit 43 communicates through a wire, such as a telephone line, or in a wireless manner. For example, the communication unit 43 communicates with a predetermined server or a personal computer through a network 52, such as Internet or Intranet. Data inputted to the communication unit 43 is suitably recorded in the HDD 44 through the input/output interface 32.

For example, the communication unit 43 performs communication with a server (not shown) so as to receive contents or EPG data. The contents inputted to the communication unit 43 is inputted to a decoder 73 through the input/output interface 32 and the bus 31, and is processed similarly to broadcast data inputted through a tuner 71 and a demodulating unit 72 described below.

The HDD 44 is a random-accessible storage device which can store various kinds of data including programs or contents in a predetermined file format. The HDD 44 is connected to the bus 31 through the input/output interface 32. If various kinds of data, such as the contents as the program, EPG data, are supplied from the decoder 73 or the communication unit 43, the HDD 44 stores those data, and outputs stored data when reading-out is requested.

Further, in the HDD 44, an EPG database (hereinafter, referred to as EPG DB) 53 is constructed. In the EPG DB 53, various formats of EPG data supplied through the tuner 71 or the communication unit 43 are stored.

Further, to the input/output interface 32, if necessary, a drive 45 is connected, on which a removable medium 46, such as a magnetic disc, an optical disc, a magneto-optical disc, or a semiconductor memory is suitably mounted. As occasion demands, a computer program read out from the removable medium 46 is installed in the HDD 44.

Here, the CPU 21 controls the tuner 71, the demodulating unit 72, the decoder 73, and the HDD 44 on the basis of the input signal (operation information) supplied from the input unit 41 or the remote controller 51 through the bus 31, the input/output interface 32, and the light-receiving unit 42, and performs recording or reproduction of the contents.

A broadcast wave received by an antenna (not shown) is supplied to the tuner 71. The broadcast wave has a predetermined format, and includes EPG data, for example. The broadcast wave is transmitted through an arbitrary communication path in a wired or wireless manner, regardless of a satellite broadcast wave or a ground wave.

The tuner 71 performs tuning of a broadcast wave of a predetermined channel, that is, channel selection, on the basis of the control of the CPU 21, and outputs received data to the demodulating unit 72. The demodulating unit 72 demodulates received data, which is subjected to digital modulation, and outputs demodulated data to the decoder 73.

For example, in case of digital satellite broadcast, digital data, which is received by the tuner 71 and demodulated by the demodulating unit 72, is a transport stream in which AV data compressed in an MPEG2 (Moving Picture Experts Group 2) method and data for data broadcast are multiplexed. AV data is video data and sound data constituting a broadcast program main body, and data for data broadcast is data including data appended to the broadcast program main body (for example, EPG data).

The decoder 73 separates the transport stream supplied from the demodulating unit 72 into AV data compressed (encoded) in the MPEG method and data for data broadcast (for example, EPG data). Separated data for data broadcast is supplied to and stored in the HDD 44 through the bus 31 and the input/output-interface 32.

A RAM 74 stores job data required for the operation of the decoder 73.

When watching of the received program (the contents thereof) is requested, the decoder 73 further separates AV data into compressed video data and compressed sound data. Separated sound data is decoded and then is outputted to a speaker 91 of the TV receiver 3 through a mixer 75. Further, separated video data is decoded and then is outputted to a display 92 of the TV receiver 3 through a composer 76.

Further, when the received program (the contents thereof) is instructed to be recorded in the HDD 44, the decoder 73 outputs AV data before separation (AV data having multiplexed video data and sound data) to the HDD 44 through the bus 31 and the input/output interface 32. In addition, when a program recorded in the HDD 44 is instructed to be reproduced, the decoder 73 receives an input of AV data from the HDD 44 through the input/output interface 32 and the bus 31, separates AV data into compressed video data and compressed sound data, decodes compressed video data and compressed sound data, and outputs decoded video data and sound data to the mixer 75 and the composer 76, respectively.

If necessary, the composer 76 synthesizes video data inputted from the decoder 73 and image data of the GUI (Graphical User Interface), and outputs video data with image data synthesized therein to the display 92 of the TV receiver 3.

Moreover, according to whether the broadcast wave to be transmitted is an analog signal or a digital signal, the configurations of the tuner 71 to the composer 76 can be suitably changed or expanded. Further, in the example of FIG. 1, the HDD video recorder 1 has been described as a device which performs recording the TV receiver 3 by a ground wave, but the HDD video recorder 1 may be configured to store various contents (for example, contents of a program by satellite broadcast or contents to be distributed through Internet). In this case, however, a necessary function is additionally provided according to the nature of the contents to be recorded in the HDD video recorder 1.

Further, in the example of FIG. 1, a case in which the contents are recorded in the HDD 44 has been described, but the present invention is not limited to this configuration. For example, the HDD video recorder 1 may record the contents in the removable medium 46 (more specifically, for example, DVD (Digital Versatile Disc)-R, DVD-RW, or Blu-ray Disc (Trademark)) mounted on the drive 45. Further, the contents may be recorded in other storage devices through the communication unit 43.

Figure 2:
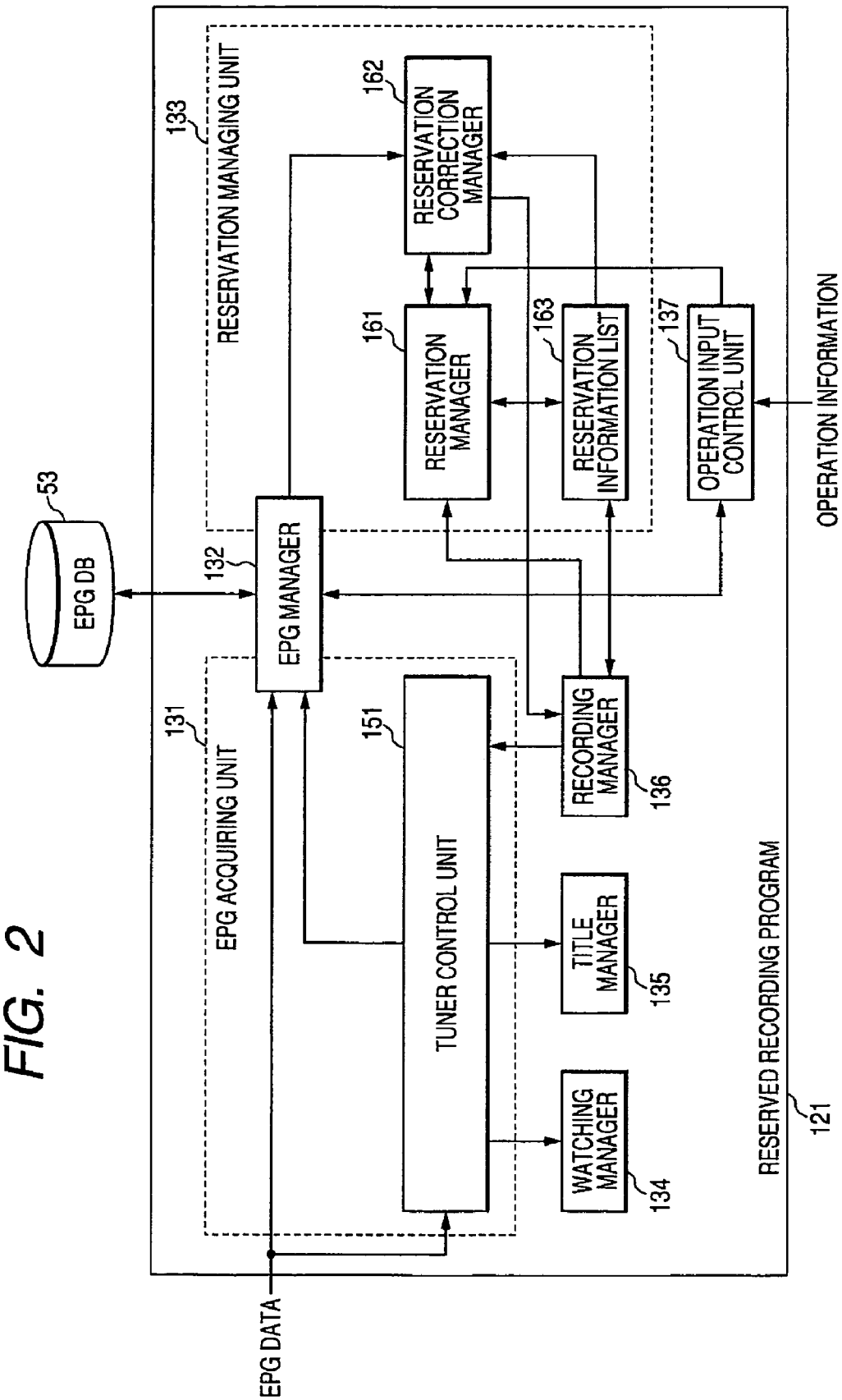
FIG. 2 is a block diagram showing an example of a functional configuration of a reserved recording program.

FIG. 2 is a block diagram showing an example of the functional configuration of a reserved recording program 121 which is executed by the CPU 21 of the HDD video recorder 1.

The reserved recording program 121 controls program recording reservation and recording of a reserved program.

The reserved recording program 121 includes an EPG acquiring unit 131, an EPG manager 132, a reservation managing unit 133, a watching manager 134, a title manager 135, a recording manager 136, and an operation input control unit 137. Here, the EPG manager 132 is included in both the EPG acquiring unit 131 and the reservation managing unit 133.

The EPG acquiring unit 131 acquires EPG data to be supplied through the communication unit 43, the tuner 71 or the like.

The EPG acquiring unit 131 is configured to include a tuner control unit 151 and the EPG manager 132.

The tuner control unit 151 controls the tuner 71, and supplies EPG data, which is received by the tuner 71, to the EPG manager 132. Further, the tuner control unit 151 supplies a signal indicating a program to be received by the tuner 71 to the watching manager 134 and the title manager 135. In addition, the tuner control unit 151 causes the tuner 71 to receive the broadcast wave in a case in which a program to be recorded is in broadcast, on the basis of an instruction from the recording manager 136.

The EPG manager 132 acquires various formats of EPG data supplied from the communication unit 43 or the tuner control unit 151, and merges them. Further, the EPG manager 132 stores merged EPG data in the EPG DB 53.

In the above description, acquired EPG data represents EIT (p/f (present/following)) or EIT (schedule) in EIT (Event Information Table), for example. The EIT (p/f) has information of a program in broadcast at present and a next program to be broadcasted. The EIT (schedule) has information of a plurality of programs several days ahead (for example, seven days ahead).

The program information of the EIT (p/f) and the EIT (schedule) includes a program name, broadcast start time at which the broadcast of the program starts, continuation time for which the broadcast of the program is continued, and an event ID (IDentification). Further, the EIT includes information indicating the attribute of the program, for example, information indicating whether or not the program is charged for watching.

Moreover, in the EIT (p/f) or the EIT (schedule), broadcast end time at which the broadcast of the program ends may be not included.

In this case, the EPG manager 132 creates broadcast end time, at which the broadcast of the program ends, on the basis of broadcast start time and continuation time of the program included in the EIT (p/f) and the EIT (schedule). Further, the EPG manager 132 stores created broadcast end time in the EPG DB 53.

The following description of use of broadcast end time of the program included in the EIT (p/f) or the EIT (schedule) actually shows that broadcast end time-included in the EIT (p/f) or the EIT (schedule) may be used or broadcast end time generated by the EPG manager 132 may be used.

The EPG manager 132 suitably acquires stored EPG data from the EPG DB 53, and supplies EPG data to the operation input control unit 137 and a reservation correction manager 162.

The watching manager 134 selects a kind of sound to be outputted from the speaker 91 of the TV receiver 3 or switches the size of a screen to be displayed on the display 92, on the basis of the signal supplied from the tuner control unit 151.

The title manager 135 controls reproduction of the contents stored in the HDD 44.

The recording manager 136 controls recording of the reserved program. That is, the recording manager 136 acquires reservation information stored in a reservation information list 163 described below, and controls recording of the program on the basis of the reservation information. The recording manager 136 causes the tuner 71 to receive the broadcast wave when the program to be recorded is broadcasted, through the tuner control unit 151. Here, the reservation information includes a program name to be recorded, recording start time at which recording of the program starts, and recording end time at which recording of the program ends.

Further, when reservation information of a program in recording and EPG data are transmitted from the reservation correction manager 162 described below, the recording manager 136 corrects the reservation information of the program in recording.

Further, the recording manager 136 controls recording of the program in recording at present on the basis of the corrected reservation information. In addition, the recording manager 136 supplies the corrected reservation information to a reservation manager 161, and stores the reservation information in the reservation information list 163.

The reservation managing unit 133 refers to the EPG DB 53 through the EPG manager 132, and holds reservation information for reserving recording of the program to be supplied from the operation input control unit 137.

The operation input control unit 137 creates (acquires) the reservation information including the program name of the program to be reserved for recording and recording start time and recording end time of that program on the basis of the operation information (input signal), which is transmitted from the input unit 41 or the light-receiving unit 42 and represents the operation content to the input unit 41 or the remote controller 51 by the user, with reference to the EPG DB 53 through the EPG manager 132. Further, the operation input control unit 137 supplies the reservation information to the reservation manager 161 of the reservation managing unit 133.

The reservation managing unit 133 is configured to include the reservation manager 161, the reservation correction manager 162, and the reservation information list 163.

The reservation manager 161 stores the reservation information supplied from the recording manager 136, the operation input control unit 137, and the reservation correction manager 162 in the reservation information list 163. Moreover, the reservation information list 163 is stored (held) in the HDD 44, for example.

When EPG data is updated, the. reservation correction manager 162 acquires the reservation information from the reservation information list 163, acquires EPG data from the EPG DB 53 through the EPG manager 132, and, on the basis of updated EPG data, judges whether or not the reservation information needs to be corrected. That is, the reservation correction manager 162 judges whether or not recording time of the program to be reserved for recording and broadcast time of that program are different from each other. Here, when recording time of the program to be reserved for recording and broadcast time of that program are different from each other, broadcast time of the program to be reserved for recording is changed.

When it is judged that the reservation information needs to be corrected, that is, when broadcast time of the program to be reserved for recording is changed, the reservation correction manager 162 corrects the reservation information on the basis of updated EPG data. The reservation correction manager 162 supplies the corrected reservation information to the reservation manager 161 so as to be stored in the reservation information list 163.

Further, when EPG is updated, it is judged that the reservation information (recording time) needs to be corrected, and the program whose reservation information needs to be corrected is in recording at present, the reservation correction manager 162 supplies acquired EPG data and the reservation information to the recording manager 136.

Figure 3:
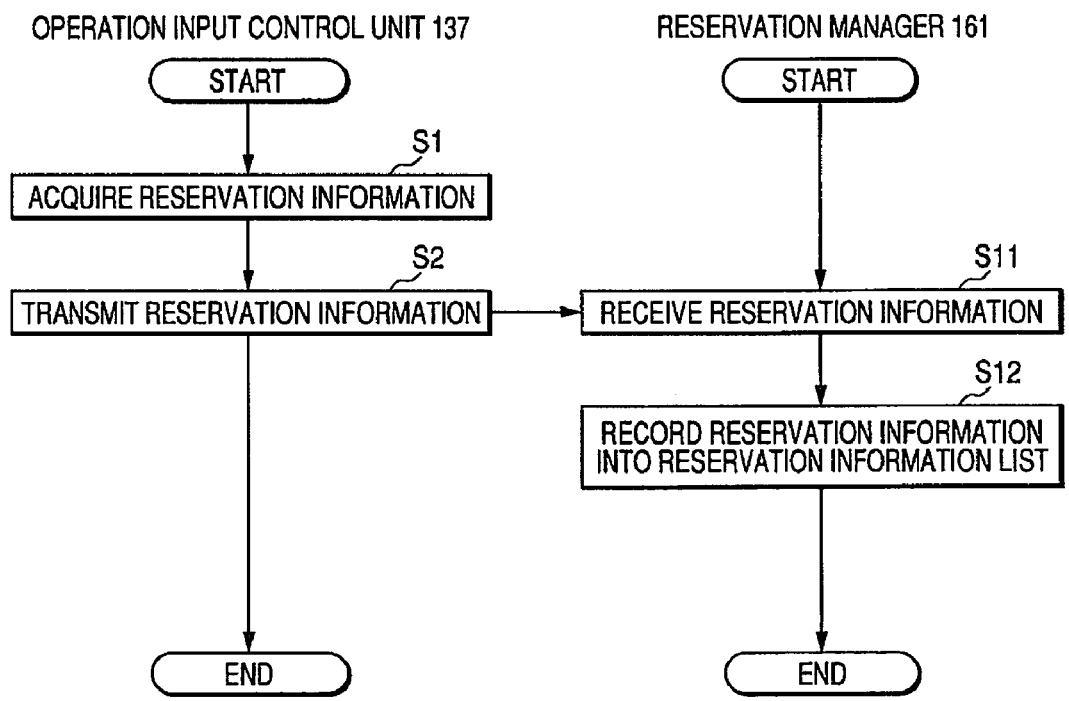
FIG. 3 is a flowchart illustrating a program recording reservation processing.

With reference to a flowchart of FIG. 3, a program recording reservation processing by the CPU 21 of the HDD video recorder 1, which executes the reserved recording program 121, will be described.

At a step S1, the operation input control unit 137 acquires (creates) the reservation information on the basis of the operation information (input signal) inputted through the operation of the input unit 41 or the remote controller 51 by the user and the EPG data stored in the EPG DB 53. Here, the reservation information is information for reserving recording of a desired program, as described above, and includes, for example, the program name, recording start time at which recording of the program starts, and recording end time at which recording of the program ends.

At a step S2, the operation input control unit 137 transmits (outputs) the reservation information to the reservation manager 161. After the step S2, the processing by the operation input control unit 137 ends.

At a step S11, the reservation manager 161 receives the reservation information, which is transmitted from the operation input control unit 137 through the processing of the step S2.

At a step S12, the reservation manager 161 stores the reservation information received through the processing of the step S11 in the reservation information list 163. After the step S12, the processing by the reservation manager 161 ends.

Figure 4:
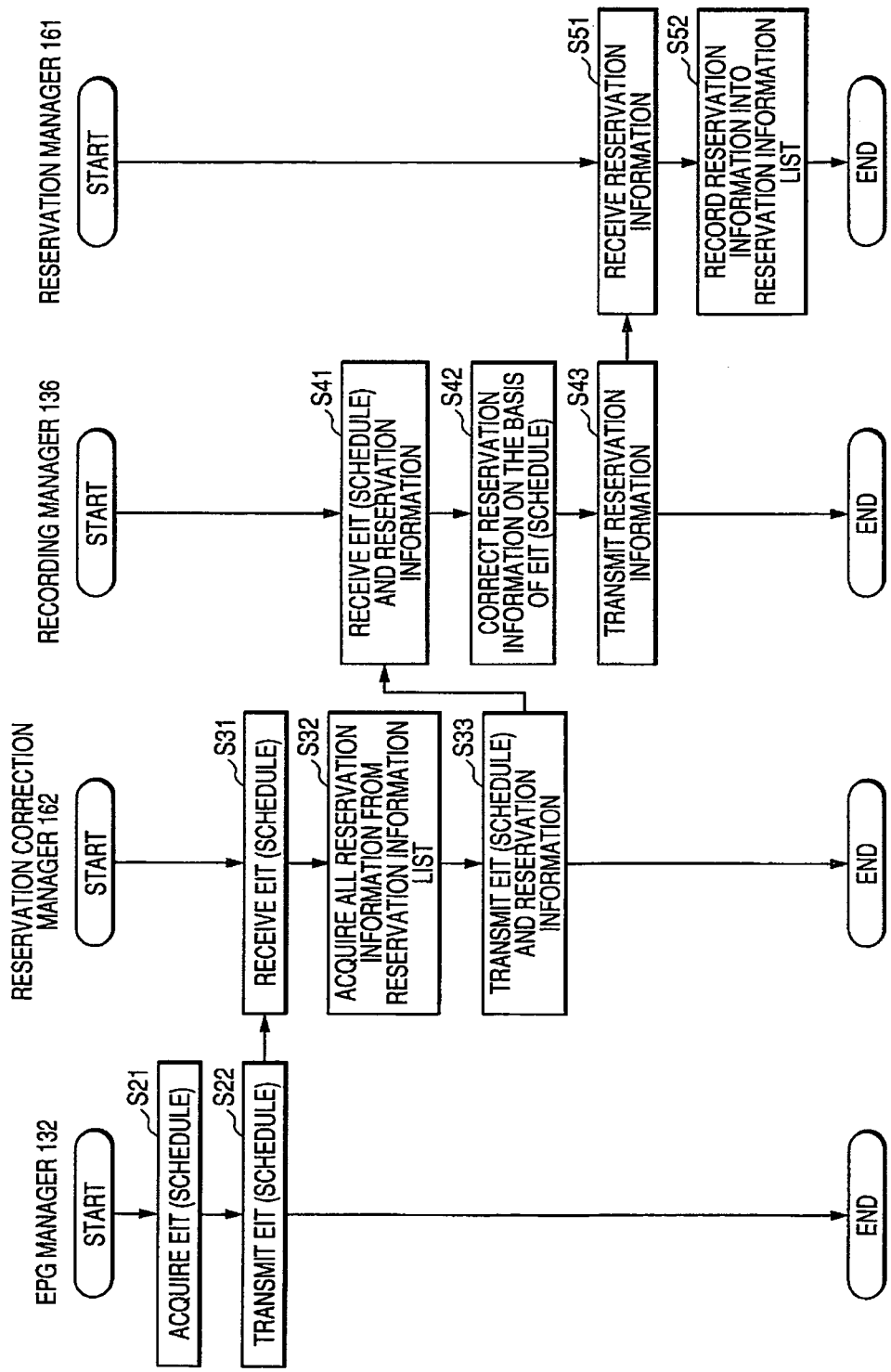
FIG. 4 is a flowchart illustrating a recording time correction processing on a program in recording.

With reference to a flowchart of FIG. 4, a recording time correction processing by the HDD video recorder 1, which executes the reserved recording program 121, when the EIT (schedule) is received as EPG data during recording of the program, the reservation information of which needs to be corrected (broadcast time of which is changed), will be described. Moreover, the detailed description of this processing will be described below with reference to a flowchart of FIG. 9.

At a step S21, the EPG manager 132 acquires the EIT (schedule), serving as EPG data, which is transmitted through the tuner 71 or the communication unit 43.

Moreover, at the step S21, the EPG manager 132 may store the received EIT (schedule), serving as EPG data, in the EPG DB 53 once and may acquire the EIT (schedule) by reading out from the EPG DB 53.

At a step S22, the EPG manager 132 transmits (outputs) the EIT (schedule) acquired through the processing of the step S21 to the reservation correction manager 162. After the step S22, the processing by the EPG manager 132 ends.

At a step S31, the reservation correction manager 162 receives the EIT (schedule), which is transmitted from the EPG manager 132 through the processing of the step S22.

At a step S32, the reservation correction manager 162 acquires all reservation information from the reservation information list 163.

At a step S33, the reservation correction manager 162 transmits (outputs) the EIT (schedule) received through the processing of the step S31 and the reservation information acquired through the processing of the step S32 to the recording manager 136. After the step S33, the processing by the reservation correction manager 162 ends.

At a step S41, the recording manager 136 receives the EIT (schedule) and the reservation information, which are transmitted from the reservation correction manager 162 through the processing of the step S33.

At a step S42, the recording manager 136 corrects the reservation information of the program in recording at present with changed broadcast time from the received reservation information on the basis of the received EIT (schedule).

At a step S43, the recording manager 136 transmits (outputs) the corrected reservation information through the processing of the step S42 to the reservation manager 161. After the step S43, the processing by the recording manager 136 ends.

At a step S51, the reservation manager 161 receives the reservation information, which is transmitted from the recording manager 136 through the processing of the step S43.

At a step S52, the reservation manager 161 records the reservation information received through the processing of the step S51 in the reservation information list 163. After the step S52, the processing by the reservation manager 161 ends.

As such, when the EIT (schedule) is received, the reservation information for reserved recording of the program in recording is corrected.

Figure 5:
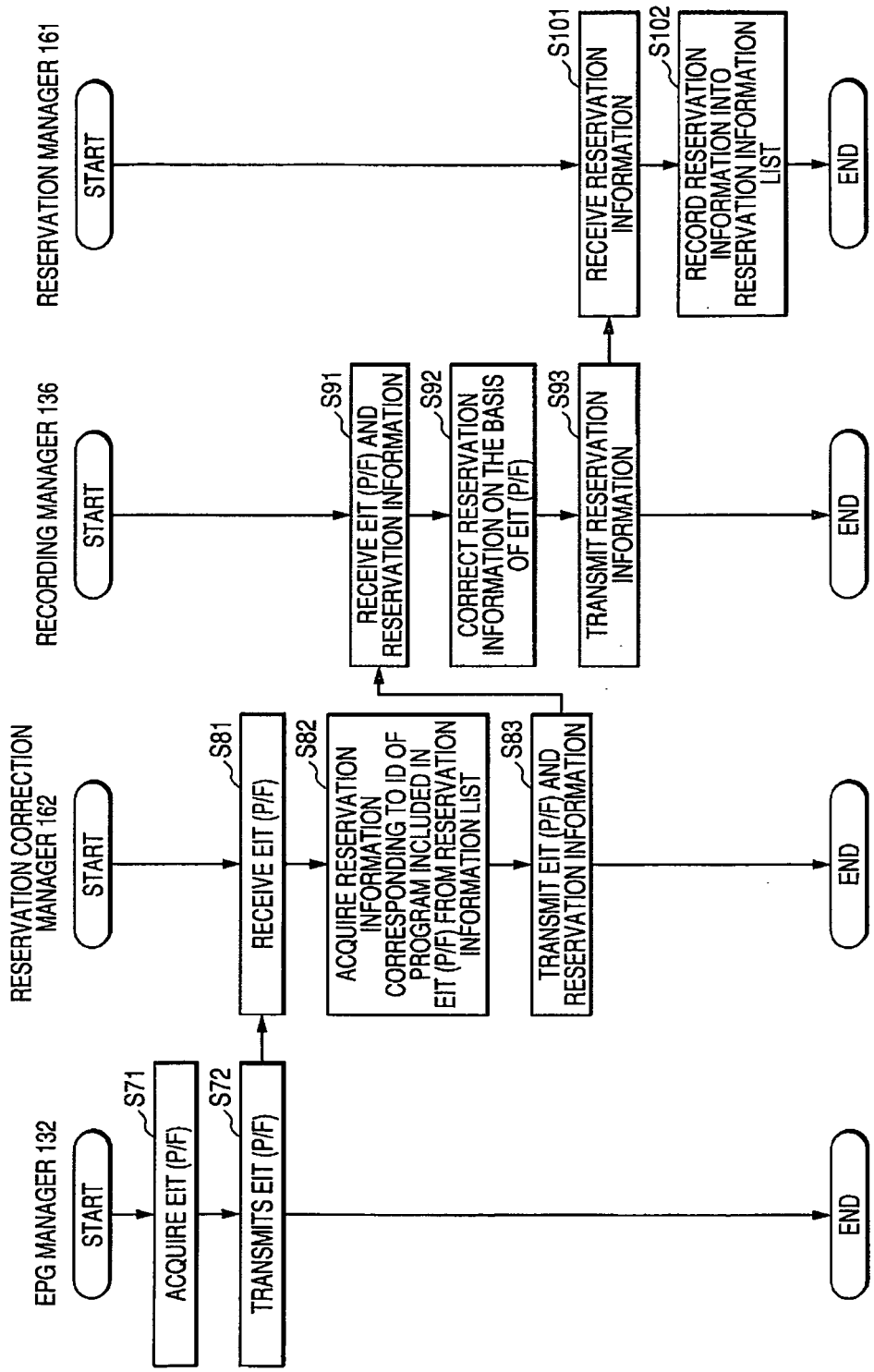
FIG. 5 is a flowchart illustrating a recording time correction processing on a program in recording.

With reference to a flowchart of FIG. 5, a recording time correction processing by the HDD video recorder 1, which executes the reserved recording program 121, when the EIT (p/f) is received as EPG data during recording of the program, the reservation information of which needs to be corrected (broadcast time of which is changed), will be described. Moreover, the detailed description of this processing will be described below with reference to a flowchart of FIG. 60.

At a step S71, the EPG manager 132 acquires the EIT (p/f), serving as EPG data, which is transmitted through the tuner or the communication unit 43.

Moreover, at the step S71, the EPG manager 132 may store the received EIT (p/f), serving as EPG data, in the EPG DB 53 once and may acquire the EIT (p/f) by reading out from the EPG DB 53.

At a step S72, the EPG manager 132 transmits (outputs) the EIT (p/f) acquired through the processing of the step S71 to the reservation correction manager 162. After the step S72, the processing by the EPG manager 132 ends.

At a step S81, the reservation correction manager 162 receives the EIT (p/f), which is transmitted from the EPG manager 132 through the processing of the step S72.

At a step S82, the reservation correction manager 162 acquires the reservation information corresponding to the event ID or the program name of the program in recording at present included in the EIT (p/f) from the reservation information list 163, for example. That is, when the event ID of the program is included in the reservation information, the reservation correction manager 162 acquires the reservation information of the program corresponding to the event ID included in the EIT (p/f) from the reservation information list 163. Further, when the program name is included in the reservation information, the reservation correction manager 162 acquires the reservation information of the program corresponding to the program name included in the EIT (p/f) from the reservation information list 163.

At a step S83, the reservation correction manager 162 transmits (outputs) the EIT (p/f) received through the processing of the step S81 and all reservation information of the reservation information list 163 including the reservation information acquired through the processing of the step S82 to the recording manager 136. After the step of S83, the processing by the reservation correction manager 162 ends.

At a step S91, the recording manager 136 receives the EIT (p/f) and the reservation information, which are transmitted from the reservation correction manager 162 through the processing of the step S83.

At a step S92, the recording manager 136 corrects the reservation information for reserved recording of the program in recording at present from the received reservation information on the basis of broadcast start time and broadcast end time of the program in recording at present which are included in the received EIT (p/f).

At a step S93, the recording manager 136 transmits (outputs) the reservation information corrected through the processing of the step S92 to the reservation manager 161. After the step S93, the processing by the recording manager 136 ends.

At a step S101, the reservation manager 161 receives the reservation information, which is transmitted from the recording manager 136 through the processing of the step S93.

At a step S102, the reservation manager 161 records the reservation information received through the processing of the step S101 to the reservation information list 163. After the step S102, the processing of the reservation manager 161 ends.

As such, when the EIT (p/f) is received, the reservation information for reserved recording of the program in recording is corrected.

Figure 6:
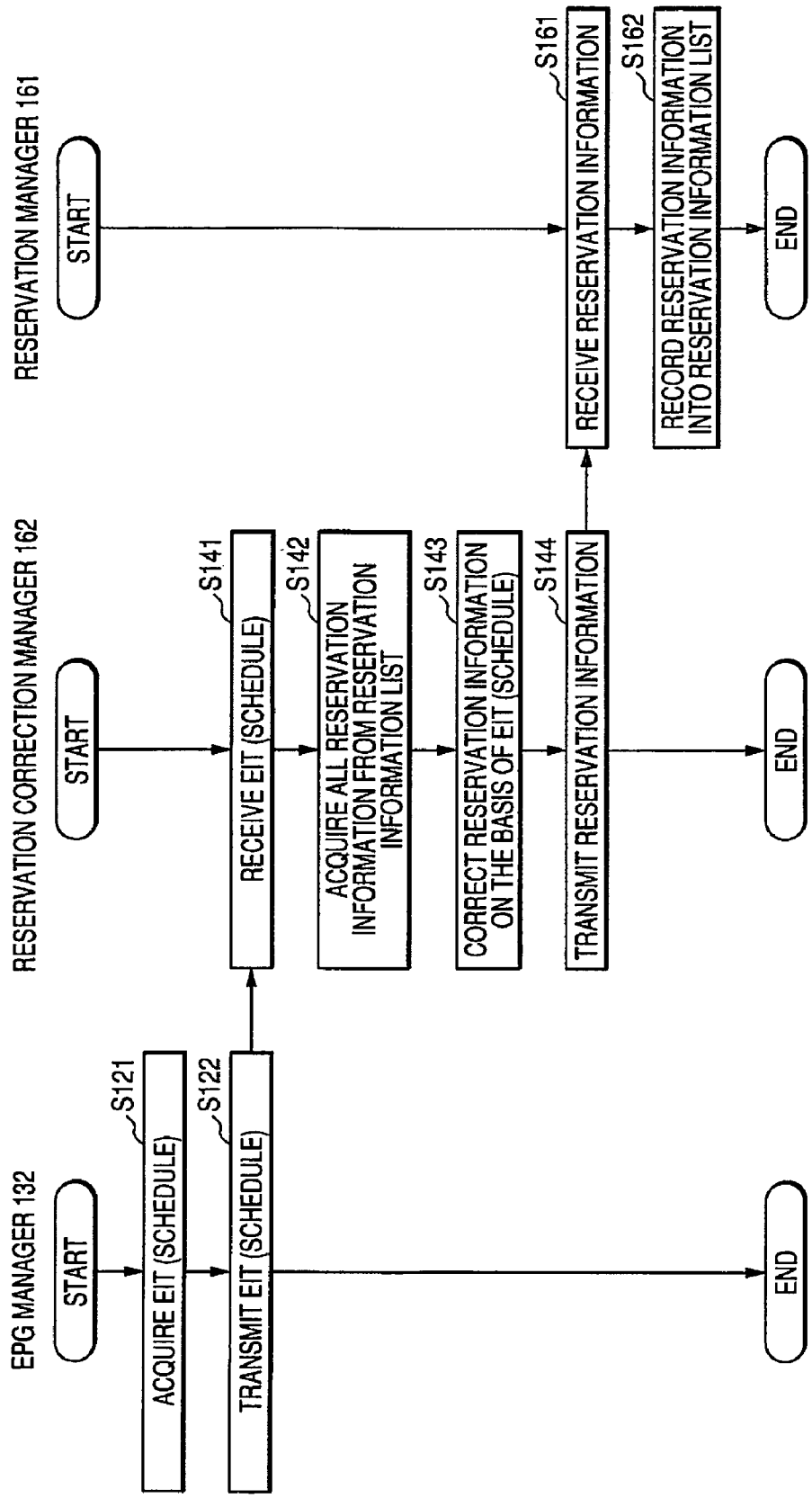
FIG. 6 is a flowchart illustrating a recording time correction processing on a program, which is not in recording.

With reference to a flowchart of FIG. 6, a recording time correction processing by the HDD video recorder 1, which executes the reserved recording program 121, when the EIT (schedule) is received as EPG data on the program, the reservation information of which needs to be corrected (broadcast time of which is changed), before recording of the program starts, will be described. Moreover, the detailed description of this processing will be described below with reference to a flowchart of FIG. 9.

At a step S121, the EPG manager 132 acquires the EIT (schedule), serving as EPG data, which is transmitted through the tuner 71 or the communication unit 43. As described above, the EIT (schedule) includes the information, such as the program names, broadcast start time, broadcast end time, and the event IDs of the plurality of programs several days ahead (for example, seven days ahead).

Moreover, at the step S121, the EPG manager 132 may stores the received EIT (schedule), serving as EPG data, in the EPG DB 53 once and may acquire the EIT (schedule) by reading out from the EPG DB 53.

At a step S122, the EPG manager 132 transmits (outputs) the EIT (schedule) to the reservation correction manager 162. After the step S122, the processing by the EPG manager 132 ends.

At a step S141, the reservation correction manager 162 receives the EIT (schedule), which is transmitted from the EPG manager 132 through the processing of the step S122.

At a step S142, the reservation correction manager 162 acquires all reservation information from the reservation information list 163.

At a step S143, the reservation correction manager 162 corrects the reservation information with changed program broadcast time from the reservation information acquired through the processing of the step S142 on the basis of the EIT (schedule) received through the processing of the step S141.

At a step S144, the reservation correction manager 162 transmits (outputs) the reservation information corrected through the processing of the step S143 to the reservation manager 161. After the step S144, the processing by the reservation correction manager 162 ends.

At a step S161, the reservation manager 161 receives the reservation information transmitted from the reservation correction manager 162 through the processing of the step S144.

At a step S162, the reservation manager 161 stores the reservation information received through the processing of the step S161 in the reservation information list 163. After the step S162, the processing by the reservation manager 161 ends.

As such, when the EIT (schedule) is received, the reservation information for reserved recording of the program to be recorded is corrected.

Figure 7:
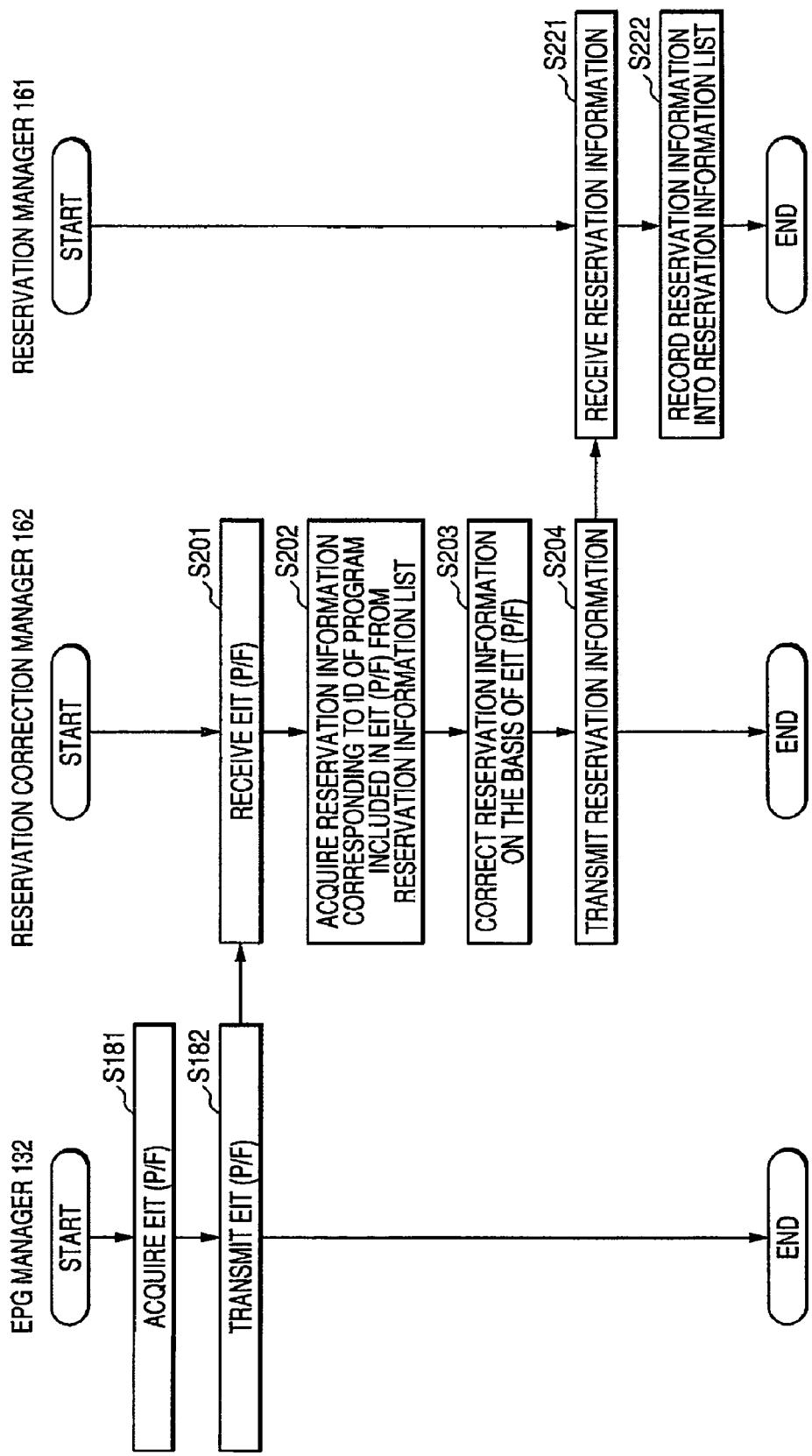
FIG. 7 is a flowchart illustrating a recording time correction processing on a program, which is not in recording.

With reference to a flowchart of FIG. 7, a recording time correction processing by the HDD video recorder 1, which executes the reserved recording program 121, when the EIT (p/f) is received as EPG data on the program, the reservation information of which needs to be corrected (broadcast time of which is changed), before recording of the program starts, will be described. Moreover, the detailed description of this processing will be described below with reference to the flowchart of FIG. 60.

At a step S181, the EPG manager 132 acquires the EIT (p/f), serving as EPG data, which is transmitted through the tuner 71 or the communication unit 43. As described above, the EIT (p/f) includes the information, such as the program names, broadcast start time, broadcast end time, and the event IDs of the program in broadcast at present and the next program to be broadcasted.

Moreover, at the step S181, the EPG manager 132 may stores the received EIT (p/f), serving as EPG data, in the EPG DB 53 once and may acquire the EIT (p/f) by reading out from the EPG DB 53.

At a step S182, the EPG manager 132 transmits (outputs) the EIT (p/f) to the reservation correction manager 162. After the step S182, the processing by the EPG manager 132 ends.

At a step S201, the reservation correction manager 162 receives the EIT (p/f) transmitted from the EPG manager 132 through the processing of the step S182.

At a step S202, the reservation correction manager 162 acquires all reservation information from the reservation information list 163, and acquires (detects) the reservation information corresponding to, for example, the event ID or the program name of the next program to be broadcasted to the program in broadcast at present included in the EIT (p/f) from the reservation information. That is, when the event ID of the program is included in the reservation information, the reservation correction manager 162 acquires the reservation information of the program corresponding to the event ID included in the EIT (p/f) from the reservation information list 163. Further, when the program name is included in the reservation information, the reservation correction manager 162 acquires the reservation information of the program corresponding to the program name included in the EIT (p/f) from the reservation information list 163.

At a step S203, the reservation correction manager 162 corrects the reservation information acquired through the processing of the step S202 on the basis of broadcast start time and broadcast end time of the program to be broadcasted next to the program in broadcast at present which are included in the EIT (p/f) received through the processing of the step S201.

At a step S204, the reservation correction manager 162 transmits (outputs) the reservation information corrected through the processing of the step S203 to the reservation manager 161. After the step S204, the processing by the reservation correction manager 162 ends.

At a step S221, the reservation manager 161 receives the reservation information transmitted from the reservation correction manager 162 through the processing of the step S204.

At a step S222, the reservation manager 161 records the reservation information received through the processing of the step S221 in the reservation information list 163. After the step S222, the processing by the reservation manager 161 ends.

As such, when the EIT (p/f) is received, the reservation information for reserved recording of the program to be recorded is corrected.

Figure 8:
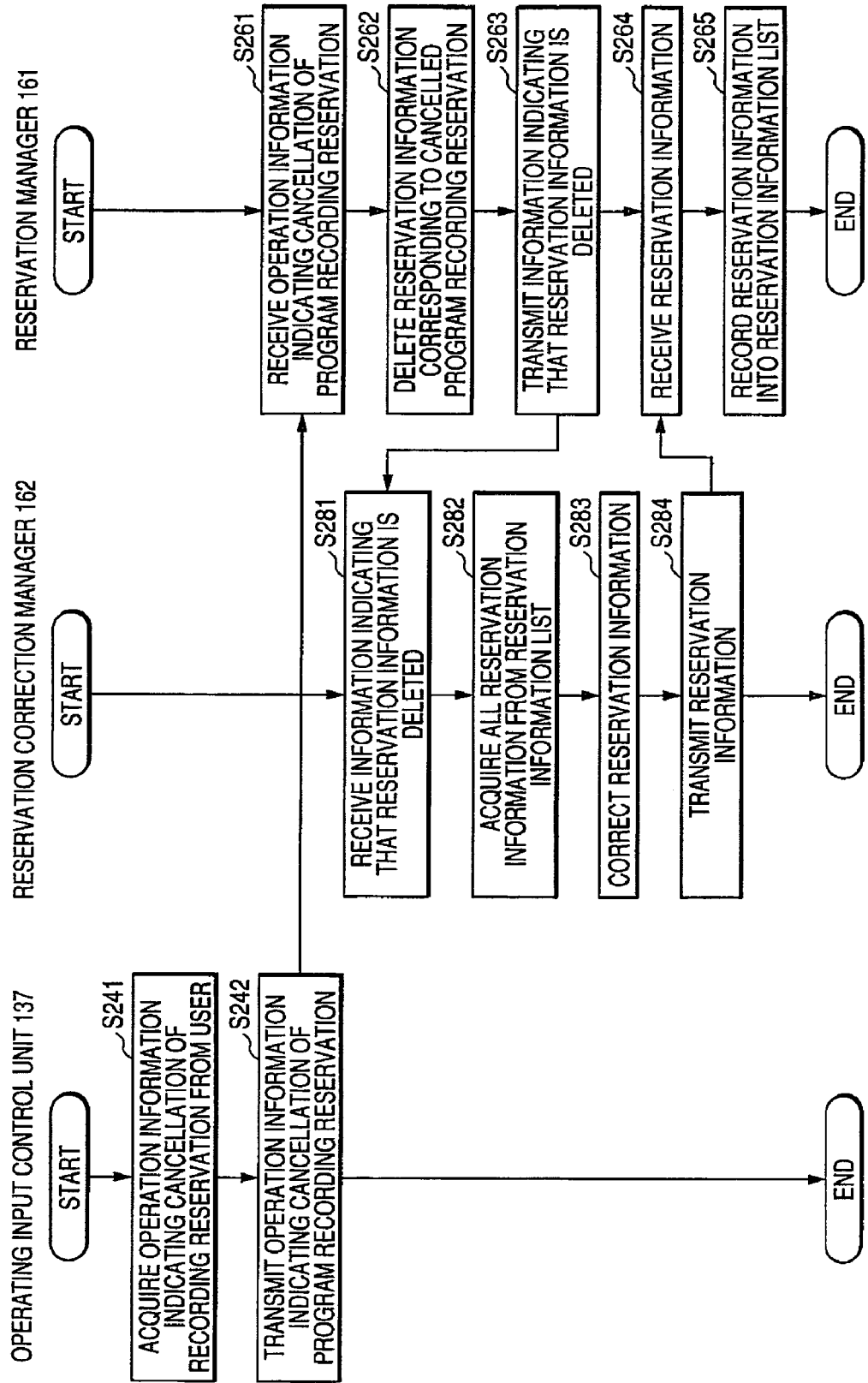
FIG. 8 is a flowchart illustrating a recording reservation cancellation processing.

With reference to a flowchart of FIG. 8, a program recording reservation cancellation processing by the CPU 21 of the HDD video recorder 1, which executes the reserved recording program 121, will be described.

At a step S241, the operation input control unit 137 acquires operation information on an instruction to cancel program recording reservation according to the operation by the user from the input unit 41 or the light-receiving unit 42.

At a step S242, the operation input control unit 137 transmits (outputs) the operation information on the instruction to cancel program recording reservation to the reservation manager 161. After the step S242, the processing by the operation input control unit 137 ends.

At a step S261, the reservation manager 161 receives the operation information on the instruction to cancel program recording reservation, which is transmitted from the operation input control unit 137 through the processing of the step S242.

At a step S262, the reservation manager 161 deletes the reservation information corresponding to program recording reservation instructed to be canceled received through the processing of the step S261 from the reservation information list 163.

At a step S263, the reservation manager 161 transmits, to the reservation correction manager 162, information indicating that the reservation information is deleted.

At a step S281, the reservation correction manager 162 receives the information indicating that the reservation information is deleted, which is transmitted from the reservation manager 161 through the processing of the step S261.

At a step S282, the reservation correction manager 162 acquires all reservation information from the reservation information list 163.

At a step S283, the reservation correction manager 162 corrects the reservation information acquired from the reservation information list 163 through the processing of the step S282.

At a step S284, the reservation correction manager 162 transmits (outputs) the reservation information corrected by the processing of the step S283 to the reservation manager 161. After the step S284, the processing by the reservation correction manager 162 ends.

At a step S264, the reservation manager 161 receives the reservation information transmitted from the reservation correction manager 162 through the processing of the step S284.

At a step S265, the reservation manager 161 records the reservation information received through the processing of the step S264 in the reservation information list 163. After the step S265, the processing of the reservation manager 161 ends.

As such, when the reservation information of one or plural programs is cancelled, the reservation information for reserved recording of another program is corrected.

With reference to a flowchart of FIG. 9, a recording time correction processing by the CPU 21, which executes the reserved recording program 121, when the EIT (schedule) is received, will be described. This processing starts when the HDD video recorder 1 receives the EIT (schedule), serving as EPG data, through the tuner 71 or the communication unit 43.

At a step S301, the reservation correction manager 162 judges whether or not the correction of recording time for program recording reservation is instructed by the user. For example, the user sets a correction flag to "1" so as to instruct to correct recording time or sets the correction flag to "0" so as to instruct not to correct recording time.

At the step S301, if it is judged that the automatic correction of recording time for program recording reservation is set, the process progresses to a step S302, and then the reservation correction manager 162 acquires all reservation information recorded in the reservation information list 163 from the reservation information list 163.

At a step S303, the reservation correction manager 162 sequentially rearranges the reservation information of the reservation information list 163 acquired through the processing of the step S302 from one having late recording start time.

FIG. 10 is a diagram illustrating the rearrangement of the reservation information recorded in the reservation information list 163. Referring to FIG. 10, the processing of the step S302 and the step S303 can be as described below.

Figure 9:
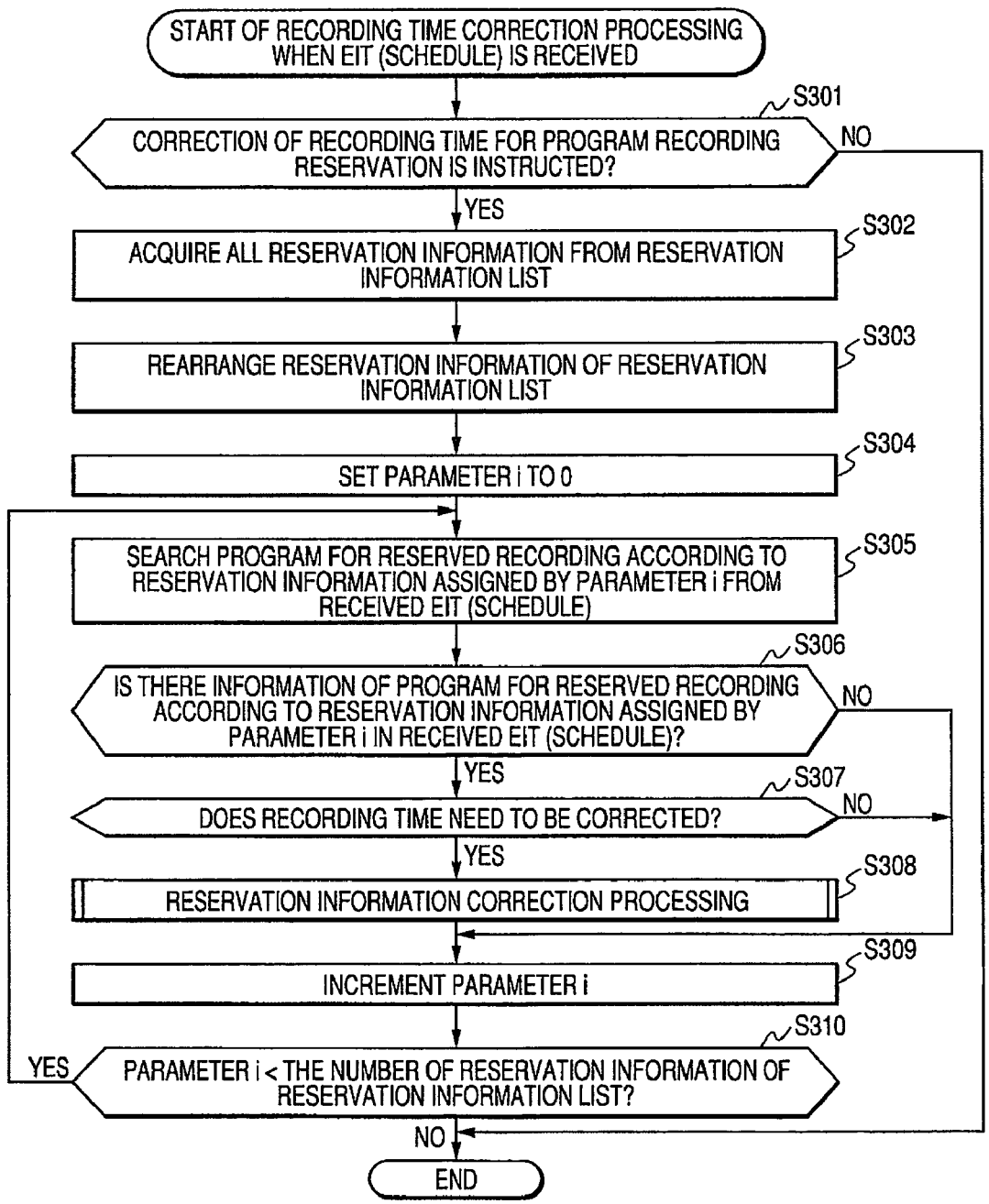
FIG. 9 is a flowchart illustrating a recording time correction processing when an EIT (schedule) is received.

At the step S302 of FIG. 9, for example, all reservation information recorded in the reservation information list 163 on the upper side of FIG. 10, that is, nine kinds of reservation information are acquired. The reservation information includes, for example, three kinds of information of "the program name, recording start time, and recording end time", as shown in FIG. 10.

In the reservation information list 163 shown in FIG. 10, from the above, reservation information in which the program name is PROGRAM A, recording start time is 2004/10/16 5:00, and recording end time is 2004/10/16 8:00, reservation information in which the program name is PROGRAM B, recording start time is 2004/10/16 8:00, and recording end time is 2004/10/16 9:00, reservation information in which the program name is PROGRAM J, recording start time is 2004/10/18 15:00, and recording end time is 2004/10/19 5:00, and reservation information in which the program name is PROGRAM G, recording start time is 2004/10/17 5:00, and recording end time is 2004/10/17 8:00 are recorded.

Further, in the reservation information list 163 shown in FIG. 10, after the fifth from the above, reservation information in which the program name is PROGRAM E, recording start time is 2004/10/17 2:00, and recording end time is 2004/10/17 3:00, reservation information in which the program name is PROGRAM F, recording start time is 2004/10/17 3:00, and recording end time is 2004/10/17 4:00, reservation information in which the program name is PROGRAM C, recording start time is 2004/10/16 9:00, and recording end time is 2004/10/16 11:00, reservation information in which the program name is PROGRAM H, recording start time is 2004/10/17 9:00, and recording end time is 2004/10/17 10:00, and reservation information in which the program name is PROGRAM D, recording start time is 2004/10/16 12:00, and recording end time is 2004/10/16 22:00 are recorded.

At the step S303 of FIG. 9, from one having late recording start time, for example, as shown on the lower side of FIG. 10, the rearrangement of nine kinds of reservation information is performed in an order of the reservation information of the program J, the reservation information of the program H, the reservation information of the program G, the reservation information of the program F, the reservation information of the program E, the reservation information of the program D, the reservation information of the program C, the reservation information of the program B, and the reservation information of the program A from the above.

At a step S304 of FIG. 9, the reservation correction manager 162 set a parameter i to 0. Here, the parameter i is a parameter for designating individual reservation information rearranged through the processing of the step S303. For example, the parameter i (=0) assigns the reservation information of the program J having latest recording start time shown on the lower side of FIG. 10.

At a step S305, the reservation correction manager 162 searches for the information of the program to be reserved for recording by the reservation information assigned by the parameter i from the received EIT (schedule). That is, for example, when the parameter i (=0) assigns the program J (the reservation information thereof), the information of the program J, that is, broadcast start time and broadcast end time of the program J, is searched from the EIT (schedule).

For example, the information of the program assigned by the parameter i is searched from the EIT (schedule) on the basis of the program name included in the EIT. Further, when the event ID for each program included in the EIT (schedule) is stored in the reservation information, the information of the program to be reserved for recording by the reservation information may be searched from the EIT (schedule) on the basis of the event ID.

At a step S306, the reservation correction manager 162 judges whether or not the information of the program to be reserved for recording by the reservation information assigned by the parameter i exists in the received EIT (schedule).

At the step S306, if it is judged that the information of the program to be reserved for recording by the reservation information assigned by the parameter i exists in the received EIT (schedule), the process progresses to a step S307, and then the reservation correction manager 162 judges whether or not recording time needs to be corrected. That is, for example, at the step S307, when recording start time in the reservation information and broadcast start time in the EIT (schedule), recording end time in the reservation information and broadcast end time in the EIT (schedule), or both are different, it is judged that recording time needs to be corrected. When both are the same, it is judged that recording time does not need to be corrected.

At the step S307, if it is judged that recording time needs to be corrected, the process progresses to a step S308, and a reservation information correction processing is executed. The details of this processing will be described below with reference to a flowchart of FIG. 13. With this processing, one or both of recording start time and recording end time in the reservation information is corrected.

At a step S309, the parameter i is incremented by one. That is, when the parameter i is "0", the parameter i becomes "1".

At a step S310, the reservation correction manager 162 judges whether or not the parameter i is smaller than the number of reservation information of the reservation information list 163.

At the step S310, if it is judged that the parameter i is smaller than the number of reservation information of the reservation information list 163, the process returns to the step S305, and then the above-described processing is repeated.

For example, at the step S305, when the parameter i is "1", the reservation information of the program H shown in FIG. 10 is assigned, and the program H (the information thereof) in the EIT (schedule) is searched.

At the step S310, when it is judged that the parameter i is not smaller than (equal to) the number of reservation information of the reservation information list 163, the process ends.

At the step S307, when it is judged that recording time does not need to be corrected, that is, when there is no change in broadcast time of the program to be reserved for recording by the reservation information assigned by the current parameter i, the processing of the step S308 is skipped, the process progresses to the step S309, and then the above-described processing is repeated.

At the step S306, when it is judged that the information to be reserved for recording by the reservation information assigned by the parameter i does not exist in the received EIT (schedule), the processing of the step S307 and the step S308 is skipped, the process progresses to the step S309, and then the above-described processing is repeated.

At the step S301, when it is judged that the correction of recording time for program recording reservation is not instructed, it is judged that the user does not want that recording time is automatically corrected, and then the process ends.

As such, the reservation information recorded in the reservation information list 163 is sequentially rearranged from one having late recording start time. Next, it is judged whether or not broadcast time of the program (broadcast start time and broadcast end time) are changed with reference to EPG data (EIT) sequentially from one having late recording start time. Subsequently, the reservation information is sequentially corrected from one having late recording start time.

FIG. 11 is a diagram illustrating the movement of the reservation information when the reservation information is sequentially corrected from one having late recording start time.

As shown in FIG. 11, as for recording time of the program prior to the correction of the reservation information, that is, as for recording time of the program to be reserved before new EPG data is received, it is assumed that a program $B_1$ is reserved to be recorded from 17:00 to 18:00, a program $C_1$ is reserved to be recorded from 18:00 to 19:00, a program $D_1$ is reserved to be recorded from 19:00 to 20:00, and a program $E_1$ is reserved to be recorded from 20:30 to 21:30.

At this time, as for the composition of broadcast time of the program after EPG update, that is, as for the composition of broadcast time of the program included in EPG data, it is assumed that the program $A_1$ is broadcasted from 17:00 to 17:30, the program $B_1$ is broadcasted from 17:30 to 18:30, the program $C_1$ is broadcasted from 18:30 to 19:30, the program $D_1$ is broadcasted from 19:30 to 20:30, and the program $E_1$ is broadcasted from 21:00 to 22:00.

On the basis of the composition of broadcast time of the program after the EPG update, for the first correction of recording time, the reservation information is corrected through the processing of the step S308 of FIG. 9 such that the program $E_1$ is recorded from 21:00 to 22:00.

Further, on the basis of the composition of broadcast time of the program after the EPG update, for the second correction of recording time, the reservation information is corrected through the processing of the step S308 of FIG. 9 such that the program $D_1$ is recorded from 19:30 to 22:30.

Therefore, recording time (reservation information) of the program shown in FIG. 11 is corrected suitably (according to broadcast time of the program after the EPG update) by performing the processing (the processing of the step S308 of FIG. 9) four times. That is, the reservation information is made such that the program $B_1$ is recorded from 17:30 to 18:30, the program $C_1$ is recorded from 18:30 to 19:30, the program $D_1$ is recorded from 19:30 to 20:30, and the program $E_1$ is recorded from 21:00 to 22:00.

FIG. 12 is a diagram illustrating the movement of the reservation information when the reservation information is sequentially corrected from one having early recording start time. In FIG. 12, "RECORDING TIME OF PROGRAM PRIOR TO CORRECTION OF RESERVATION INFORMATION" and "COMPOSITION OF BROADCAST TIME OF PROGRAM AFTER EPG UPDATE" are the same as those in FIG. 11, and thus the descriptions thereof will be omitted.

If the reservation information of the program is corrected from one having early recording start time, as for the first correction of recording time on the basis of the composition of broadcast time of the program after the EPG update, since broadcast time of the program $B_1$ to be broadcasted from 17:30 to 18:30 overlaps recording time of the program $C_1$ to be recorded from 18:00 to 19:00, the reservation information (recording start time and recording end time) is corrected such that the program $B_1$ is recorded from 17:30 to 18:00 through the processing of the step S308 of FIG. 9, for example.

In addition, as for the second correction of recording time on the basis of the composition of broadcast time of the program after the EPG update, since broadcast time of the program $C_1$ to be broadcasted from 18:30 to 19:30 overlaps recording time of the program $D_1$ to be recorded from 19:00 to 20:00, the reservation information (recording start time and recording end time) is corrected such that the program $C_1$ is recorded from 18:30 to 19:00 through the processing of the step S308 of FIG. 9, for example.

Further, at this time, since the program $C_1$ is broadcasted from 18:30 to 19:30, recording time of the program $B_1$, the reservation information (recording time) of which was corrected to be recorded from 17:30 to 18:00, needs to be corrected again to be recorded from 17:30 to 18:30. That is, the processing of the step S308 of FIG. 9 needs to be performed again. The same can be applied to the program $C_1$.

Therefore, as shown in FIG. 12, as compared with the case in which recording time (reservation information) is sequentially corrected from the program having early recording start time, in the case in which recording time (reservation information) is sequentially corrected from the program having late recording start time, recording time (reservation information) of the program can be suitably corrected with the small number of processing times, that is, earlier, as shown in FIG. 11.

With reference to a flowchart of FIG. 13, a reservation information correction processing corresponding to the processing of the step S308 of FIG. 9 will be described.

At a step S321, the reservation correction manager 162 judges whether or not the program whose recording time needs to be corrected is in recording. At the step S321, when it is judged that the program whose recording time needs to be corrected is in recording, the process progresses to a step S322. At the step S322, a reservation information correction processing when the program whose recording time needs to be corrected is in recording is executed. The details of this processing will be described below with reference to a flowchart of FIG. 14. With this processing, recording end time in the reservation information of the program in recording is corrected.

At the step S321, when it is judged that the program whose recording time needs to be corrected is not in recording, the process progresses to a step S323. At the step S323, a reservation information correction processing when the program whose recording time needs to be corrected is not in recording is executed. The details of this processing will be described with reference to FIG. 27. With this processing, one or both of recording start time and recording end time in the reservation information of the program, which is not in recording, is corrected.

After the step S322 or the step S323, the process returns to the step S309 of FIG. 9, and then the above-described processing is executed.

With reference to the flowchart of FIG. 14, the reservation information correction processing, corresponding to the step S322 of FIG. 13, when the program whose recording time needs to be corrected is in recording will be described.

At a step S341, the recording manager 136 acquires all reservation information included in the reservation information list 163 and the EIT (schedule) from the reservation correction manager 162, and, on the basis of the acquired reservation information and EIT (schedule), judges whether or not there is the program to be recorded, recording time of which overlaps due to the change in broadcast time. That is, it is judged whether or not changed broadcast time of the program overlaps recording time of another program.

More specifically, at the step S341, the recording manager 136 judges whether or not recording time when the program to be reserved for recording by the reservation information assigned by the parameter i is recorded from broadcast start time to broadcast end time in changed broadcast time overlaps recording time of the program to be reserved for recording by another reservation information.

At the step S341, when it is judged that there is the program to be recorded, recording time of which overlaps due to the change in broadcast time, the process progresses to a step S342, and then the recording manager 136 judges whether or not recording of the program with changed broadcast time is caused by automatic recording. That is, at the step S342, it is judged whether or not the program in recording whose reservation information is to be corrected is the program to be reserved for automatic recording by the HDD video recorder 1 on the basis of the user's preference.

Further, when the user causes a manual reservation flag, which indicates whether or not recording of the program is reserved to be recorded manually, that is, by use of the input unit 41 or the remote controller 51, in the reservation information, the judgment processing of the step S342 is executed on the basis of the manual reservation flag. For example, when "0" is set for the manual reservation flag, program recording is indicated to be manually reserved by the user. Further, when "1" is set for the manual reservation flag, program recording is indicated to be automatically reserved by the HDD video recorder 1 on the basis of the user's preference.

At the step S342, when it is judged that recording of the program with changed broadcast time is not caused by automatic recording, the process progresses to a step S343, and then the recording manager 136 judges whether or not the program with changed broadcast time is a charged program, which is charged for watching.

When information (descriptor) indicating the charged program (paid program) is included in the EIT, the processing of the step S343 is executed on the basis of the information (descriptor). Further, when the information indicating the charged program is not included in the EIT, the judgment processing of the step S343 causes a charged program flag, which indicates whether or not the program is the charged program which is charged for watching and recording, to be recorded in the reservation information. For example, when "0" is set for the charged program flag, the program to be reserved for recording is indicated to be the charged program. Further, when "1" is set for the charged program flag, the program to be reserved for recording is indicated to be a free program which is free for watching or recording.

At the step S343, when it is judged that the program with changed broadcast time is the charged program, the process progresses to a step S344, and then a reservation information correction processing on the charged program in recording is executed. The details of this processing will be described below with reference to a flowchart of FIG. 17. With this processing, recording end time in the reservation information of the charged program in recording is corrected.

After the step S344, the process returns to the step S309 of FIG. 9, and then the above-described processing is executed.

At the step S341, when it is judged that there is no program to be recorded, recording time of which overlaps due to the change in broadcast time, the process progresses to a step S345, and then the recording manager, 136 corrects recording end time of the reservation information to broadcast end time of changed broadcast time.

Hereinafter, the reservation information correction will be specifically described with reference to FIGS. 15, 16, 18 to 21, and 23 to 26. In FIGS. 15, 16, 18 to 21, and 23 to 26, straight lines with "T" appended thereto represent time. In the drawings, numerals appended to the first straight line with "T" appended thereto represent specified time. In FIGS. 15, 16, 18 to 21, and 23 to 26, in a second straight line with "T" appended thereto from the above, "RECORDING TIME OF PROGRAM PRIOR TO CORRECTION OF RESERVATION INFORMATION" represents recording time recorded in the reservation information of each program before new EPG data is received, that is, recording start time and recording end time of the program.

In FIGS. 15, 16, 18 to 21, and 23 to 26, in a third straight line with "T" appended thereto from the above, "BROADCAST TIME OF PROGRAM AFTER EPG UPDATE" represents broadcast time (the composition thereof) by newly received EPG data (newest EPG data), that is, broadcast start time and broadcast end time of the program. In FIGS. 15, 16, 18 to 21, and 23 to 26, in a fourth (lowest) straight line with "T" appended thereto from the above, "RECORDING TIME OF PROGRAM AFTER CORRECTION OF RESERVATION INFORMATION" represents recording start time and recording end time in the corrected reservation information of each program on the basis of the newest EPG data and represents recording time of the program recording time of the program which is controlled by the recording manager 136 to be recorded.

Further, in FIGS. 15, 16, 18 to 21, and 23 to 26, "FREE PROGRAM" represents a program which is free for watching. "CHARGED PROGRAM" represents which is charged for watching. "AUTOMATIC RECORDING RESERVATION PROGRAM" represents a program to be reserved for automatic recording by the HDD video recorder 1 on the basis of the user's preference. "PROGRAM" represents one of "FREE PROGRAM", "CHARGED PROGRAM", and "AUTOMATIC RECORDING RESERVATION PROGRAM" described above.

In addition, in the program to be subjected to the correction of the reservation information, an alphabet "B" is provided, like "PROGRAM B". Further, for simple description, the reservation information correction processing is classified, and the program to be subjected to the classified processing is distinguished by an inferior figure appended to the alphabet symbol, like PROGRAM $B_{11-1}$ or the like.

Figure 15:
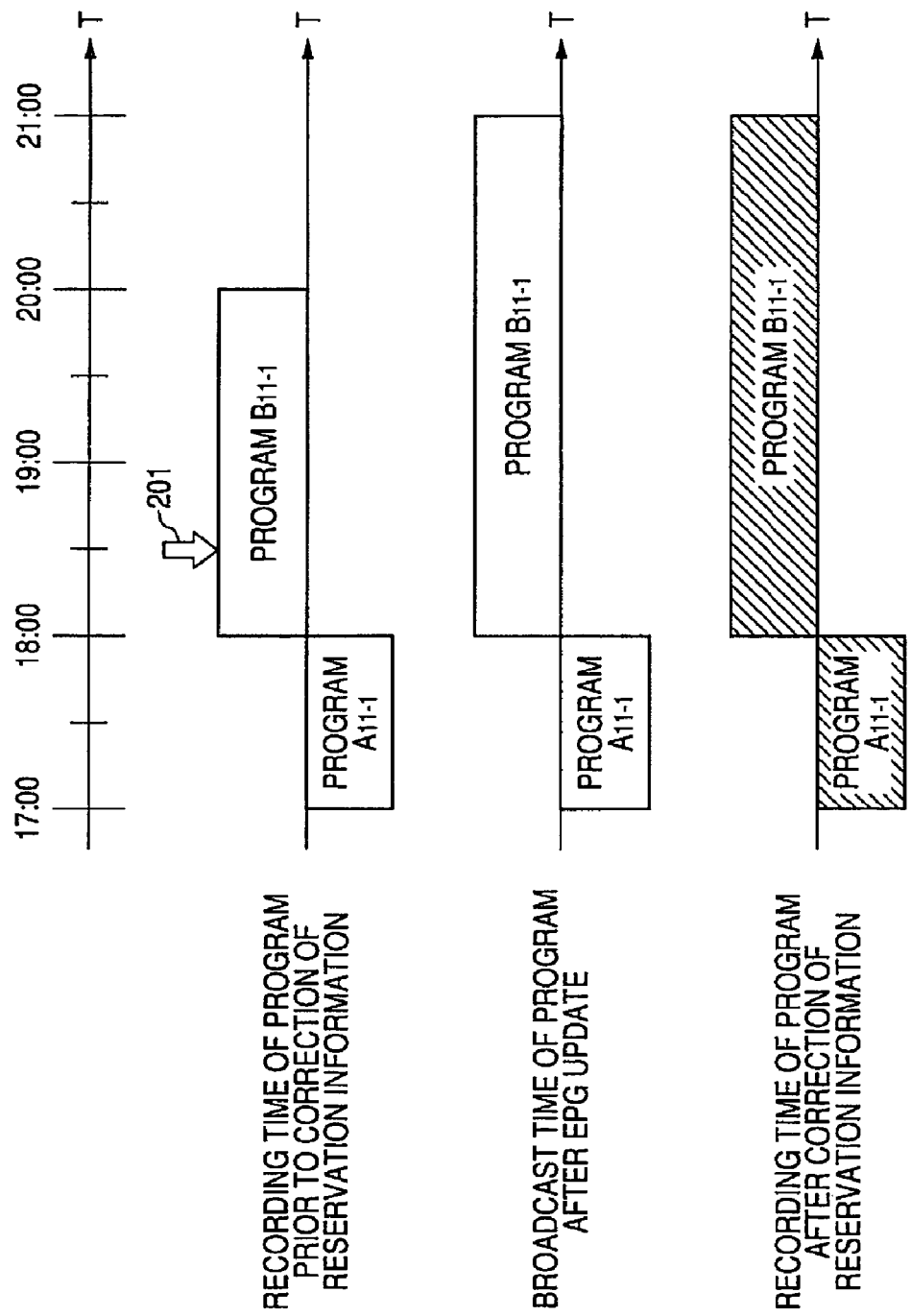
FIG. 15 is a diagram illustrating correction of reservation information on a program whose recording time does not overlap.

Here, the processing of the step S345 will be described below with reference to FIG. 15 or FIG. 16, for example. As shown in FIG. 15, it is assumed that, before new EPG data is received, the reservation information of the program $A_{11-1}$ whose recording start time is 17:00 and recording end time is 18:00 is recorded in the reservation information list 163, and the reservation information of the program $B_{11-1}$ whose recording start time is 18:00 and recording end time is 20:00 is recorded in the reservation information list 163.

At this time, it is assumed that, when the program $B_{11-1}$ is in recording, at 18:30 indicated by an arrow 201, for example, the EIT (schedule) as EPG data is received. In the received EIT (schedule), when broadcast end time of the program $B_{11-1}$ in broadcast (in recording) at present is 21:00, that is, when broadcast time of the program $B_{11-1}$ after the EPG update is changed from 18:00 to 21:00, the recording manager 136 sets 21:00, which is broadcast end time of the program $B_{11-1}$, as recording end time of the reservation information of the program $B_{11-1}$.

Accordingly, after the correction of the reservation information, recording start time of the program $B_{11-1}$ is 18:00, and recording end time thereof is 21:00.

Therefore, the recording manager 136 controls recording such that the program $A_{11-1}$ is recorded from 17:00 to 18:00. In addition, the recording manager 136 controls recording such that the program $B_{11-1}$ is recorded from 18:00 to 21:00.

Moreover, for convenience, when EPG data is received at 18:30 indicated by the arrow 201, the case in which the reservation information of the program $A_{11-1}$ exists in the reservation information list 163 has been described, but, at the point of time of 18:30, the reservation information of the program $A_{11-1}$ may be deleted from the reservation information list 163.

Figure 16:
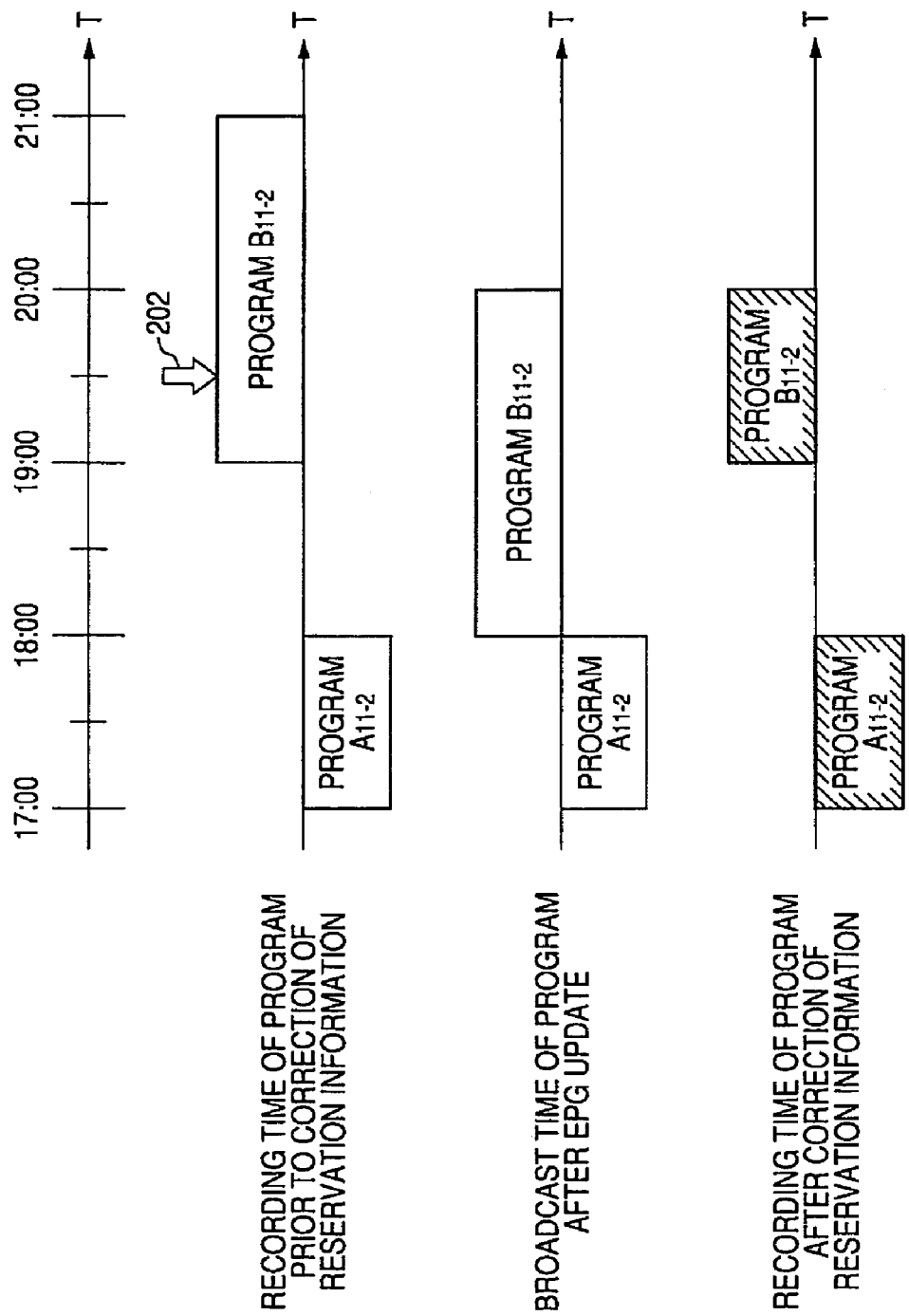
FIG. 16 is a diagram illustrating correction of reservation information on a program whose recording time does not overlap.

Further, as shown in FIG. 16, it is assumed that, before new EPG data is received, the reservation information of the program $A_{11-2}$ whose recording start time is 17:00 and recording end time is 18:00 is recorded in the reservation information list 163, and the reservation information of the program $B_{11-2}$ whose recording start time is 19:00 and recording end time is 21:00 is recorded in the reservation information list 163.

At this time, it is assumed that, when the program $B_{11-2}$ is in recording, at 19:30 indicated by an arrow 202, for example, the EIT (schedule) as EPG data is received. In the received EIT (schedule), when broadcast start time of the program $B_{11-2}$ in broadcast (in recording) at present is 18:00 and broadcast end time thereof is 20:00, that is, when broadcast time of the program $B_{11-2}$ after the EPG update is changed from 18:00 to 20:00, the recording manager 136 sets 20:00, which is broadcast end time of the program $B_{11-2}$, as recording end time of the reservation information of the program $B_{11-2}$.

Accordingly, after the correction of the reservation information, recording start time of the program $B_{11-2}$ is 19:00, and recording end time thereof is 20:00.

Therefore, the recording manager 136 controls recording such that the program $A_{11-2}$ is recorded from 17:00 to 18:00. In addition, the recording manager 136 controls recording such that the program $B_{11-2}$ is recorded from 19:00 to 20:00.

Moreover, for convenience, when EPG data is received at 19:30 indicated by the arrow 202, the case in which the reservation information of the program $A_{11-2}$ exists in the reservation information list 163 has been described, but, at the point of time of 19:30, the reservation information of the program $A_{11-2}$ may be deleted from the reservation information list 163.

As such, when there is no program whose recording time overlaps, the reservation information is corrected such that changed broadcast time is set to recording end time.

After the step S345, the process returns to the step S309 of FIG. 9, and then the above-described processing is executed.

At the step S342, when it is judged that recording of the program with changed broadcast time is caused by automatic recording, the process progresses to a step S346, and then the recording manager 136 stops recording of the program caused by automatic recording with changed broadcast time.

Moreover, when recording of the program by automatic recording stops, the recording manager 136 may delete the automatic recording reservation program (the contents thereof) recorded till then.

After the step S346, the process returns to the step S309 of FIG. 9, and then the above-described processing is executed.

At the step S343, when it is judged that the program with changed broadcast time is not the charged program, that is, when the program with changed broadcast time is the free program which can be watched free, the process progresses to a step S347, and then the reservation information correction processing on the free program in recording is executed. The details of this processing will be described below with reference to a flowchart of FIG. 22. With this processing, recording end time in the reservation information of the free program in recording is corrected or recording stops.

After the step S347, the process returns to the step S309 of FIG. 9, and then the above-described processing is executed.

With reference to the flowchart of FIG. 17, the reservation information correction processing on the charged program in recording, which corresponds to the step S344 of FIG. 14, will be described.

At a step S371, on the basis of the reservation information and the EIT (schedule), in broadcast time of the program in recording, the recording manager 136 judges whether or not a rear part of changed broadcast time overlaps recording time of another program. That is, in broadcast time of the program in recording, it is judged whether or not broadcast end time of changed broadcast time is the time within recording time of another program.

More specifically, at the step S371, the recording manager 136 judges whether or not recording end time in recording time when recording is performed from broadcast start time to broadcast end time in changed broadcast time, which is broadcast time of the program in recording at present, is the time within recording time of the program to be reserved for recording by another reservation information.

At the step S371, in broadcast time of the program in recording, when it is judged that the rear part of changed broadcast time overlaps recording time of another program, the process progresses to a step S372, and then the recording manager 136 corrects recording end time of the reservation information to broadcast end time of changed broadcast time for the program in recording.

At a step S373, the recording manager 136 judges whether or not another program whose recording time overlaps is the charged program. As described above in the processing of the step S343, the processing of the step S373 is executed on the basis of information (descriptor) of another program, recording time of which overlaps, indicating the charged program (paid program) included in the EIT or the charged program flag, which is included in the reservation information, indicating whether or not another program is the charged program which is charged for watching and recording.

At the step S373, when it is judged that another program whose recording time overlaps is not the charged program, that is, when another program whose recording time overlaps is the free program, the process progresses to a step S374, and then the recording manager 136 corrects overlap recording start time of another program to broadcast end time of the program with changed broadcast time.

Figure 18:
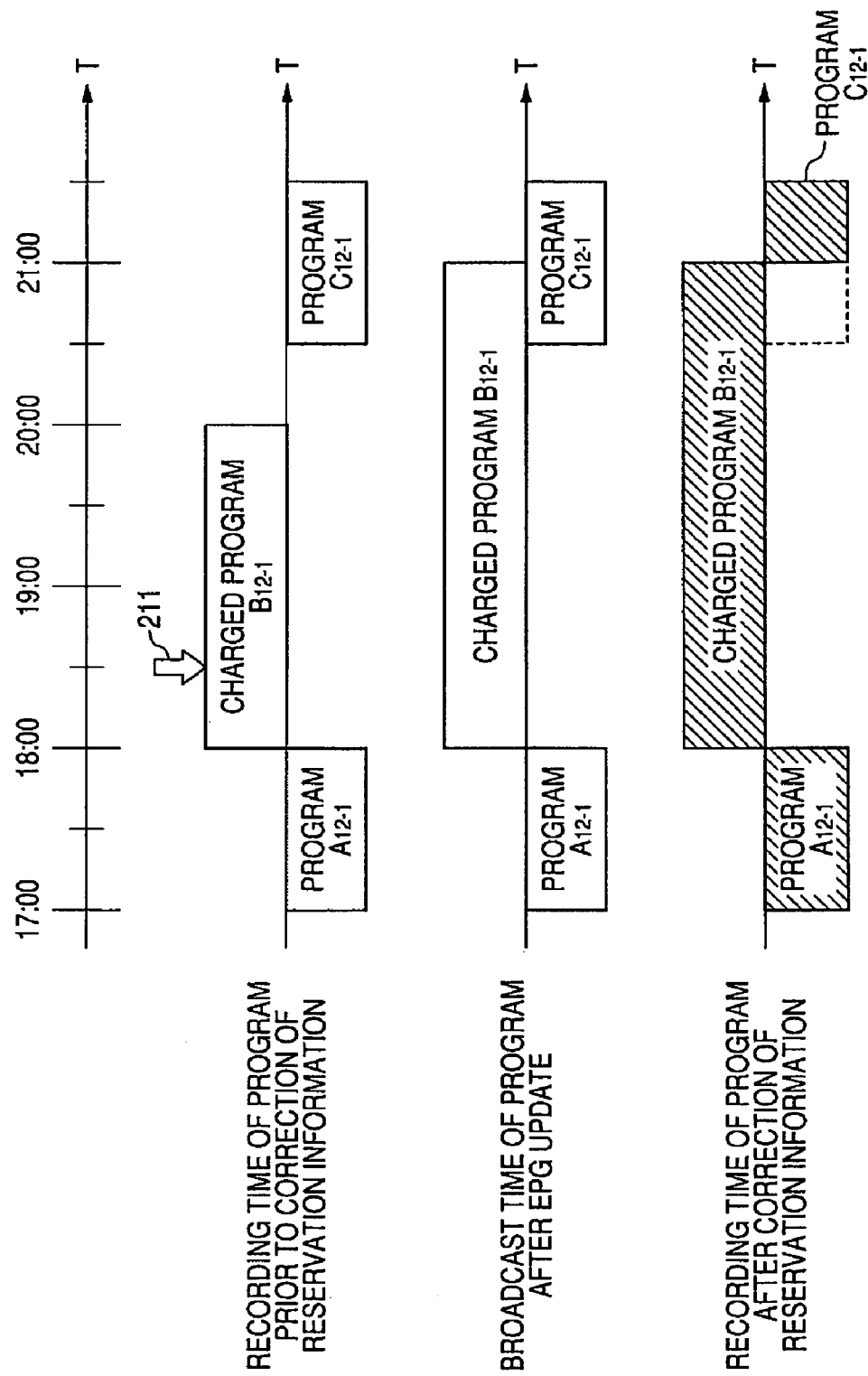
FIG. 18 is a diagram illustrating correction of reservation information on a charged program in recording.

Here, the processing of the step S372 to the step S374 will be described with reference to FIG. 18. For example, as shown in FIG. 18, it is assumed that, before new EPG data is received, the reservation information of the program $A_{12-1}$ whose recording start time is 17:00 and recording end time is 18:00 is recorded in the reservation information list 163, the reservation information of the program $B_{12\text{-}1}$ whose recording start time is 18:00 and recording end time is 20:00 is recorded in the reservation information list 163, and the reservation information of the program $C_{12\text{-}1}$ whose recording start time is 20:30 and recording end time is 21:30 is recorded in the reservation information list 163.

At this time, it is assumed that, when the charged program $B_{12\text{-}1}$ is in recording, at 18:30 indicated by an arrow 211, for example, the EIT (schedule) as EPG data is received. In the received EIT (schedule), when broadcast end time of the program $B_{12\text{-}1}$ in broadcast (in recording) at present is 21:00, that is, when broadcast time of the program $B_{12\text{-}1}$ after the EPG update is changed from 18:00 to 21:00, the recording manager 136 sets 21:00, which is broadcast end time of the program $B_{12\text{-}1}$, as recording end time of the reservation information of the program $B_{12\text{-}1}$.

This is because a recording priority of the charged program whose recording starts is set higher than a recording priority of the next program $C_{12\text{-}1}$ whose recording does not start. The priority is set in the reserved recording program 121 through the judgment processing of the reserved recording program 121 and the processing to be executed according to the judgment result. The charged program is normally charged at the time when recording starts. For this reason, the recording priority of the charged program $B_{12\text{-}1}$ whose recording already starts is set higher than the recording priority of the program $C_{12\text{-}1}$ whose recording does not start yet.

Moreover, a table representing the priority of the program may be additionally provided, such that the reserved recording program 121 can determine a processing to be executed on the basis of the priority represented by the table.

Further, when the program $C_{12\text{-}1}$ is the free program, the recording manager 136 sets 21:00, which is broadcast end time of the program $B_{12\text{-}1}$, as recording start time in the reservation information of the program $C_{12\text{-}1}$ through the processing of the step S374.

Accordingly, after the correction of the reservation information, recording start time in the reservation information of the charged program $B_{12\text{-}1}$ is 18:00 and recording end time therein is 21:00. Further, recording start time in the reservation information of the program $C_{12\text{-}1}$ is 21:00 and recording end time therein is 21:30.

Therefore, the recording manager 136 controls recording such that the program $A_{12\text{-}1}$ is recorded from 17:00 to 18:00. Further, the recording manager 136 controls recording such that the charged program $B_{12\text{-}1}$ is recorded from 18:00 to 21:00. In addition, the recording manager 136 controls recording such that the program $C_{12\text{-}1}$ is recorded from 21:00 to 21:30.

Moreover, for convenience, when EPG data is received at 18:30 indicated by the arrow 211, the case in which the reservation information of the program $A_{12\text{-}1}$ exists in the reservation information list 163 has been described, but, at the point of time of 18:30, the reservation information of the program $A_{12\text{-}1}$ may be deleted from the reservation information list 163.

As such, when there is the program whose recording time overlaps and the program in recording to be subjected to the correction of the reservation information is the charged program, the reservation information is corrected such that changed broadcast time is set to recording end time. Further, when the program in recording is the charged program, recording end time of the charged program after the correction of the reservation information is later than recording start time of the next program to be reserved for recording and is earlier than recording end time of that program, and the next program to be reserved for recording is the free program, the reservation information of the free program is corrected such that recording end time (broadcast end time) of the charged program in recording is set to recording start time of the free program.

Figure 17:
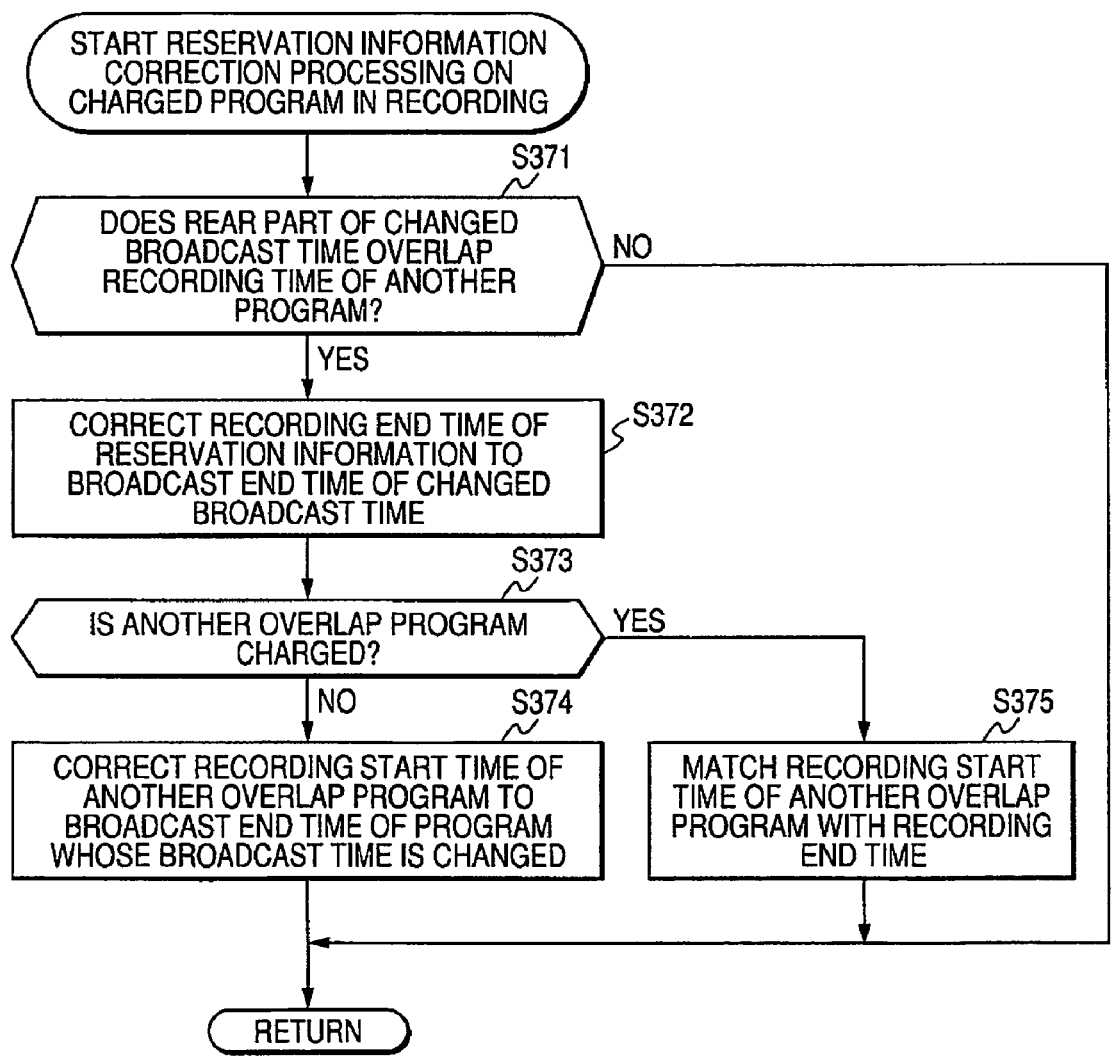
FIG. 17 is a flowchart illustrating reservation information correction processing on a charged program in recording.

At the step S373 of FIG. 17, when it is judged that another program whose recording time overlaps is the charged program, the process progresses to the step S375, and then the recording manager 136 sets overlap recording start time of another program to recording end time. That is, for example, when the program $C_{12\text{-}1}$ shown in FIG. 18 is the charged program, recording start time and recording end time in the reservation information of the program $C_{12\text{-}1}$ are set equal to each other. In FIG. 18, through the processing of the step S375, for example, the recording manager 136 maintains recording start time of the program $C_{12\text{-}1}$ to 20:30 and sets 20:30, which is recording start time of the program $C_{12\text{-}1}$, as recording end time of the program $C_{12\text{-}1}$.

At this time, the program $C_{12\text{-}1}$, which is the charged program, is not recorded (recording time becomes zero minute).

As such, when the program in recording is the charged program, recording end time of the charged program after the correction of the reservation information is later than recording start time of the next program to be reserved for recording and is earlier than recording end time of that program, and the next program to be reserved for recording is the charged program, the reservation information is corrected such that recording start time and recording end time in the reservation information of that charged program are equal to each other.

After the processing of the step S374 or the step S375, the process returns to the step S309 of FIG. 9, and then the above-described processing is executed.

At the step S371, when it is judged that, in broadcast time of the program in recording, the rear part of changed broadcast time does not overlap recording time of another program, the reservation information of the charged program is not corrected, and the process returns to the step S309 of FIG. 9.

Figure 20:
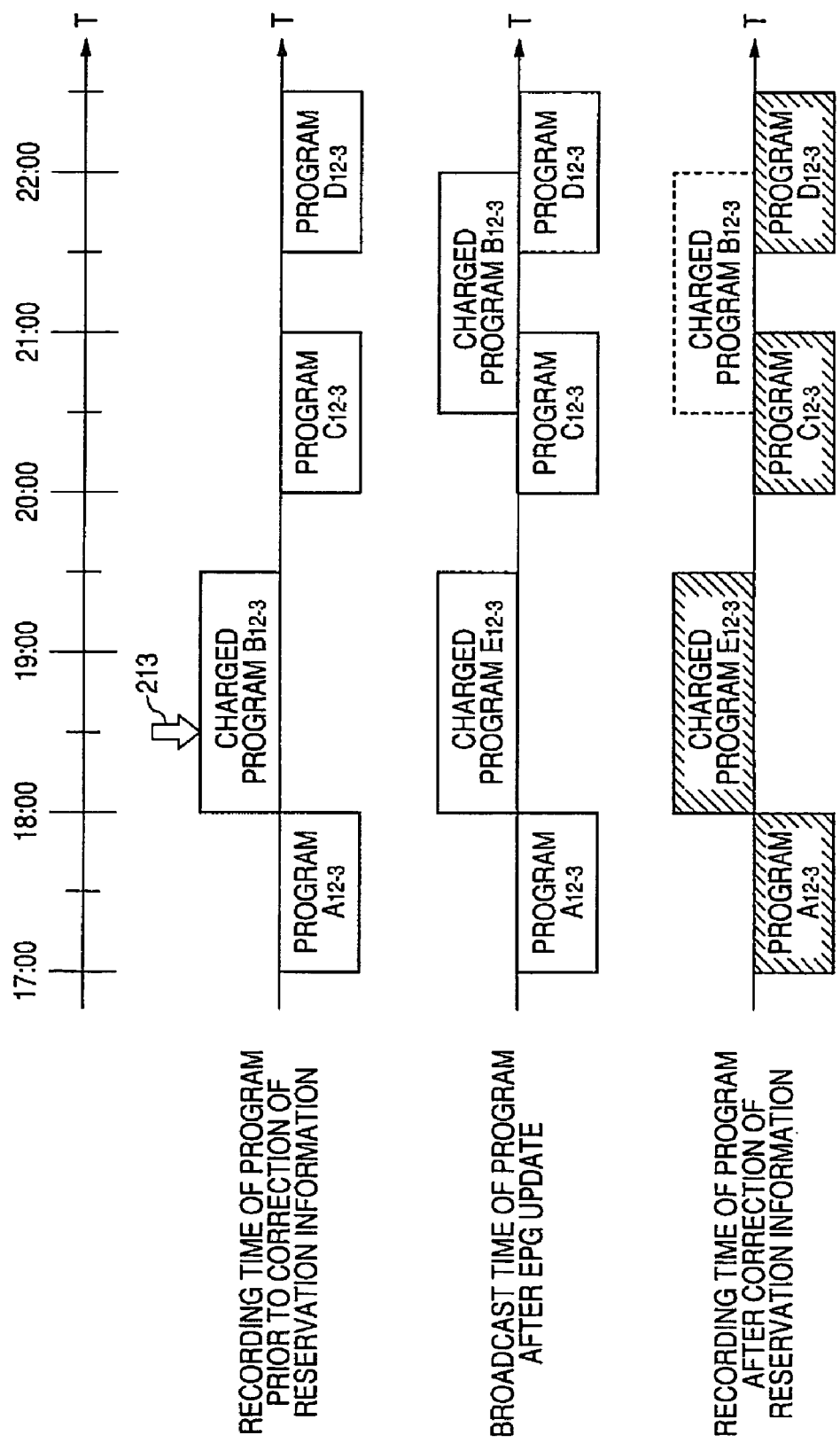
FIG. 20 is a diagram illustrating correction of reservation information on a charged program in recording.
Figure 21:
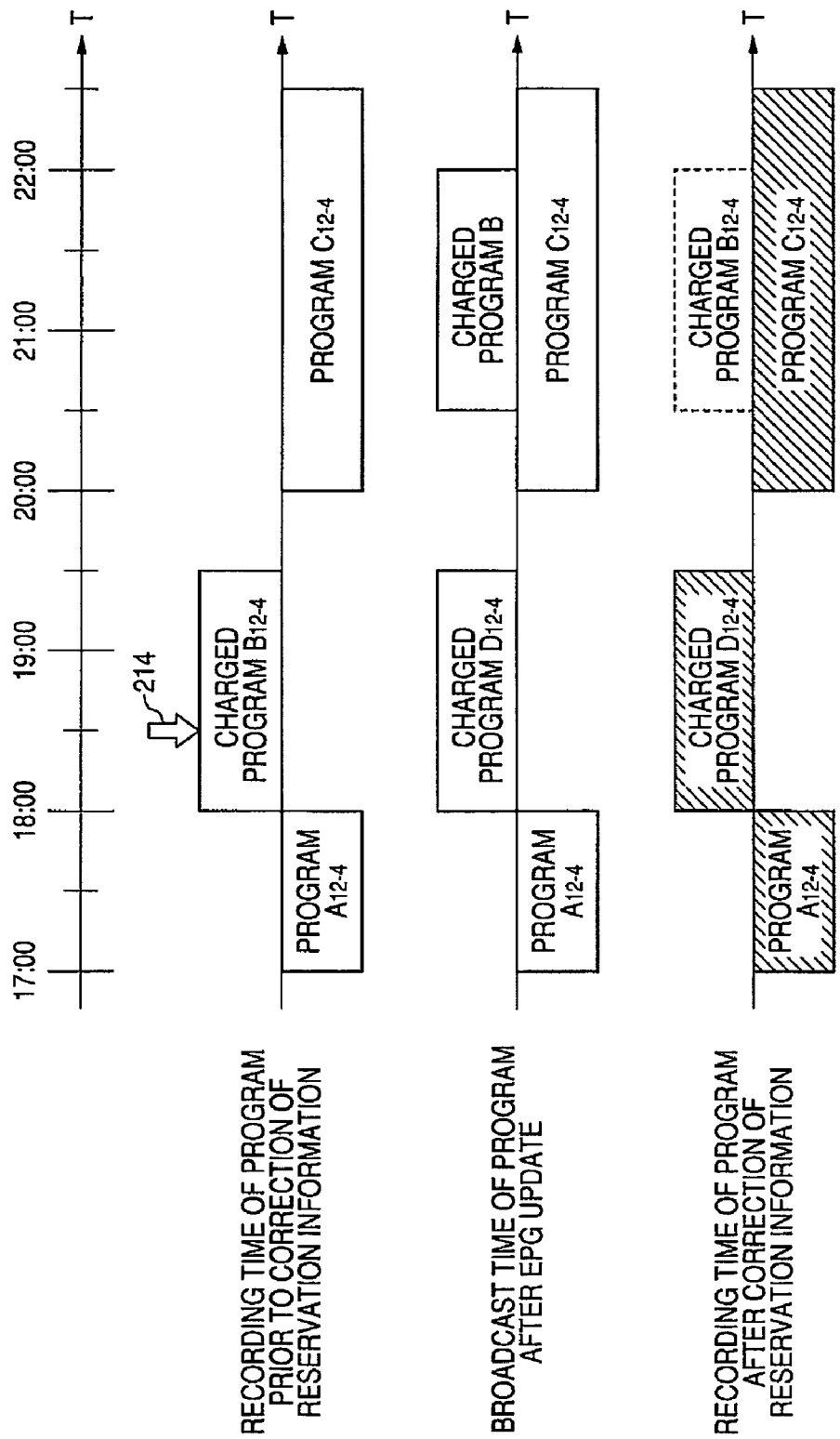
FIG. 21 is a diagram illustrating correction of reservation information on a charged program in recording.

In the processing of the step S371, when it is judged that the rear part of changed broadcast time does not overlap recording time of another program, the reservation information of the charged program is not corrected. This is because the situations shown FIGS. 19 to 21 are considered.

Figure 19:
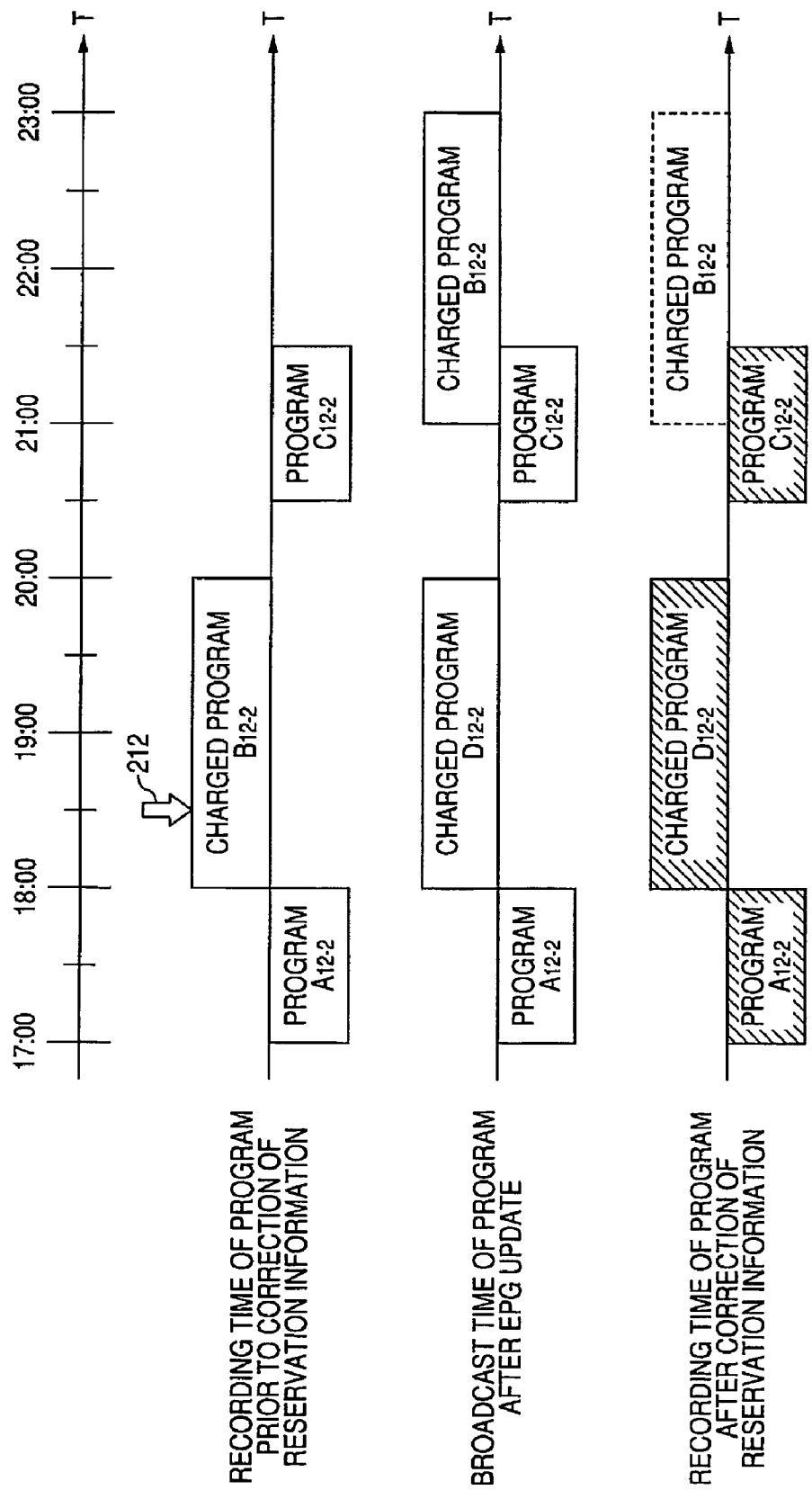
FIG. 19 is a diagram illustrating correction of reservation information on a charged program in recording.

For example, as shown in FIG. 19, it is assumed that, before new EPG data is received, the reservation information of the program $A_{12\text{-}2}$ whose recording start time is 17:00 and recording end time is 18:00 is recorded in the reservation information list 163, the reservation information of the program $B_{12\text{-}2}$ whose recording start time is 18:00 and recording end time is 20:00 is recorded in the reservation information list 163, and the reservation information of the program $C_{12\text{-}2}$ whose recording start time is 20:30 and recording end time is 21:30 is recorded in the reservation information list 163.

At this time, it is assumed that, at 18:30, indicated by the arrow 211, when the charged program $B_{12\text{-}2}$ which must be in recording, for example, the EIT (schedule) as EPG data is received.

In the received EIT (schedule), when broadcast start time of the charged program $B_{12\text{-}2}$ which must be in broadcast (in recording) at present is 21:00 and broadcast end time thereof is 23:00, that is, when broadcast time of the charged program $B_{12\text{-}2}$ after the EPG update is changed from 21:00 to 23:00, the recording manager 136 does not correct the reservation information of the charged program $B_{12\text{-}2}$.

The reason why the reservation information of the charged program $B_{12\text{-}2}$ is not corrected is that, at the point of time of 18:30, the charged program $D_{12\text{-}2}$ whose broadcast time is from 18:00 to 20:00 is broadcasted and recording of the charged program $D_{12-2}$ already starts. That is, the reason is that the fee is already charged for recording of the charged program $D_{12-2}$, and thus the charged program $D_{12-2}$ continues to be recorded to 20:00 unchanged.

Therefore, after the correction of the reservation information, recording start time in the reservation information of the charged program $B_{12-2}$ is 18:00 unchanged and recording end time therein is 20:00 unchanged.

The recording manager 136 controls recording such that the program $A_{12-2}$ is recorded from 17:00 to 18:00. Further, the recording manager 136 controls recording such that the program $D_{12-2}$ is recorded from 18:00 to 20:00. In addition, the recording manager 136 controls recording such that the program $C_{12-2}$ is recorded from 20:30 to 21:30.

Moreover, for convenience, when EPG data is received at 18:30 indicated by an arrow 212, the case in which the reservation information of the program $A_{12-2}$ exists in the reservation information list 163 has been described, but, at the point of time of 18:30, the reservation information of the program $A_{12-2}$ may be deleted from the reservation information list 163.

Further, for example, as shown in FIG. 20, it is assumed that, before new EPG data is received, the reservation information of the program $A_{12-3}$ whose recording start time is 17:00 and recording end time is 18:00 is recorded in the reservation information list 163, the reservation information of the program $B_{12-3}$ whose recording start time is 18:00 and recording end time is 19:30 is recorded in the reservation information list 163, the reservation information of the program $C_{12-3}$ whose recording start time is 20:00 and recording end time is 21:00 is recorded in the reservation information list 163, and the reservation information of the program $D_{12-3}$ whose recording start time is 21:30 and recording end time is 22:30 is recorded in the reservation information list 163.

At this time, it is assumed that, at 18:30, indicated by an arrow 213, when the charged program $B_{12-3}$ which must be in recording, for example, the EIT (schedule) as EPG data is received.

In the received EIT (schedule), when broadcast start time of the charged program $B_{12-3}$ which must be in broadcast (in recording) at present is 20:30 and broadcast end time thereof is 22:00, that is, when broadcast time of the charged program $B_{12-3}$ after the EPG update is changed from 20:30 to 22:00, the recording manager 136 does not correct the reservation information of the charged program $B_{12-3}$.

The reason why the reservation information of the charged program $B_{12-3}$ is not corrected is that, at the point of time of 18:30, the charged program $E_{12-3}$ whose broadcast time is from 18:00 to 20:00 is broadcasted and recording of the charged program $E_{12-3}$ already starts. That is, the reason is that the fee is already charged for recording of the charged program $E_{12-3}$, and thus the charged program $E_{12-3}$ continues to be recorded to 19:30 unchanged.

Therefore, after the correction of the reservation information, recording start time in the reservation information of the charged program $B_{12-3}$ is 18:00 unchanged and recording end time therein is 19:30 unchanged.

The recording manager 136 controls recording such that the program $A_{12-3}$ is recorded from 17:00 to 18:00. The recording manager 136 controls recording such that the program $E_{12-3}$ is recorded from 18:00 to 19:30. The recording manager 136 controls recording such that the program $C_{12-3}$ is recorded from 20:00 to 21:00. The recording manager 136 controls recording such that the program $D_{12-3}$ is recorded from 21:30 to 22:30.

Moreover, for convenience, when EPG data is received at 18:30 indicated by the arrow 213, the case in which the reservation information of the program $A_{12-3}$ exists in the reservation information list 163 has been described, but, at the point of time of 18:30, the reservation information of the program. $A_{12-3}$ may be deleted from the reservation information list 163.

In addition, for example, as shown in FIG. 21, it is assumed that, before new EPG data is received, the reservation information of the program $A_{12-4}$ whose recording start time is 17:00 and recording end time is 18:00 is recorded in the reservation information list 163, the reservation information of the program $B_{12-4}$ whose recording start time is 18:00 and recording end time is 19:30 is recorded in the reservation information list 163, and the reservation information of the program $C_{12-4}$ whose recording start time is 20:00 and recording end time is 22:30 is recorded in the reservation information list 163.

At this time, primarily, it is assumed that, at 18:30, indicated by an arrow 214, when the charged program $B_{12-4}$ which must be in recording, for example, the EIT (schedule) as EPG data is received.

In the received EIT (schedule), when broadcast start time of the charged program $B_{12-4}$ which must be in broadcast (in recording) at present is 20:30 and broadcast end time thereof is 22:00, that is, when broadcast time of the charged program $B_{12-4}$ after the EPG update is changed from 20:30 to 22:00, the recording manager 136 does not correct the reservation information of the charged program $B_{12-4}$.

The reason why the reservation information of the charged program $B_{12-4}$ is not corrected is that, at the point of time of 18:30, the charged program $D_{12-4}$ whose broadcast time is from 18:00 to 19:30 is broadcasted and recording of the charged program $D_{12-4}$ already starts. That is, the reason is that the fee is already charged for recording of the charged program $D_{12-4}$, and thus the charged program $D_{12-4}$ continues to be recorded to 19:30 unchanged.

Therefore, after the correction of the reservation information, recording start time in the reservation information of the charged program $B_{12-4}$ is 18:00 unchanged and recording end time therein is 19:30 unchanged.

Therefore, the recording manager 136 controls recording such that the program $A_{12-4}$ is recorded from 17:00 to 18:00. Further, the recording manager 136 controls recording such that the program $D_{12-4}$ is recorded from 18:00 to 19:30. In addition, the recording manager 136 controls recording such that the program $C_{12-4}$ is recorded from 20:00 to 22:30.

Moreover, for convenience, when EPG data is received at 18:30 indicated by the arrow 214, the case in which the reservation information of the program $A_{12-4}$ exists in the reservation information list 163 has been described, but, at the point of time of 18:30, the reservation information of the program $A_{12-4}$ may be deleted from the reservation information list 163.

As such, when broadcast end time of the charged program in recording in changed broadcast time is not the time within recording time of the program to be reserved for recording, the reservation information is not corrected.

Next, with reference to the flowchart of FIG. 22, the reservation information correction processing on the free program in recording, which corresponds to the step S347 of FIG. 14, will be described.

At a step S391, the recording manager 136 judges whether or not the program in recording is the program which is instructed to be recorded with the reservation information with reference to recording. That is, for example, when the event ID is recorded in the reservation information, on the basis of the event ID recorded in the reservation information of the program, which is instructed to be recorded, and the event ID of the program in recording at present included in the EIT, it is judged whether or not the program in recording is the program which is instructed to be recorded with the reservation information with reference to recording.

At the step S391, when the program name is included in the reservation information, on the basis of the program name recorded in the reservation information of the program, which is instructed to be recorded, and the program name of the program in recording at present included in the EIT, it may be judged whether or not the program in recording is the program which is instructed to be recorded with the reservation information with reference to recording.

At the step S391, when it is judged that the program in recording is the program which is instructed to be recorded with the reservation information with reference to recording, that is, for example, when the event ID recorded in the reservation information of the program, which is instructed to be recorded, and the event ID of the program in recording at present included in the EIT are equal to each other, the process progresses to a step S392, and then the recording manager 136 sets recording end time of the reservation information to recording start time of the next program to be reserved for recording.

Figure 23:
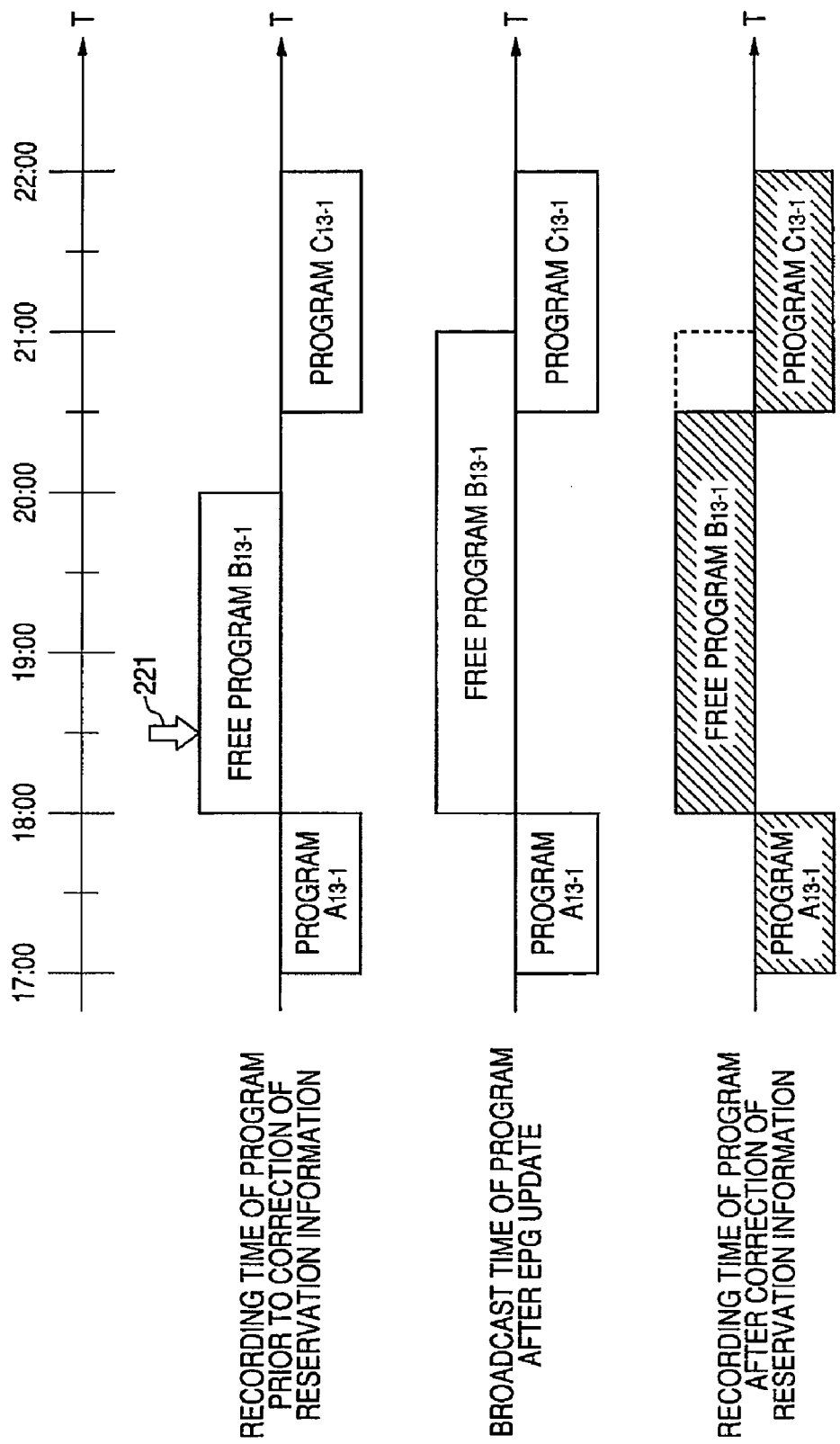
FIG. 23 is a diagram illustrating correction of reservation information on a free program in recording.

That is, for example, as shown in FIG. 23, it is assumed that, before new EPG data is received, the reservation information of the program $A_{13-1}$ whose recording start time is 17:00 and recording end time is 18:00 is recorded in the reservation information list 163, the reservation information of the free program $B_{13-1}$ whose recording start time is 18:00 and recording end time is 20:00 is recorded in the reservation information list 163, and the reservation information of the program $C_{13-1}$ whose recording start time is 20:30 and recording end time is 22:00 is recorded in the reservation information list 163.

At this time, when the free program $B_{13-1}$ is in recording, it is assumed that, at 18:30 indicated by an arrow 221, for example, the EIT (schedule) as EPG data is received. In the received EIT (schedule), when broadcast end time of the free program $B_{13-1}$ in broadcast (in recording) at present is 21:00, that is, when broadcast time of the free program $B_{13-1}$ after the EPG update is changed from 18:00 to 21:00, the recording manager 136 sets 20:30, which is recording start time of the program $C_{13-1}$, as recording end time in the reservation information of the free program $B_{13-1}$.

Accordingly, after the correction of the reservation information, recording start time in the reservation information of the free program $B_{13-1}$ is 18:00 and recording end time therein is 20:30.

Therefore, the recording manager 136 controls recording such that the program $A_{13-1}$ is recorded from 17:00 to 18:00. The recording manager 136 controls recording such that the free program $B_{13-1}$ is recorded from 18:00 to 20:30. The recording manager 136 controls recording such that the program $C_{13-1}$ is recorded from 20:30 to 22:00. That is, the free program $B_{13-1}$ from 20:30 to 21:00 is not recorded.

In the reserved recording program 121, the program with changed broadcast time is primarily set to have low recording priority. Therefore, although it is in recording, when the program with changed broadcast time is the free program $B_{13-1}$, the recording priority of the program $C_{13-1}$ is set higher than the recording priority of the free program $B_{13-1}$ with changed broadcast time. Accordingly, recording time of the program $C_{13-1}$ is not corrected, and the free program $B_{13-1}$ is recorded as much as possible so as not to overlap recording time of the program $C_{13-1}$, which is reserved for recording next to the free program $B_{13-1}$.

Moreover, for convenience, when EPG data is received at 18:30 indicated by the arrow 221, the case in which the reservation information of the program $A_{13-1}$ exists in the reservation information list 163 has been described, but, at the point of time of 18:30, the reservation information of the program $A_{13-1}$ may be deleted from the reservation information list 163.

As such, when broadcast end time in changed broadcast time of the free program is the time within recording time of the next program to be reserved for recording, the reservation information is corrected such that recording start time of the next program to be reserved for recording is set to recording end time.

Figure 22:
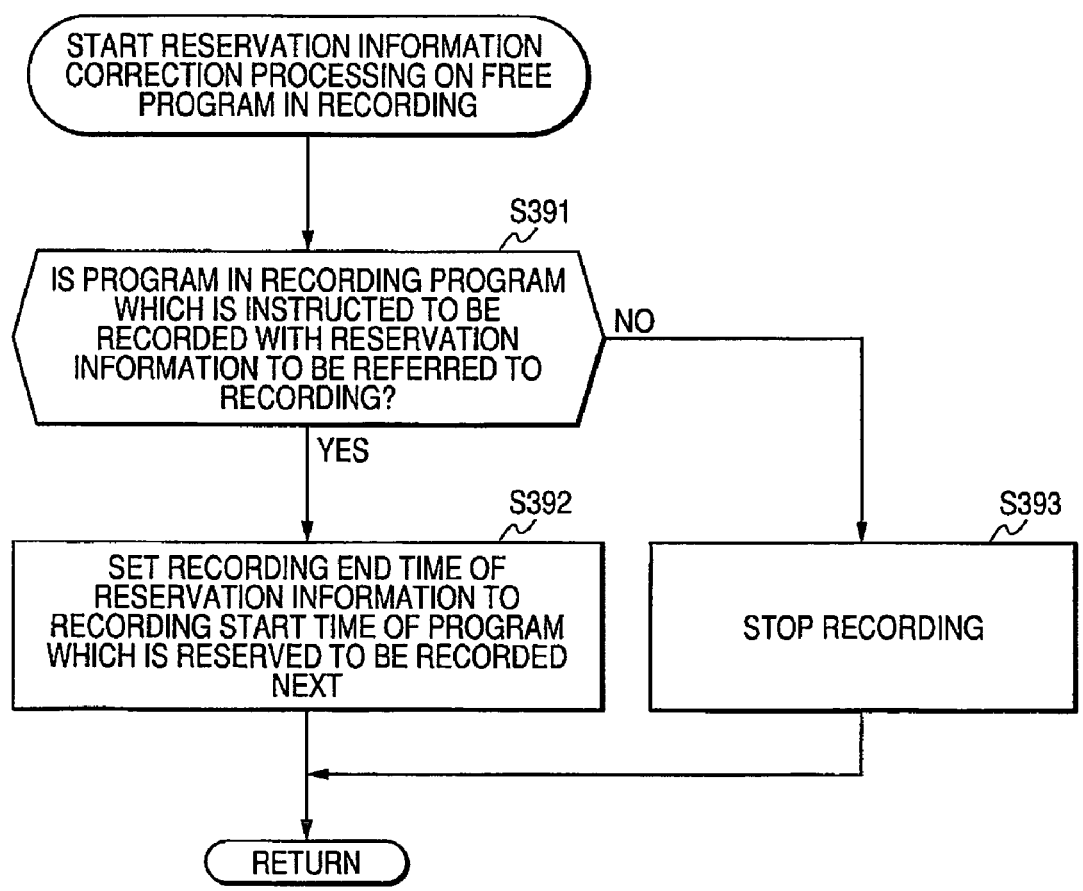
FIG. 22 is a flowchart illustrating reservation information correction processing on a free program in recording.
Figure 25:
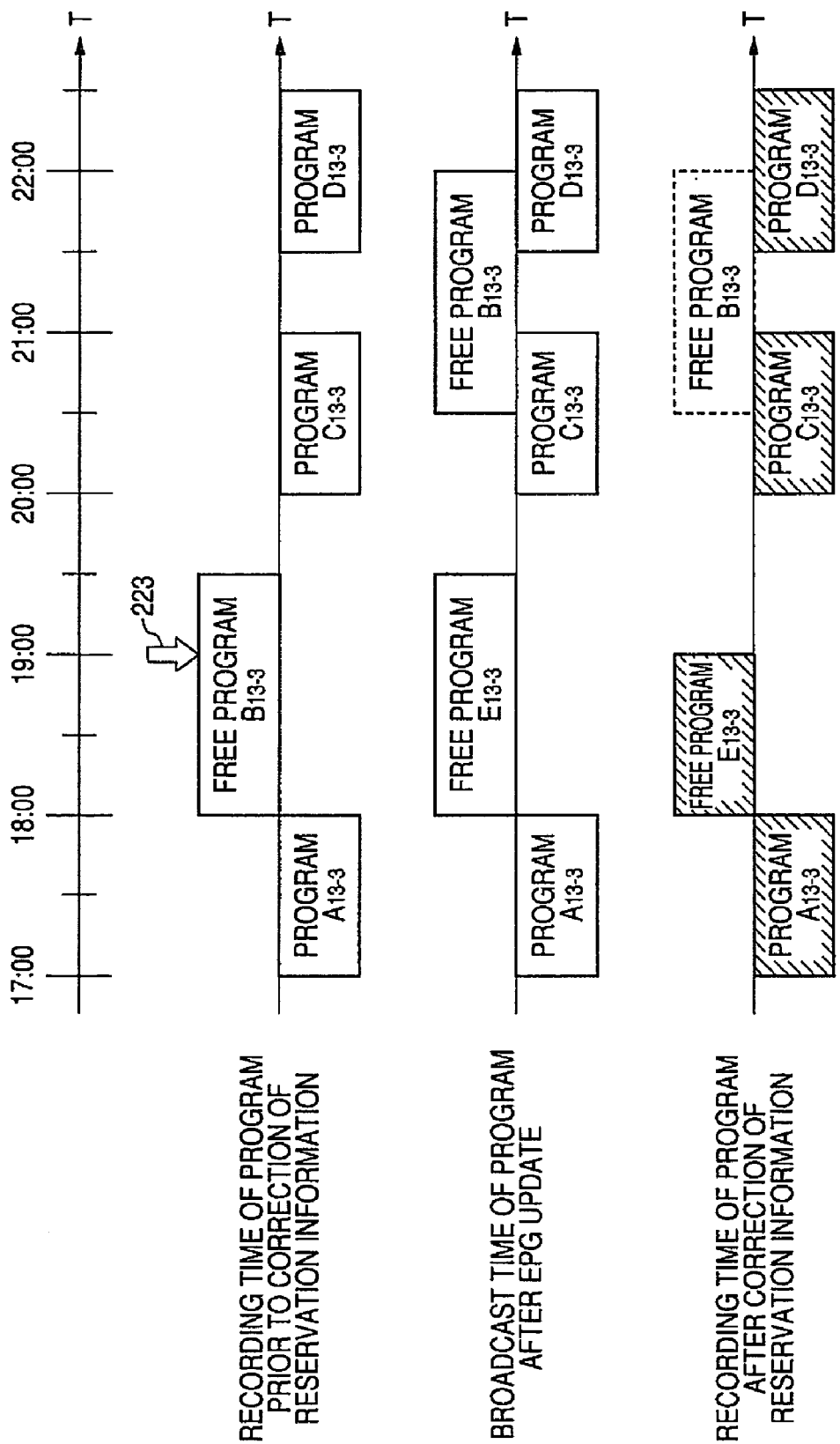
FIG. 25 is a diagram illustrating correction of reservation information on a free program in recording.
Figure 26:
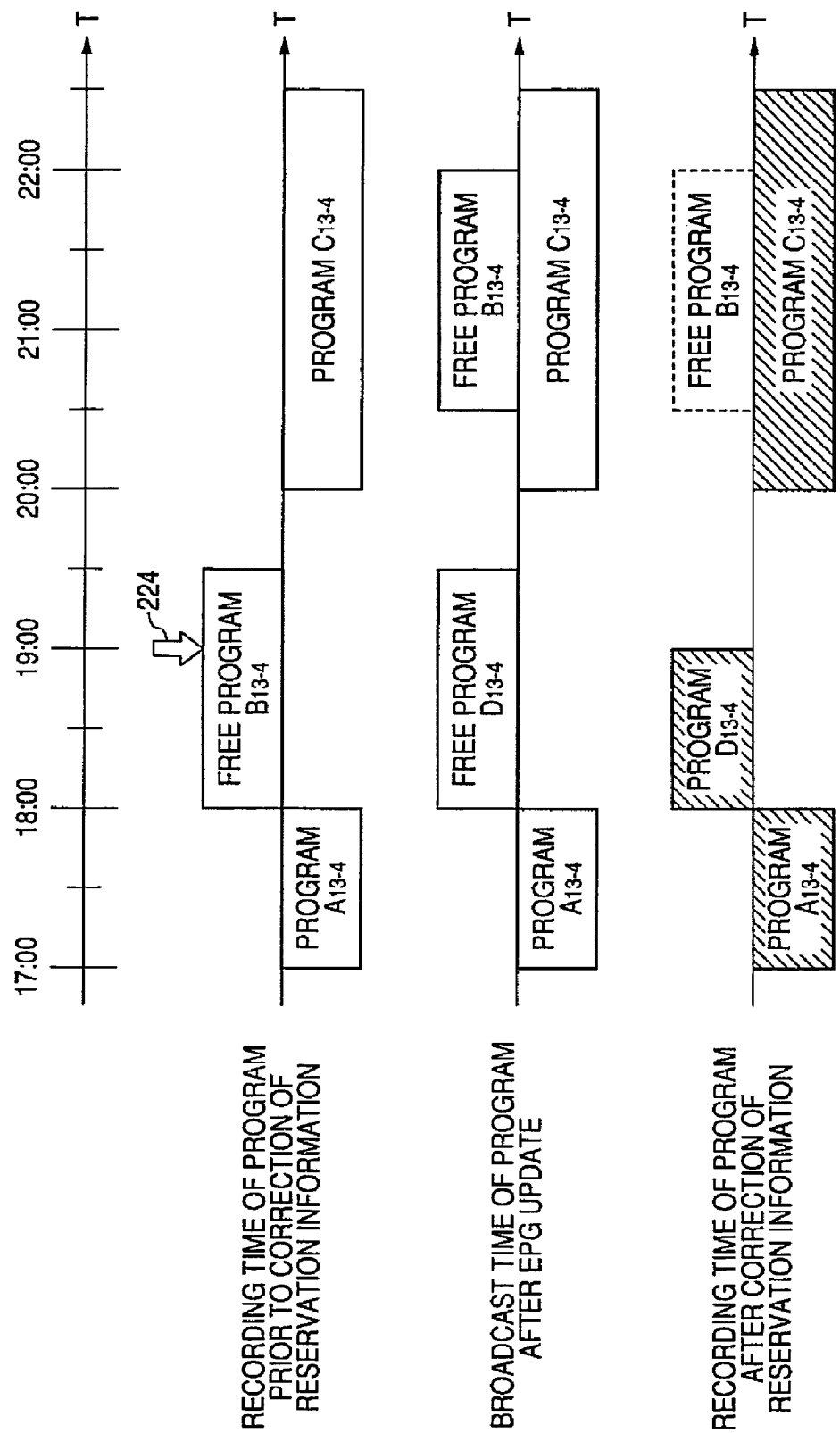
FIG. 26 is a diagram illustrating correction of reservation information on a free program in recording.

At the step S391 of FIG. 22, when it is judged that the program in recording is not the program which is instructed to be recorded with the reservation information with reference to recording, for example, when the event ID recorded in the reservation information of the program, which is instructed to be recorded, and the event ID of the program in recording at present included in the EIT are different from each other, the process progresses to a step S393, and then the recording manager 136 stops recording of the program, which is recorded at present. In the processing of the step S393, the reason why recording stops is that the situations shown in FIGS. 24 to 26 are considered.

Figure 24:
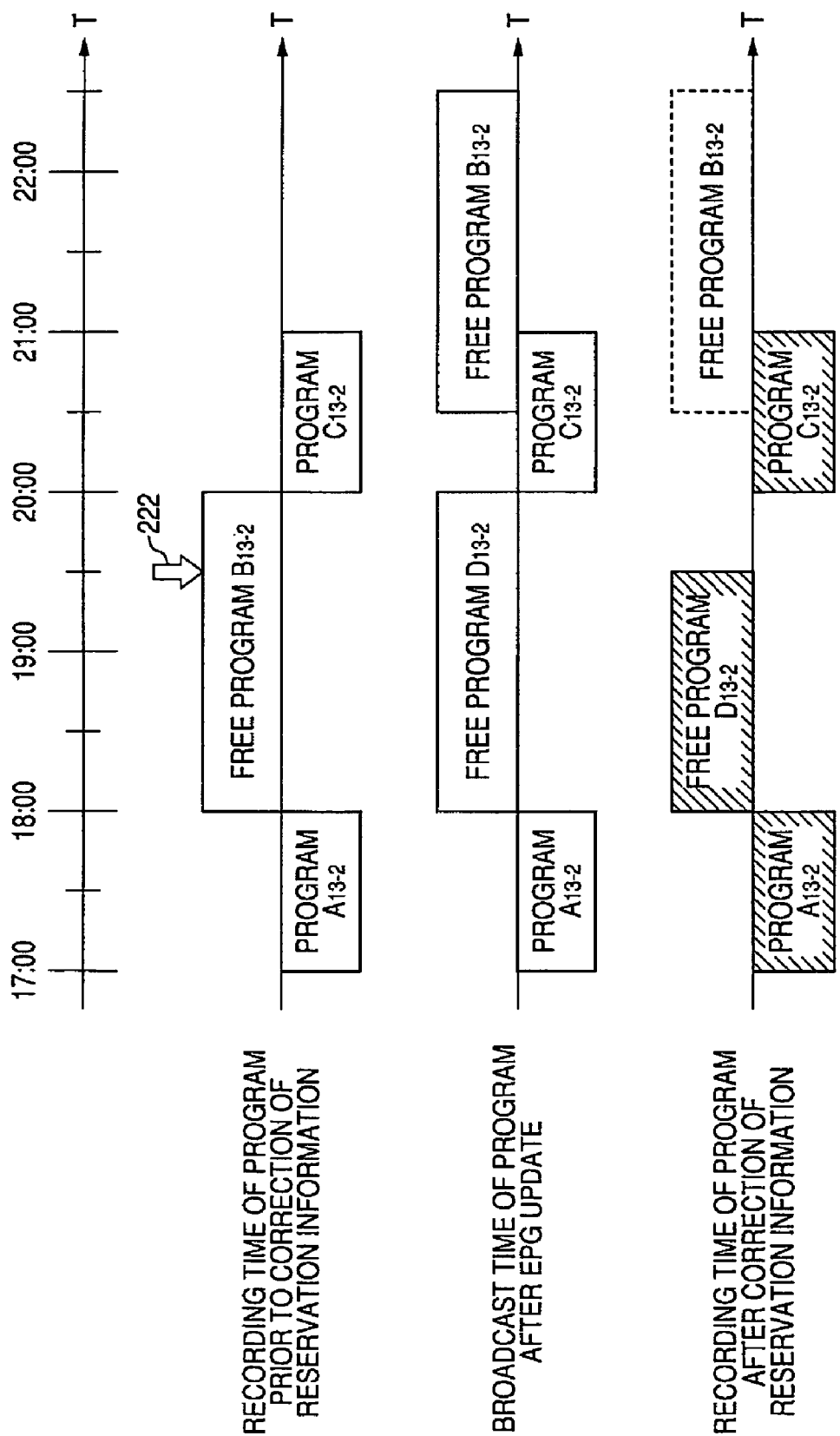
FIG. 24 is a diagram illustrating correction of reservation information on a free program in recording.

That is, for example, as shown in FIG. 24, it is assumed that, before new EPG data is received, the reservation information of the program $A_{13-2}$ whose recording start time is 17:00 and recording end time is 18:00 is recorded in the reservation information list 163, the reservation information of the free program $B_{13-2}$ whose recording start time is 18:00 and recording end time is 20:00 is recorded in the reservation information list 163, and the reservation information of the program $C_{13-2}$ whose recording start time is 20:00 and recording end time is 21:00 is recorded in the reservation information list 163.

At this time, it is assumed that, at 19:30, indicated by an arrow 222, when the free program $B_{13-2}$ which must be in recording, for example, the EIT (schedule) as EPG data is received.

In the received EIT (schedule), when broadcast start time of the free program $B_{13-2}$ which must be in broadcast (in recording) at present is 20:30 and broadcast end time thereof is 22:30, that is, when broadcast time of the free program $B_{13-2}$ after the EPG update is changed from 20:30 to 22:30 and the program in recording is not the free program $B_{13-2}$, which is desired to be recorded by the user, the recording manager 136 does not correct the reservation information of the free program $B_{13-2}$.

Further, since the recording manager 136 currently records the free program $D_{13-2}$ separate from the free program $B_{13-2}$, and thus performs control to immediately stop (interrupt) recording of the free program $D_{13-2}$.

Therefore, at the point of time of 19:30, recording start time in the reservation information of the free program $B_{13-2}$ is 18:00 unchanged, and recording end time therein is 20:00 unchanged.

Moreover, when EPG data is received at 19:30 and it is judged that the program in recording at present is not the free program $B_{13-2}$, the reservation information of the free program $B_{13-2}$ may be not corrected and may be deleted.

Therefore, the recording manager 136 controls recording such that the program $A_{13-2}$ is recorded from 17:00 to 18:00. Further, the recording manager 136 controls recording such that the free program $D_{13-2}$ is recorded from 18:00 to 19:30. In addition, the recording manager 136 controls recording such that the program $C_{13-2}$ is recorded from 20:00 to 21:00.

The recording manager 136 may delete the free program $D_{13-2}$ (the contents thereof) recorded from 18:00 to 19:30.

Moreover, for convenience, when EPG data is received at 19:30 indicated by the arrow 222, the case in which the reservation information of the program $A_{13-2}$ exists in the reservation information list 163 has been described, but, at the point of time of 19:30, the reservation information of the program $A_{13-2}$ may be deleted from the reservation information list 163.

Further, for example, as shown in FIG. 25, it is assumed that, before new EPG data is received, the reservation information of the program $A_{13-3}$ whose recording start time is 17:00 and recording end time is 18:00 is recorded in the reservation information list 163, the reservation information of the free program $B_{13-3}$ whose recording start time is 18:00 and recording end time is 19:30 is recorded in the reservation information list 163, the reservation information of the program $C_{13-3}$ whose recording start time is 20:00 and recording end time is 21:00 is recorded in the reservation information list 163, and the reservation information of the program $D_{13-3}$ whose recording start time is 21:30 and recording end time is 22:30 is recorded in the reservation information list 163.

At this time, it is assumed that, at 19:00, indicated by an arrow 223, when the free program $B_{13-3}$ which must be in recording, for example, the EIT (schedule) as EPG data is received. In the received EIT (schedule), when broadcast start time of the free program $B_{13-3}$ which must be in broadcast (in recording) at present is 20:30 and broadcast end time thereof is 22:00, that is, when broadcast time of the free program $B_{13-3}$ after the EPG update is changed from 20:30 to 22:00 and the program in recording is not the free program $B_{13-3}$, which is desired to be recorded by the user, the recording manager 136 does not correct the reservation information of the free program $B_{13-3}$.

Further, since the recording manager 136 currently records the free program $E_{13-3}$ separate from the free program $B_{13-3}$, and thus performs control to immediately stop (interrupt) recording of the free program $E_{13-3}$.

Therefore, at the point of time of 19:00, recording start time in the reservation information of the free program $B_{13-3}$ is 18:00, and recording end time therein is 19:30 unchanged.

Moreover, when EPG data is received at 19:30 and it is judged that the program in recording at present is not the free program $B_{13-3}$, the reservation information of the free program $B_{13-3}$ may be not corrected and may be deleted.

Therefore, the recording manager 136 controls recording such that the program $A_{13-3}$ is recorded from 17:00 to 18:00. The recording manager 136 controls recording such that the free program $E_{13-3}$ is recorded from 18:00 to 19:00. The recording manager 136 controls recording such that the program $C_{13-3}$ is recorded from 20:00 to 21:00. The recording manager 136 controls recording such that the program $D_{13-3}$ is recorded from 21:30 to 22:30.

The recording manager 136 may delete the free program $E_{13-3}$ (the contents thereof) recorded from 18:00 to 19:30.

Moreover, for convenience, when EPG data is received at 19:00 indicated by the arrow 223, the case in which the reservation information of the program $A_{13-3}$ exists in the reservation information list 163 has been described, but, at the point of time of 19:00, the reservation information of the program $A_{13-3}$ may be deleted from the reservation information list 163.

For example, as shown in FIG. 26, it is assumed that, before new EPG data is received, the reservation information of the program $A_{13-4}$ whose recording start time is 17:00 and recording end time is 18:00 is recorded in the reservation information list 163, the reservation information of the free program $B_{13-4}$ whose recording start time is 18:00 and recording end time is 19:30 is recorded in the reservation information list 163, and the reservation information of the program $C_{13-4}$ whose recording start time is 20:00 and recording end time is 22:30 is recorded in the reservation information list 163.

At this time, primarily, it is assumed that, at 19:00, indicated by an arrow 224, when the free program $B_{13-4}$ which must be in recording, for example, the EIT (schedule) as EPG data is received.

In the received EIT (schedule), when broadcast start time of the free program $B_{13-4}$ which must be in broadcast (in recording) at present is 20:30 and broadcast end time thereof is 22:00, that is, when broadcast time of the free program $B_{13-4}$ after the EPG update is changed from 20:30 to 22:00 and the program in recording is not the free program $B_{13-4}$, which is desired to be recorded by the user, the recording manager 136 does not correct the reservation information of the free program $B_{13-4}$.

Further, since the recording manager 136 currently records the free program $D_{13-4}$ separate from the free program $B_{13-4}$, and thus performs control to immediately stop (interrupt) recording of the free program $D_{13-4}$.

Therefore, at the point of time of 19:00, recording start time in the reservation information of the free program $B_{13-4}$ is 18:00 unchanged, and recording end time therein is 19:30 unchanged.

Moreover, when EPG data is received at 19:00 and it is judged that the program in recording at present is not the free program $B_{13-4}$, the reservation information of the free program $B_{13-4}$ may be not corrected and may be deleted.

Therefore, the recording manager 136 controls recording such that the program $A_{13-4}$ is recorded from 17:00 to 18:00. The recording manager 136 controls recording such that the free program $D_{13-4}$ is recorded from 18:00 to 19:00. The recording manager 136 controls recording such that the program $C_{13-4}$ is recorded from 20:00 to 22:30.

Moreover, the recording manager 136 may delete the free program $D_{13-4}$ (the contents thereof) recorded from 18:00 to 19:00.

Moreover, for convenience, when EPG data is received at 19:00 indicated by the arrow 224, the case in which the reservation information of the program $A_{13-4}$ exists in the reservation information list 163 has been described, but, at the point of time of 19:00, the reservation information of the program $A_{13-4}$ may be deleted from the reservation information list 163.

As such, when broadcast time of the program is changed and it is judged that the free program in recording is not the program, which is desired to be recorded by the user, the reservation information is not corrected. Further, when it is judged that the free program in recording is not the program, which is desired to be recorded by the user, recording of the program in recording stops (is interrupted).

After the step S392 or the step S393 of FIG. 22, the process returns to the step S309 of FIG. 9, and then the above-described processing is executed.

With reference to the flowchart of FIG. 27, the reservation information correction processing, corresponding to the step S323 of FIG. 13, when the program whose recording time needs to be corrected is not in recording will be described.

At a step S421, the reservation correction manager 162 judges whether or not the program whose recording time overlaps due to the change in broadcast time exists.

More specifically, at the step S421, the reservation correction manager 162 judges whether or not recording time when the program to be reserved for recording by the reservation information assigned by the parameter i is recorded from broadcast start time to broadcast end time in changed broadcast time overlaps recording time of the program to be reserved for recording by another reservation information.

At the step S421, when it is judged that there is the program to be recorded, recording time of which overlaps, due to the change in broadcast time, the process progresses to a step S422, and then the reservation correction manager 162 judges whether or not recording of the program with changed broadcast time is caused by automatic recording. That is, as described above at the step S342 of FIG. 14, the reservation correction manager 162 performs the judgment on the basis of the manual reservation flag.

At the step S422, when it is judged that recording of the program with changed broadcast time is not caused by automatic recording, the process progresses to a step S423, and then the reservation correction manager 162 judges whether or not the program with changed broadcast time is a charged program. That is, for example, as described above at the step S343 of FIG. 14, on the basis of the information (descriptor) indicating the charged program (paid program) or the charged program flag in the EIT, it is judged whether or not the program with changed broadcast time is the charged program.

At the step S423, when it is judged that the program with changed broadcast time is the charged program, the process progresses to a step S424, and then the reservation correction manager 162 judges whether or not recording start time and recording end time of the program with changed broadcast time are equal to each other. That is, it is judged whether or not recording start time and recording end time in the reservation information of the program with changed broadcast time are equal to each other.

After the step S424, when it is judged that recording start time and recording end time of the program with changed broadcast time are not equal to each other, the process progresses to a step S425, and then the reservation correction manager 162 sets recording start time and recording end time in the reservation information equal to each other.

Hereinafter, the reservation information correction will be specifically described with reference to FIGS. 28 to 46 and 48 to 55. In FIGS. 28 to 46 and 48 to 55, straight lines with "T" appended thereto represent time. In the drawings, numerals appended to the first straight line with "T" appended thereto represent specified time. In FIGS. 28 to 46 and 48 to 55, in a second straight line with "T" appended thereto from the above, "RECORDING RESERVATION TIME OF PROGRAM PRIOR TO CORRECTION OF RESERVATION INFORMATION" represents recording time recorded in the reservation information of each program due to reservation for recording, before new EPG data is received, that is, recording start time and recording end time of the program.

In FIGS. 28 to 46 and 48 to 55, in a third straight line with "T" appended thereto from the above, "BROADCAST TIME OF PROGRAM AFTER EPG UPDATE" represents broadcast time (the composition thereof) by newly received EPG data (newest EPG data), that is, broadcast start time and broadcast end time of the program. In FIGS. 28 to 46 and 48 to 55, in a fourth straight line with "T" appended thereto from the above, "RECORDING RESERVATION TIME OF PROGRAM AFTER CORRECTION OF RESERVATION INFORMATION" represents recording start time and recording end time in the corrected reservation information of each program on the basis of the newest EPG data. In a fifth (lowest) straight line with "T" appended thereto from the above, "RECORDING TIME OF PROGRAM" represents recording time of the program whose recording is controlled by the recording manager 136.

Further, in FIGS. 28 to 46 and 48 to 55, "FREE PROGRAM" represents a program which is free for watching. "CHARGED PROGRAM" represents which is charged for watching. "AUTOMATIC RECORDING RESERVATION PROGRAM" represents a program to be reserved for automatic recording by the HDD video recorder 1 on the basis of the user's preference. "PROGRAM" is not particularly limited and is one of "FREE PROGRAM", "CHARGED PROGRAM", and "AUTOMATIC RECORDING RESERVATION PROGRAM" described above.

In addition, in the program to be subjected to the correction of the reservation information, an alphabet "B" is provided, like "PROGRAM B". Further, for simple description, the reservation information correction processing is classified, and the program to be subjected to the classified processing is distinguished by an inferior figure appended to the alphabet symbol, like PROGRAM $B_{21\text{-}1}$ or the like.

Here, the processing of the step S425 will be described below with reference to FIGS. 28 to 31. As shown in FIG. 28, it is assumed that, before new EPG data is received, the reservation information of the program $A_{21\text{-}1}$ whose recording start time is 17:00 and recording end time is 18:00 is recorded in the reservation information list 163, the reservation information of the charged program $B_{21\text{-}1}$ whose recording start time is 18:00 and recording end time is 20:00 is recorded in the reservation information list 163, and the reservation information of the program $C_{21\text{-}1}$ whose recording start time is 20:30 and recording end time is 21:30 is recorded in the reservation information list 163.

At this time, it is assumed that, for example, the EIT (schedule) as EPG data is received. In the received EIT (schedule), when broadcast end time of the charged program $B_{21\text{-}1}$ is 21:00, that is, when broadcast time of the charged program $B_{21\text{-}1}$ after the EPG update is changed from 18:00 to 21:00, the reservation correction manager 162 corrects recording end time in the reservation information of the charged program $B_{21\text{-}1}$ from 20:00 to 18:00, which is the same as recording start time. That is, the reservation correction manager 162 sets 18:00, which is the same as recording start time, as recording end time in the reservation information of the charged program $B_{21\text{-}1}$, in the processing of the step S425.

Accordingly, after the correction of the reservation information, recording start time in the reservation information of the charged program $B_{21\text{-}1}$ is 18:00, and recording end time therein is 18:00.

Therefore, the recording manager 136 controls recording such that the program $A_{21\text{-}1}$ is recorded from 17:00 to 18:00. The recording manager 136 controls recording such that recording of the charged program $B_{21\text{-}1}$ is suppressed. That is, the charged program $B_{21\text{-}1}$ is not recorded. In addition, the recording manager 136 controls recording such that the program $C_{21\text{-}1}$ is recorded from 20:30 to 21:30.

Figure 29:
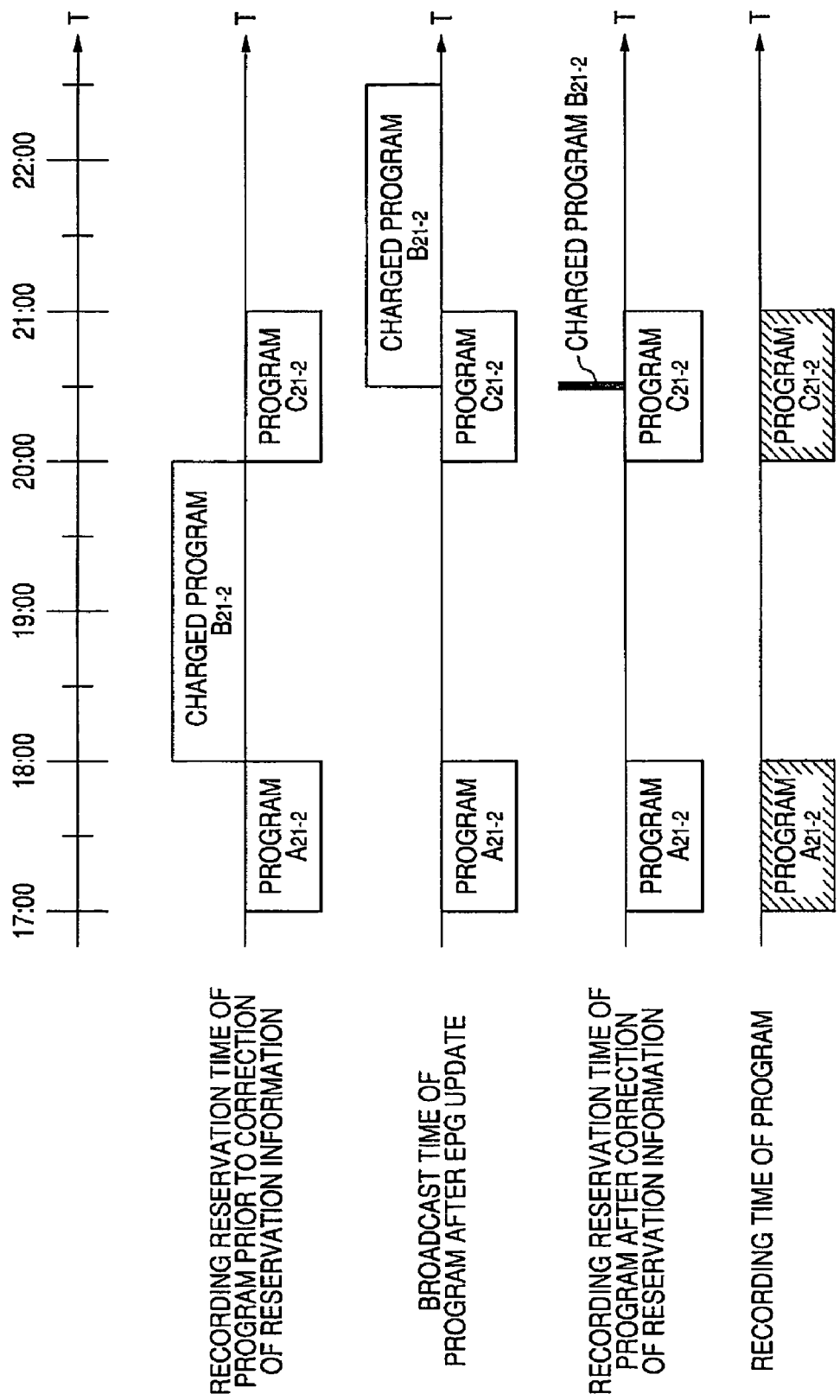
FIG. 29 is a diagram illustrating correction of reservation information on a charged program, which is not in recording.

Further, for example, as shown in FIG. 29, it is assumed that, before new EPG data is received, the reservation information of the program $A_{21\text{-}2}$ whose recording start time is 17:00 and recording end time is 18:00 is recorded in the reservation information list 163, the reservation information of the charged program $B_{21\text{-}2}$ whose recording start time is 18:00 and recording end time is 20:00 is recorded in the reservation information list 163, and the reservation information of the program $C_{21\text{-}2}$ whose recording start time is 20:00 and recording end time is 21:00 is recorded in the reservation information list 163.

At this time, it is assumed that, for example, the EIT (schedule) as EPG data is received. In the received EIT (schedule), when broadcast start time of the charged program $B_{21-2}$ is 20:30 and broadcast end time thereof is 22:30, that is, when broadcast time of the charged program $B_{21-2}$ after the EPG update is changed from 20:30 to 22:30, the reservation correction manager 162 sets 20:30, which is broadcast start time of the charged program $B_{21-2}$, as recording start time in the reservation information of the charged program $B_{21-2}$, for example, and sets 20:30, which is the same as set recording start time, as recording end time, in the processing of the step S425.

Accordingly, after the correction of the reservation information, recording start time in the reservation information of the charged program $B_{21-2}$ is 20:30, and recording end time therein is 20:30.

Therefore, the recording manager 136 controls recording such that the program $A_{21-2}$ is recorded from 17:00 to 18:00. The recording manager 136 controls recording such that recording of the charged program $B_{21-2}$ is suppressed. That is, the charged program $B_{21-2}$ is not recorded. In addition, the recording manager 136 controls recording such that the program $C_{21-2}$ is recorded from 20:00 to 21:00.

Figure 30:
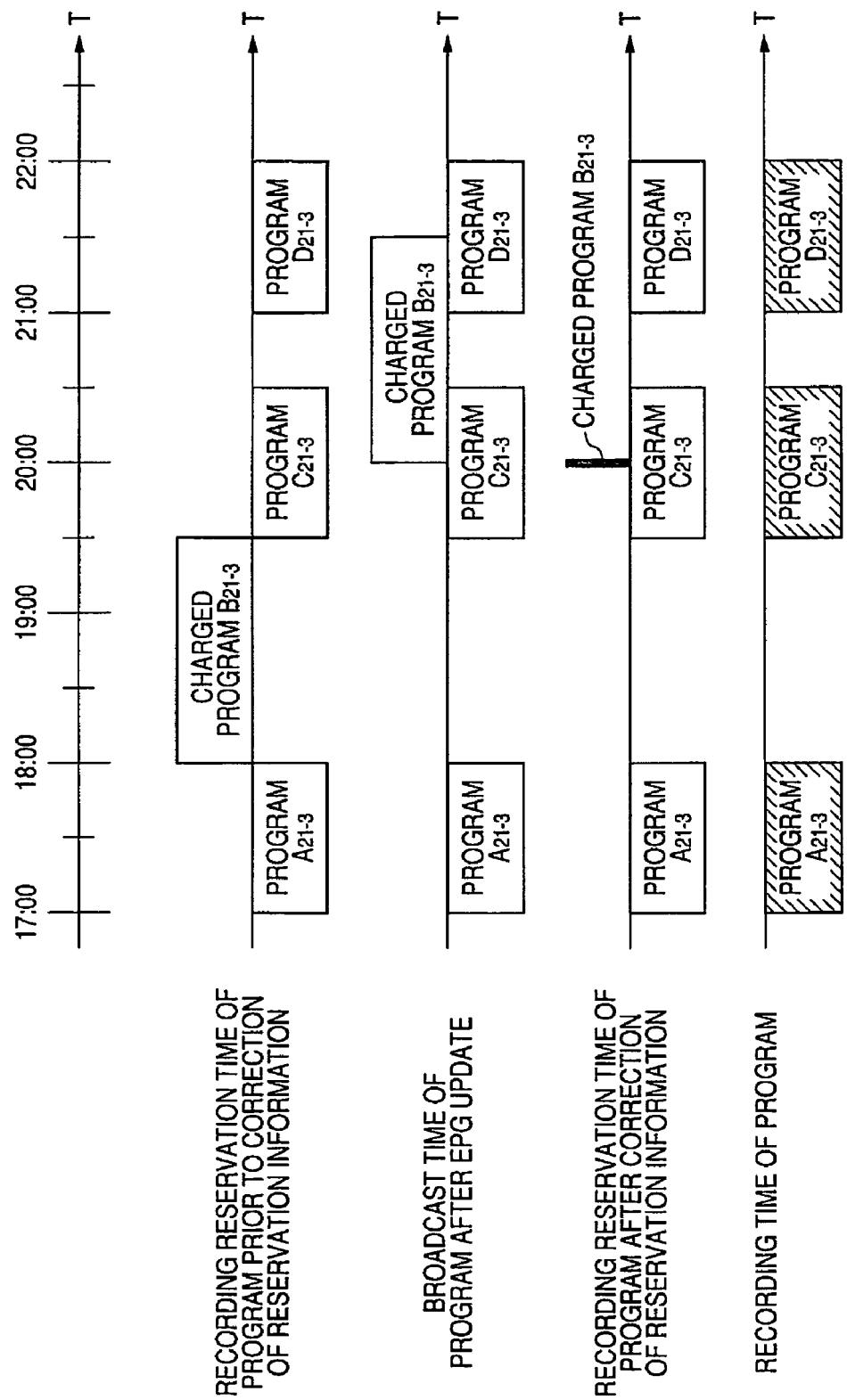
FIG. 30 is a diagram illustrating correction of reservation information on a charged program, which is not in recording.

Further, for example, as shown in FIG. 30, it is assumed that, before new EPG data is received, the reservation information of the program $A_{21-3}$ whose recording start time is 17:00 and recording end time is 18:00 is recorded in the reservation information list 163, the reservation information of the charged program $B_{21-3}$ whose recording start time is 18:00 and recording end time is 19:30 is recorded in the reservation information list 163, the reservation information of the program $C_{21-3}$ whose recording start time is 19:30 and recording end time is 20:30 is recorded in the reservation information list 163, and the reservation information of the program $D_{21-3}$ whose recording start time is 21:00 and recording end time is 22:00 is recorded in the reservation information list 163.

At this time, it is assumed that, for example, the EIT (schedule) as EPG data is received. In the received EIT (schedule), when broadcast start time of the charged program $B_{21-3}$ is 20:00 and broadcast end time thereof is 21:30, that is, when broadcast time of the charged program $B_{21-3}$ after the EPG update is changed from 20:00 to 21:30, the reservation correction manager 162 sets 20:00, which is broadcast start time of the charged program $B_{21-3}$, as recording start time in the reservation information of the charged program $B_{21-3}$, for example, and sets 20:00, which is the same as set recording start time, as recording end time, in the processing of the step S425.

Accordingly, after the correction of the reservation information, recording start time in the reservation information of the charged program $B_{21-3}$ is 20:00, and recording end time therein is 20:00.

Therefore, the recording manager 136 controls recording such that the program $A_{21-3}$ is recorded from 17:00 to 18:00. The recording manager 136 controls recording such that the program $C_{21-3}$ is recorded from 19:30 to 20:30. The recording manager 136 controls recording such that recording of the charged program $B_{21-3}$ is suppressed. That is, the charged program $B_{21-3}$ is not recorded. The recording manager 136 controls recording such that the program $D_{21-3}$ is recorded from 21:00 to 22:00.

Figure 31:
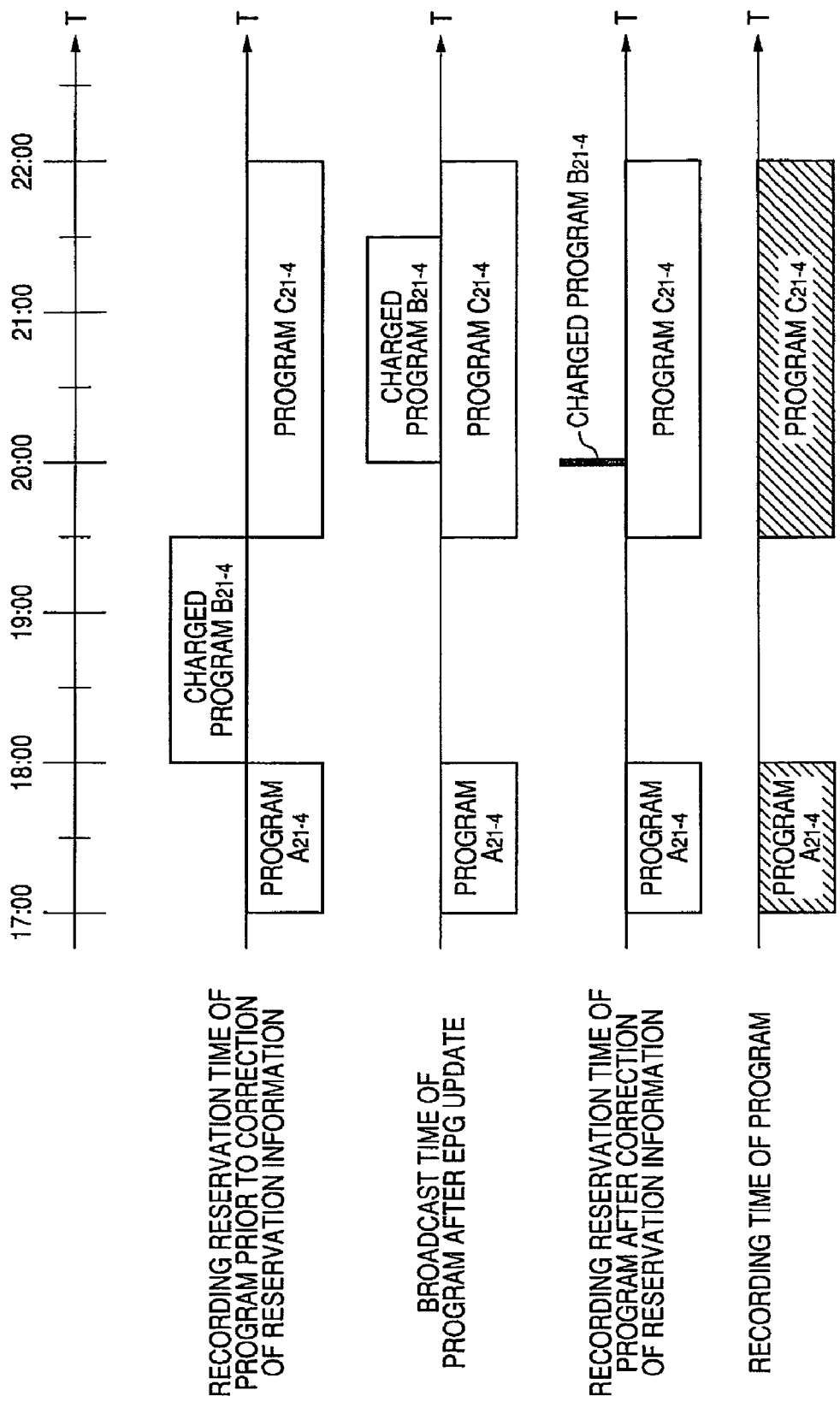
FIG. 31 is a diagram illustrating correction of reservation information on a charged program, which is not in recording.

Further, for example, as shown in FIG. 31, it is assumed that, before new EPG data is received, the reservation information of the program $A_{21-4}$ whose recording start time is 17:00 and recording end time is 18:00 is recorded in the reservation information list 163, the reservation information of the charged program $B_{21-4}$ whose recording start time is 18:00 and recording end time is 19:30 is recorded in the reservation information list 163, and the reservation information of the program $C_{21-4}$ whose recording start time is 19:30 and recording end time is 22:00 is recorded in the reservation information list 163.

At this time, it is assumed that, for example, the EIT (schedule) as EPG data is received. In the received EIT (schedule), when broadcast start time of the charged program $B_{21-4}$ is 20:00 and broadcast end time thereof is 21:30, that is, when broadcast time of the charged program $B_{21-4}$ after the EPG update is changed from 20:00 to 21:30, the reservation correction manager 162 sets 20:00, which is broadcast start time of the charged program $B_{21-4}$, as recording start time in the reservation information of the charged program $B_{21-4}$, for example, and sets 20:00, which is the same as set recording start time, as recording end time, in the processing of the step S425.

Accordingly, after the correction of the reservation information, recording start time in the reservation information of the charged program $B_{21-4}$ is 20:00, and recording end time therein is 20:00.

Therefore, the recording manager 136 controls recording such that the program $A_{21-4}$ is recorded from 17:00 to 18:00. The recording manager 136 controls recording such that recording of the charged program $B_{21-4}$ is suppressed. That is, the charged program $B_{21-4}$ is not recorded. The recording manager 136 controls recording such that the program $C_{21-4}$ is recorded from 19:30 to 22:00.

As such, in the reserved recording program 121, the program which changed broadcast time is primarily set to have a low recording priority. Therefore, the recording priority of the program to be reserved for recording in advance is set higher than the recording priority of the charged program with changed broadcast time, which is not in recording. Further, as for the charged program, the fee is charged for recording the program. Therefore, when the entire charged program cannot be recorded, recording start time and recording end time in the reservation information are set such that recording of the charged program is suppressed.

Figure 27:
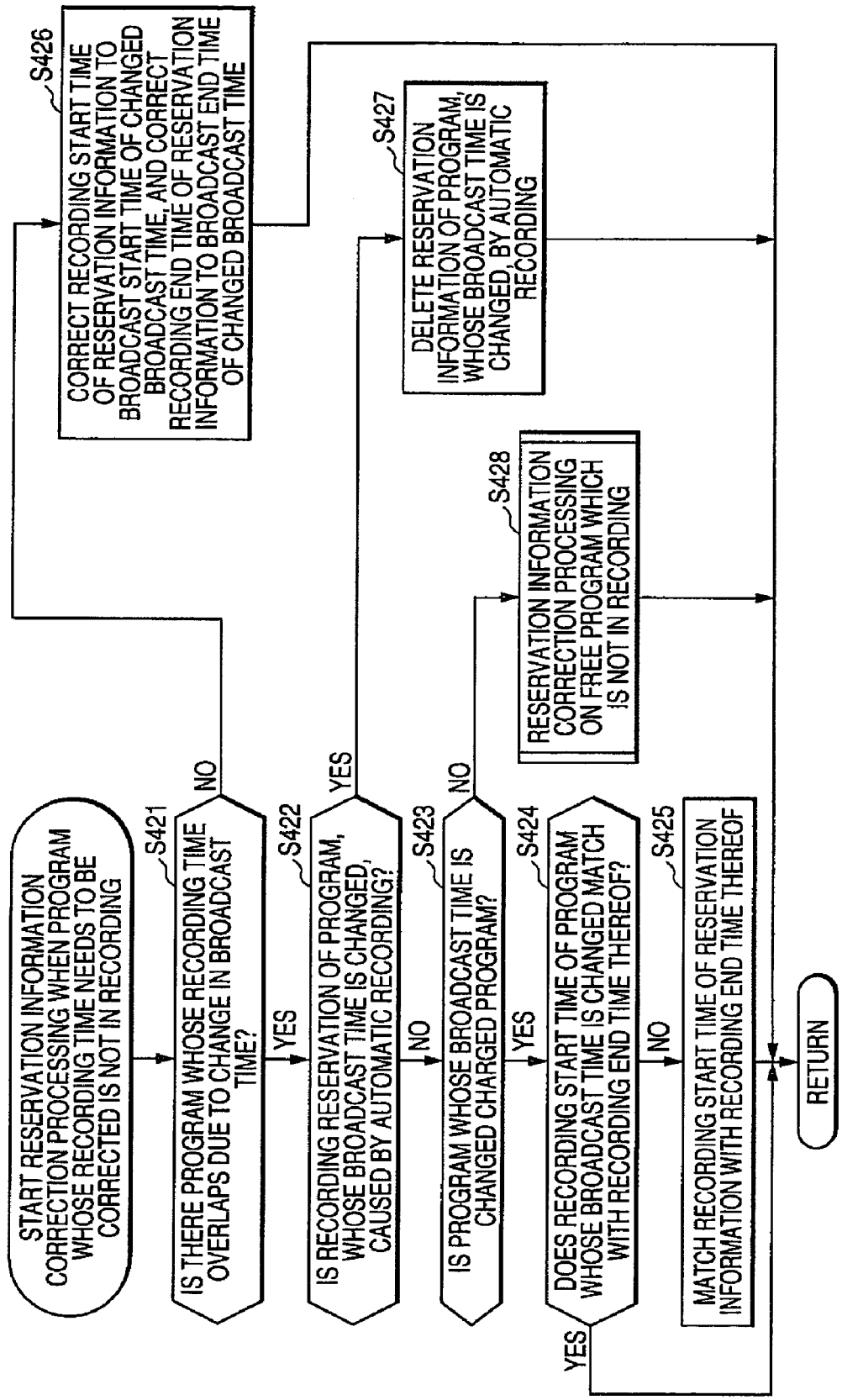
FIG. 27 is a flowchart illustrating reservation information correction processing when a program whose recording time needs to be corrected is not in recording.

After the step S425 of FIG. 27, the process returns to the step S309 of FIG. 9, and then the above-described processing is executed.

At the step S424, when it is judged that recording start time and recording end time of the program with changed broadcast time are equal to each other, the processing of the step S425 is skipped, the process returns td the step S309 of FIG. 9, and then the above-described processing is executed. The reason why the reservation information is not corrected through the processing of the step S424 is that examples of FIGS. 32 to 35 are considered, for example.

Figure 32:
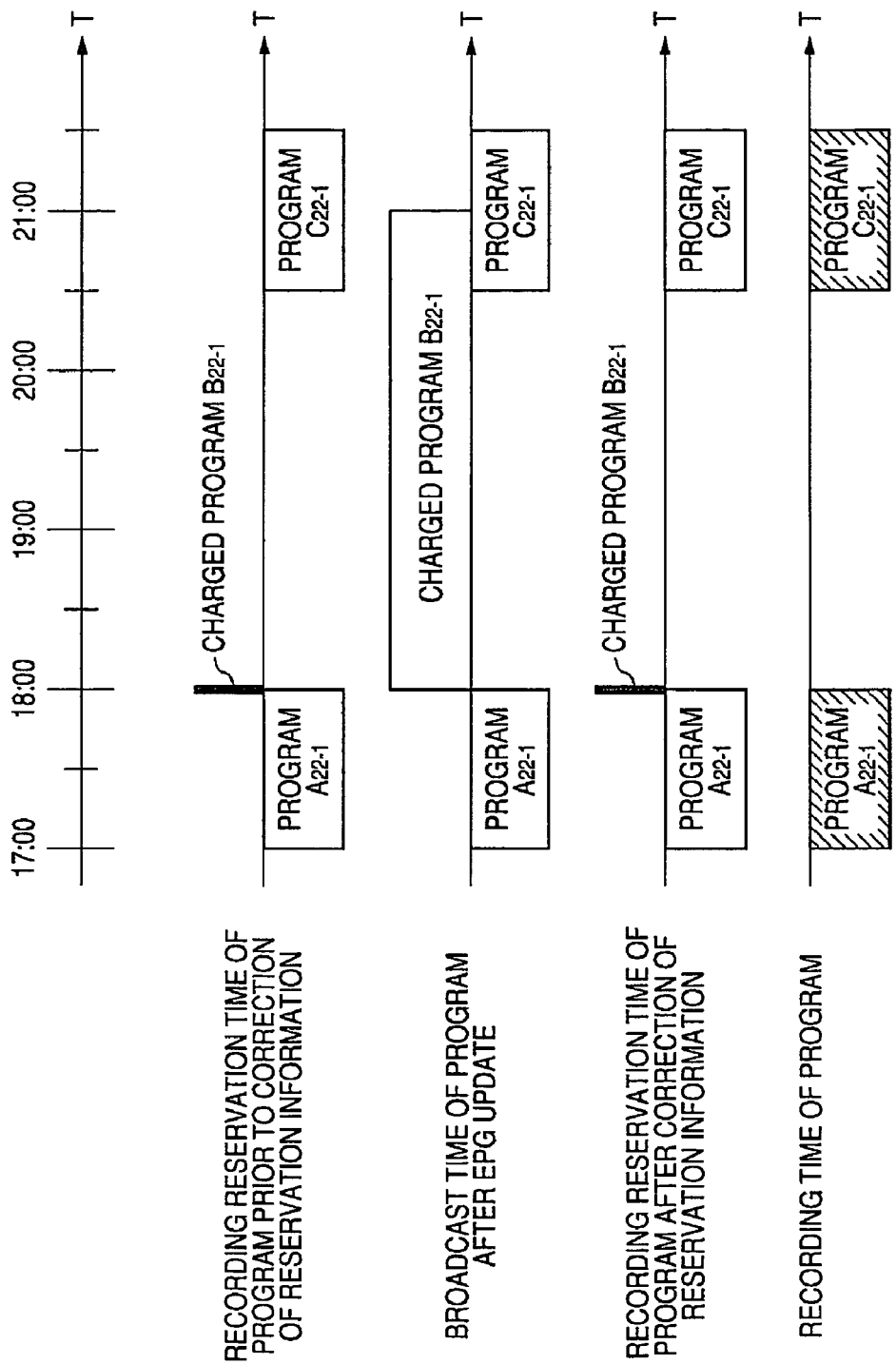
FIG. 32 is a diagram illustrating correction of reservation information on a charged program, which is not in recording.

That is, for example, as shown in FIG. 32, it is assumed that, before new EPG data is received, the reservation information of the program $A_{22-1}$ whose recording start time is 17:00 and recording end time is 18:00 is recorded in the reservation information list 163, the reservation information of the charged program $B_{22-1}$ whose recording start time is 18:00 and recording end time is 18:00 is recorded in the reservation information list 163, and the reservation information of the program $C_{22-1}$ whose recording start time is 20:30 and recording end time is 21:30 is recorded in the reservation information list 163.

At this time, it is assumed that, for example, the EIT (schedule) as EPG data is received. In the received EIT (schedule), when broadcast start time of the charged program $B_{22-1}$ is 18:00 and broadcast end time thereof is 21:00, that is, when broadcast time of the charged program $B_{22-1}$ after the EPG update is changed from 18:00 to 21:00, the reservation correction manager 162 does not the reservation information of the charged program $B_{22-1}$.

That is, recording start time in the reservation information of the charged program $B_{22-1}$ is 18:00 unchanged, and recording end time therein is 18:00 unchanged. This is because broadcast time of the charged program $B_{22-1}$ after the update of EPG data overlaps recording time of the program $C_{22-1}$. That is, this is because the recording priority of the program $C_{22-1}$ to be reserved in advance is set higher than the recording priority of the charged program $B_{22-1}$ with changed broadcast time.

Therefore, the recording manager 136 controls recording such that the program $A_{22-1}$ is recorded from 17:00 to 18:00. The recording manager 136 controls recording such that recording of the charged program $B_{22-1}$ is suppressed. That is, the charged program $B_{22-1}$ is not recorded. The recording manager 136 controls recording such that the program $C_{22-1}$ is recorded from 20:30 to 21:30.

Further, at the step S424, when it is judged that recording start time and recording end time of the program with changed broadcast time are equal to each other, the reservation information may be further corrected such that recording start time and recording end time are equal to each other.

Figure 33:
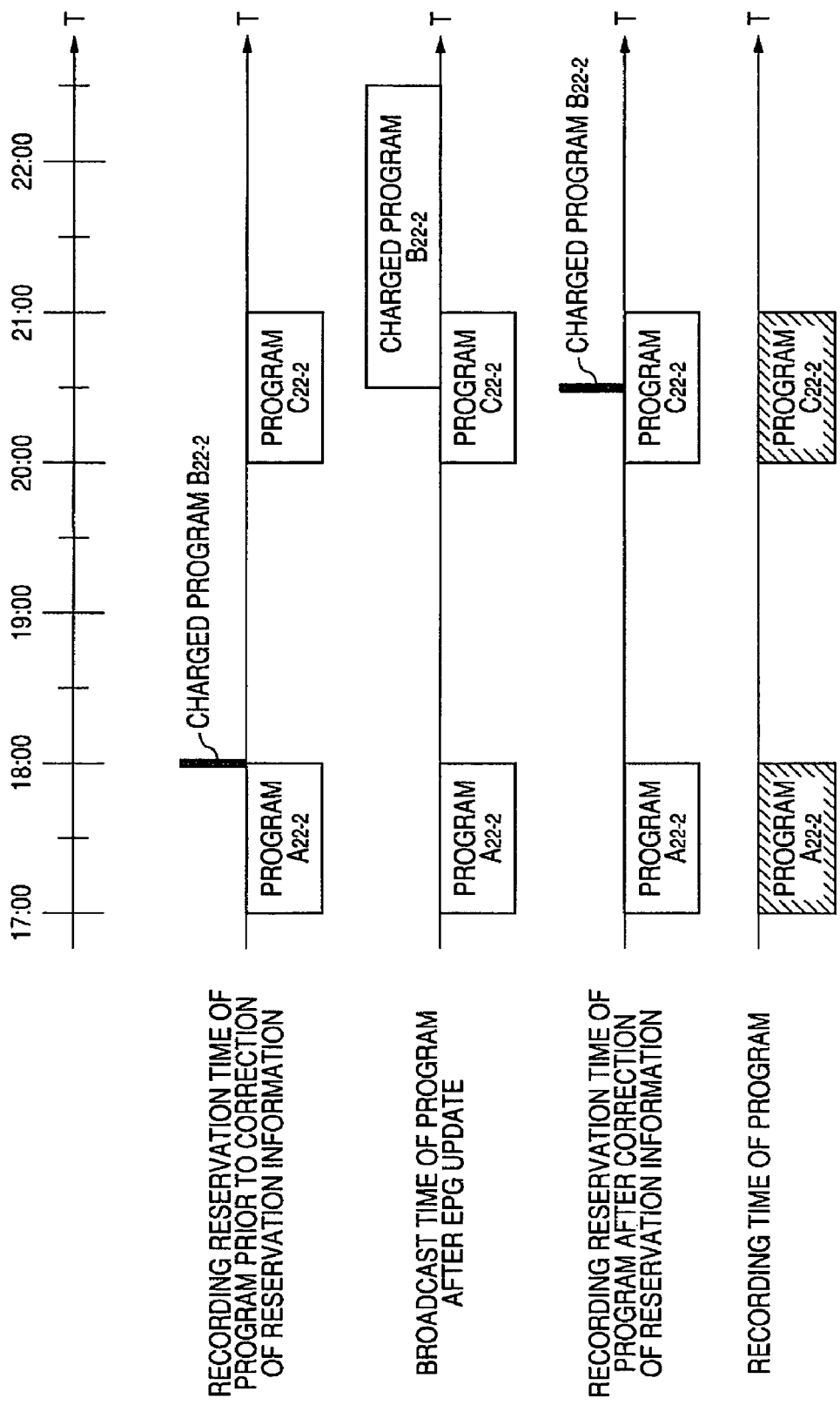
FIG. 33 is a diagram illustrating correction of reservation information on a charged program, which is not in recording.

That is, for example, as shown in FIG. 33, it is assumed that, before new EPG data is received, the reservation information of the program $A_{22-2}$ whose recording start time is 17:00 and recording end time is 18:00 is recorded in the reservation information list 163, the reservation information of the charged program $B_{22-2}$ whose recording start time is 18:00 and recording end time is 18:00 is recorded in the reservation information list 163, and the reservation information of the program $C_{22-2}$ whose recording start time is 20:00 and recording end time is 21:00 is recorded in the reservation information list 163.

At this time, it is assumed that, for example, the EIT (schedule) as EPG data is received. In the received EIT (schedule), when broadcast start time of the charged program $B_{22-2}$ is 20:30 and broadcast end time thereof is 22:30, that is, when broadcast time of the charged program $B_{22-2}$ after the EPG update is changed from 20:30 to 22:30, the reservation correction manager 162 sets 20:30, which is broadcast start time of the charged program $B_{22-2}$, as recording start time in the reservation information of the charged program $B_{22-2}$, and sets 20:30, which is the same as set recording start time, as recording end time, for example.

Further, the reservation correction manager 162 may not correct the reservation information of the charged program $B_{22-2}$.

Accordingly, after the correction of the reservation information, recording start time in the reservation information of the charged program $B_{22-2}$ is 20:30, and recording end time therein is 20:30. This is because broadcast time of the charged program $B_{22-2}$ overlaps recording time of the program $C_{22-2}$ after the update of EPG data. That is, this is because the recording priority of the program $C_{22-2}$ to be reserved in advance is set higher than the recording priority of the charged program $B_{22-2}$ with changed broadcast time.

Therefore, the recording manager 136 controls recording such that the program $A_{22-2}$ is recorded from 17:00 to 18:00. The recording manager 136 controls recording such that recording of the charged program $B_{22-2}$ is suppressed. That is, the charged program $B_{22-2}$ is not recorded. The recording manager 136 controls recording such that the program $C_{22-2}$ is recorded from 20:00 to 21:00.

Figure 34:
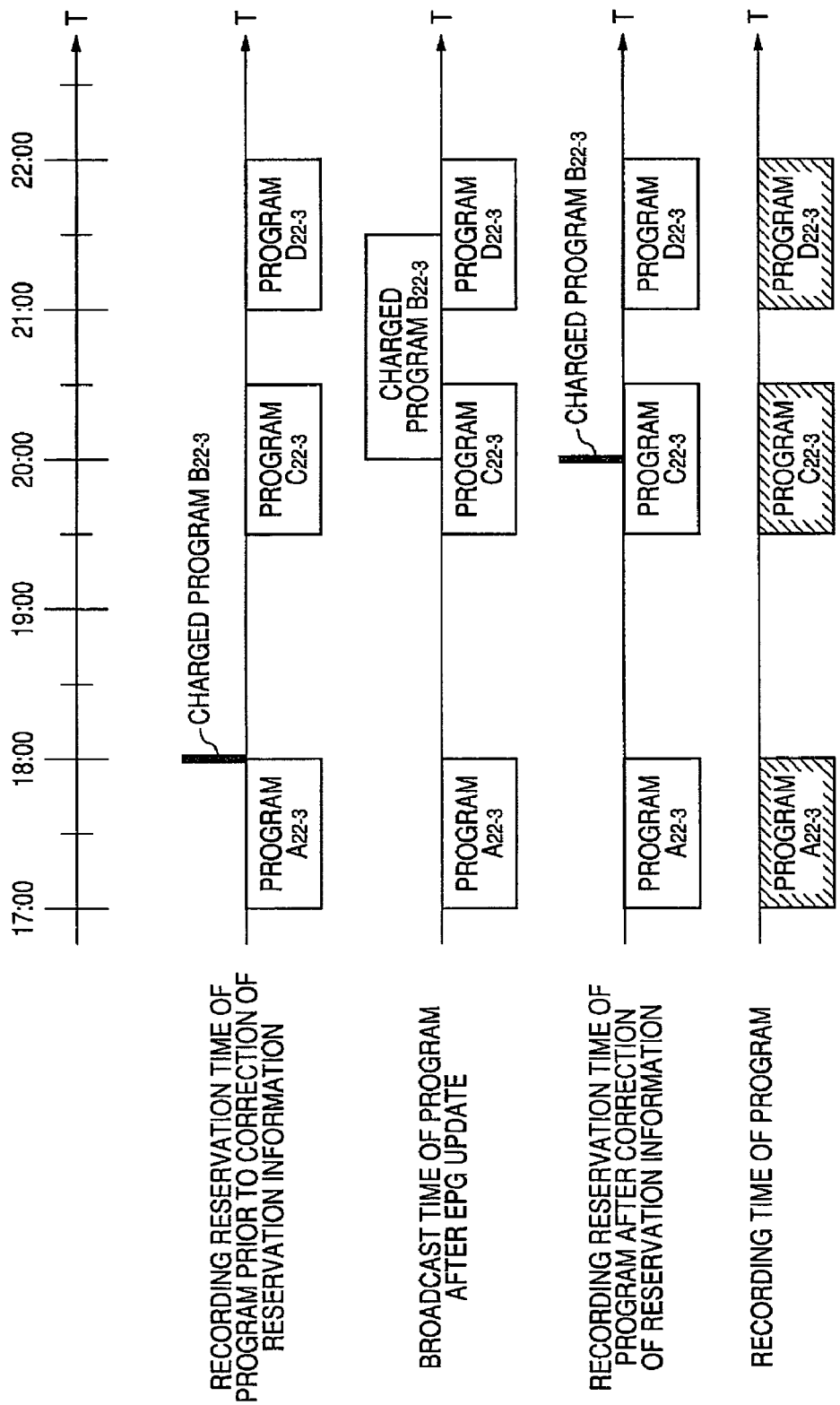
FIG. 34 is a diagram illustrating correction of reservation information on a charged program, which is not in recording.

Further, for example, as shown in FIG. 34, it is assumed that, before new EPG data is received, the reservation information of the program $A_{22-3}$ whose recording start time is 17:00 and recording end time is 18:00 is recorded in the reservation information list 163, the reservation information of the charged program $B_{22-3}$ whose recording start time is 18:00 and recording end time is 18:00 is recorded in the reservation information list 163, the reservation information of the program $C_{22-3}$ whose recording start time is 19:30 and recording end time is 20:30 is recorded in the reservation information list 163, and the reservation information of the program $D_{22-3}$ whose recording start time is 21:00 and recording end time is 22:00 is recorded in the reservation information list 163

At this time, it is assumed that, for example, the EIT (schedule) as EPG data is received. In the received EIT (schedule), when broadcast start time of the charged program $B_{22-3}$ is 20:00 and broadcast end time thereof is 21:30, that is, when broadcast time of the charged program $B_{22-3}$ after the EPG update is changed from 20:00 to 21:30, the reservation correction manager 162 sets 20:00, which is broadcast start time of the charged program $B_{22-3}$, as recording start time in the reservation information of the charged program $B_{22-3}$, and sets 20:00, which is the same as set recording start time, as recording end time.

Further, the reservation correction manager 162 may not correct the reservation information of the charged program $B_{22-3}$.

Accordingly, after the correction of the reservation information, recording start time in the reservation information of the charged program $B_{22-3}$ is 20:00, and recording end time therein is 20:00. This is because broadcast time of the charged program $B_{22-3}$ overlaps recording time of the program $C_{22-3}$ or the program $D_{22-3}$ after the update of EPG data. That is, this is because the recording priority of the program $C_{22-3}$ or the program $D_{22-3}$ to be reserved in advance is higher than the recording priority of the charged program $B_{22-3}$ with changed broadcast time.

Therefore, the recording manager 136 controls recording such that the program $A_{22-3}$ is recorded from 17:00 to 18:00. The recording manager 136 controls recording such that the program $C_{22-3}$ is recorded from 19:30 to 20:30. The recording manager 136 controls recording such that the program $D_{22-3}$ is recorded from 21:00 to 22:00. The recording manager 136 controls recording such that recording of the charged program $B_{22-3}$ is suppressed. That is, the charged program $B_{22-3}$ is not recorded. The recording manager 136 controls recording such that the charged program $B_{22-3}$ is recorded from 20:00 to 20:00. That is, the charged program $B_{22-3}$ is not recorded.

Figure 35:
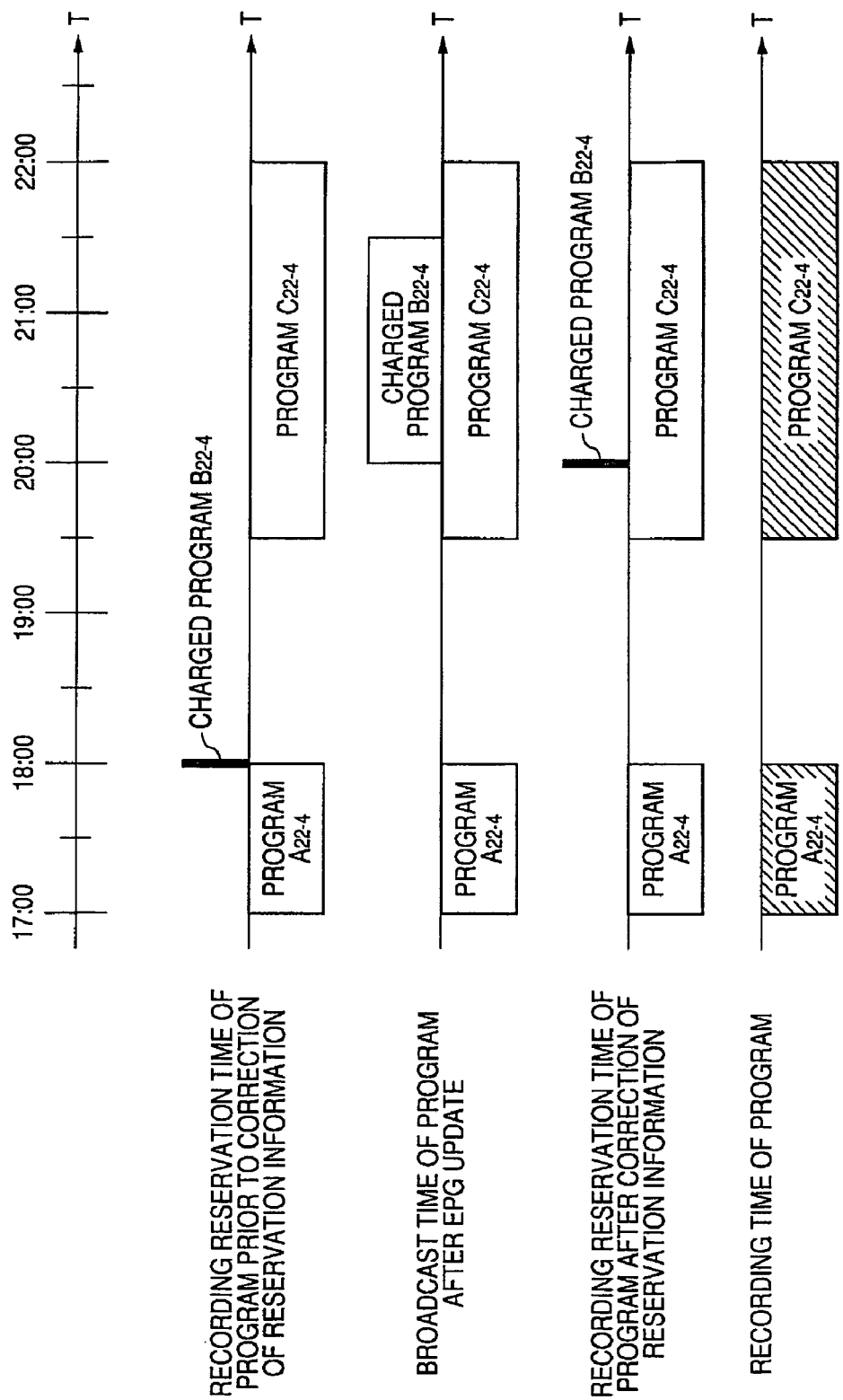
FIG. 35 is a diagram illustrating correction of reservation information on a charged program, which is not in recording.

In addition, for example, as shown in FIG. 35, it is assumed that, before new EPG data is received, the reservation information of the program $A_{22-4}$ whose recording start time is 17:00 and recording end time is 18:00 is recorded in the reservation information list 163, the reservation information of the charged program $B_{22-4}$ whose recording start time is 18:00 and recording end time is 18:00 is recorded in the reservation information list 163, and the reservation information of the program $C_{22-4}$ whose recording start time is 19:30 and recording end time is 22:00 is recorded in the reservation information list 163.

At this time, it is assumed that, for example, the EIT (schedule) as EPG data is received. In the received EIT (schedule), when broadcast start time of the charged program $B_{22-4}$ is 20:00 and broadcast end time thereof is 21:30, that is, when broadcast time of the charged program $B_{22-4}$ after the EPG update is changed from 20:00 to 21:30, the reservation correction manager 162 sets 20:00, which is broadcast start time of the charged program $B_{22-4}$, as recording start time in the reservation information of the charged program $B_{22-4}$, and sets 20:00, which is the same as set recording start time, as recording end time, for example.

Further, the reservation correction manager 162 may not correct the reservation information of the charged program $B_{22-4}$.

Accordingly, after the correction of the reservation information, recording start time in the reservation information of the charged program $B_{22-4}$ is 20:00, and recording end time therein is 20:00. This is because broadcast time of the charged program $B_{22-4}$ overlaps recording time of the program $C_{22-4}$ after the update of EPG data. That is, this is because the recording priority of the program $C_{22-4}$ to be reserved in advance is set higher than the recording priority of the charged program $B_{22-4}$ with changed broadcast time.

Therefore, the recording manager 136 controls recording such that the program $A_{22-4}$ is recorded from 17:00 to 18:00. The recording manager 136 controls recording such that recording of the charged program $B_{22-4}$ is suppressed. That is, the charged program $B_{22-4}$ is not recorded. The recording manager 136 controls recording such that the program $C_{22-4}$ is recorded from 19:30 to 22:00.

As such, in the reserved recording program 121, the program which changed broadcast time is primarily set to have a low recording priority. Therefore, the recording priority of the program to be reserved for recording in advance is set higher than the recording priority of the charged program with changed broadcast time, which is not in recording. Further, as for the charged program, the fee is charged for recording the program. Therefore, when the entire charged program cannot be recorded, recording start time and recording end time in the reservation information are set such that recording of the charged program is suppressed.

At the step S421 of FIG. 27, when it is judged that there is no program whose recording time overlaps due to the change in broadcast time, the process progresses to a step S426, and then the reservation correction manager 162 corrects recording start time of the reservation information to broadcast start time of changed broadcast time and corrects recording end time of the reservation information to broadcast end time of changed broadcast time.

Figure 36:
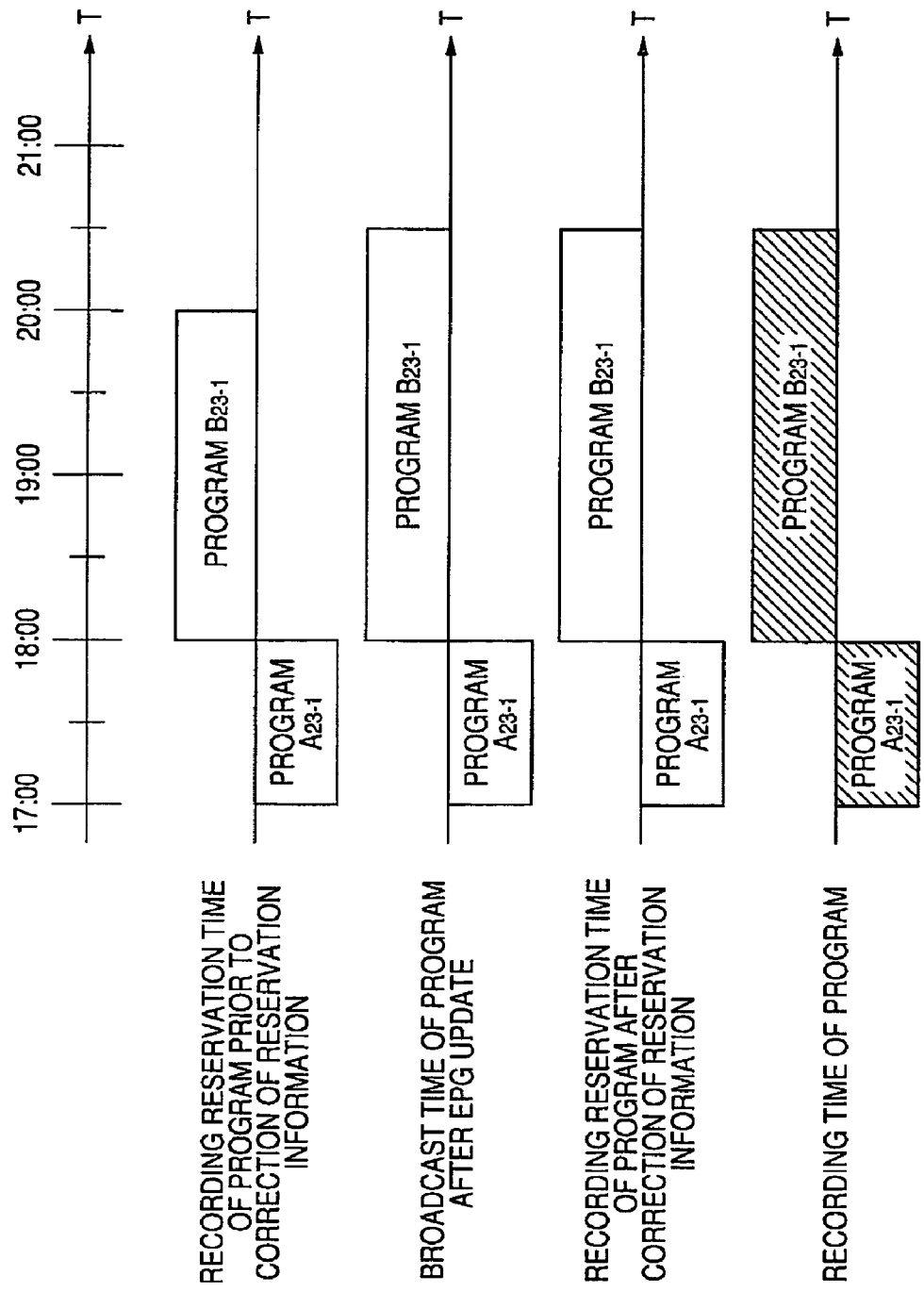
FIG. 36 is a diagram illustrating correction of reservation information on a program whose recording time does not overlap.

That is, for example, as shown in FIG. 36, it is assumed that, before new EPG data is received, the reservation information of the program $A_{23-1}$ whose recording start time is 17:00 and recording end time is 18:00 is recorded in the reservation information list 163, and the reservation information of the program $B_{23-1}$ whose recording start time is 18:00 and recording end time is 20:00 is recorded in the reservation information list 163.

At this time, it is assumed that, for example, the EIT (schedule) as EPG data is received. In the received EIT (schedule), when broadcast start time of the program $B_{23-1}$ is 18:00 and broadcast end time thereof is 20:30, that is, when broadcast time of the program $B_{23-1}$ after the EPG update is changed from 18:00 to 20:30, in the processing of the step. S426, the reservation correction manager 162 sets 20:30, which is broadcast start time of the program $B_{23-1}$, as recording end time in the reservation information of the program $B_{23-1}$.

Accordingly, after the correction of the reservation information, recording start time in the reservation information of the program $B_{23-1}$ is 18:00, and recording end time therein is 20:00.

Therefore, the recording manager 136 controls recording such that the program $A_{23-1}$ is recorded from 17:00 to 18:00. The recording manager 136 controls recording such that the program $B_{23-1}$ is recorded from 18:00 to 20:30.

Figure 37:
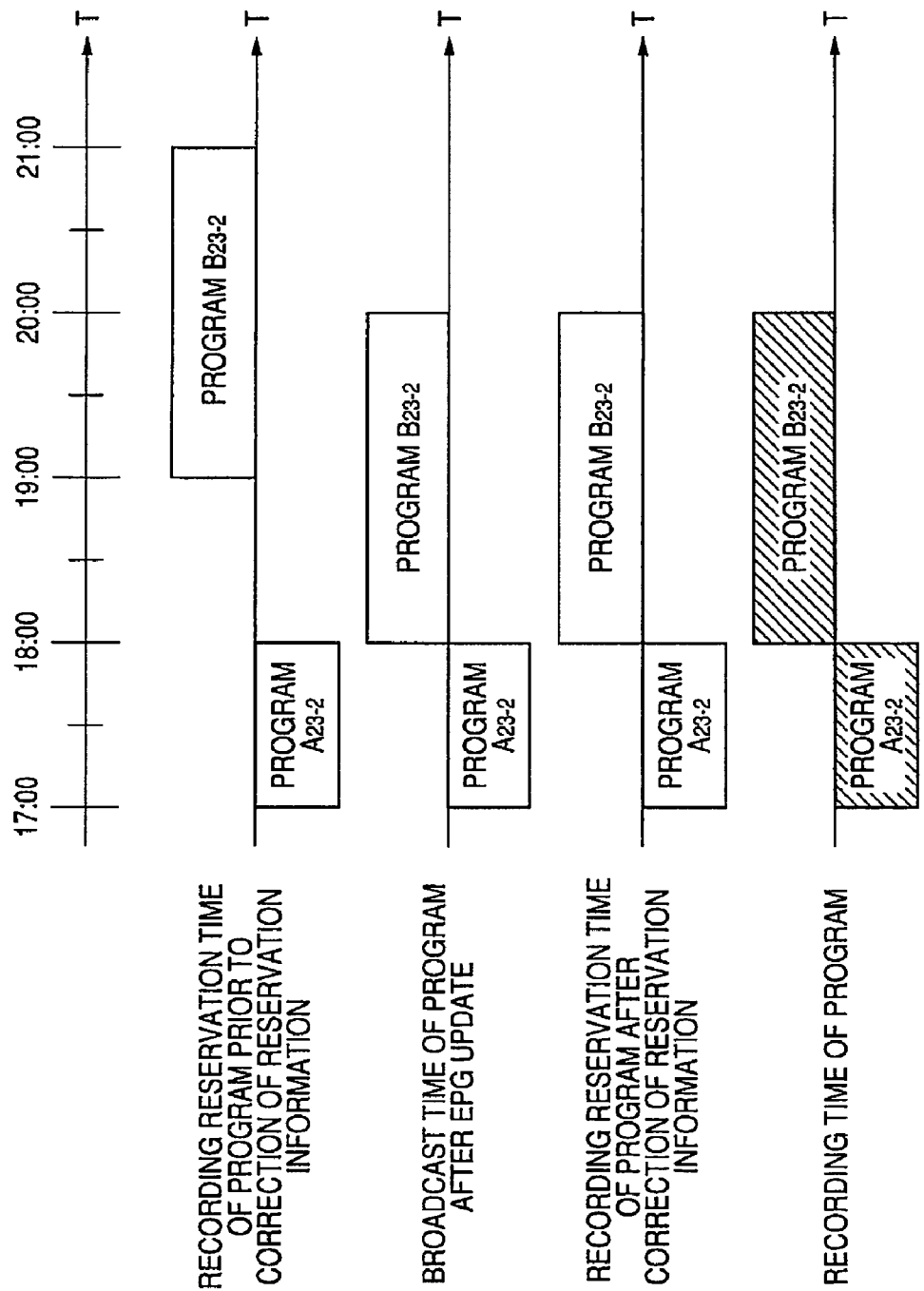
FIG. 37 is a diagram illustrating correction of reservation information on a program whose recording time does not overlap.

Further, for example, as shown in FIG. 37, it is assumed that, before new EPG data is received, the reservation information of the program $A_{23-2}$ whose recording start time is 17:00 and recording end time is 18:00 is recorded in the reservation information list 163, and the reservation information of the program $B_{23-2}$ whose recording start time is 19:00 and recording end time is 21:00 is recorded in the reservation information list 163.

At this time, it is assumed that, for example, the EIT (schedule) as EPG data is received. In the received EIT (schedule), when broadcast start time of the program $B_{23-2}$ is 18:00 and broadcast end time thereof is 20:00, that is, when broadcast time of the program $B_{23-2}$ after the EPG update is changed from 18:00 to 20:00, in the processing of the step S426, the reservation correction manager 162 corrects recording start time in the reservation information of the program $B_{23-2}$ from 19:00 to 18:00, which is broadcast start time of the program $B_{23-2}$, and corrects recording end time therein from 21:00 to 20:00, which is broadcast end time of the program $B_{23-2}$. That is, recording start time in the reservation information of the program $B_{23-2}$ is set to 18:00, and recording end time therein is set to 20:00.

Accordingly, after the correction of the reservation information, recording start time in the reservation information of the program $B_{23-2}$ is 18:00, and recording end time therein is 20:00.

Therefore, the recording manager 136 controls recording such that the program $A_{23-2}$ is recorded from 17:00 to 18:00. The recording manager 136 controls recording such that the program $B_{23-2}$ is recorded from 18:00 to 20:00.

Figure 38:
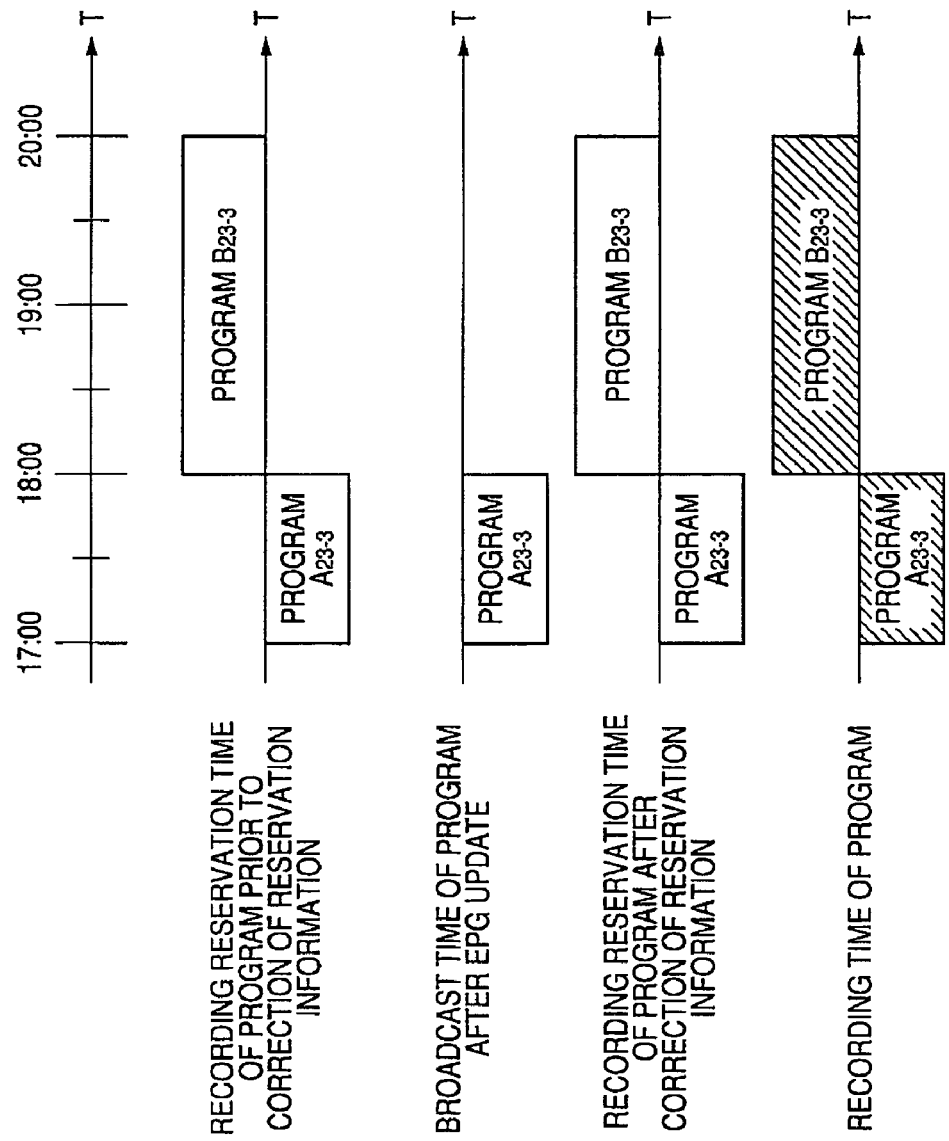
FIG. 38 is a diagram illustrating correction of reservation information when program information is not included in EPG data.

In addition, for example, as shown in FIG. 38, it is assumed that, before new EPG data is received, the reservation information of the program $A_{23-3}$ whose recording start time is 17:00 and recording end time is 18:00 is recorded in the reservation information list 163, and the reservation information of the program $B_{23-3}$ whose recording start time is 18:00 and recording end time is 20:00 is recorded in the reservation information list 163.

At this time, it is assumed that, for example, the EIT (schedule) as EPG data is received. In the received EIT (schedule), when broadcast start time and broadcast end time of the program $B_{23-3}$ are not included, the reservation correction manager 162 does not correct the reservation information of the program $B_{23-3}$.

Accordingly, after the correction of the reservation information, recording start time in the reservation information of the program $B_{23-3}$ is 18:00 unchanged, and recording end time therein is 20:00 unchanged.

Therefore, the recording manager 136 controls recording such that the program $A_{23-3}$ is recorded from 17:00 to 18:00. The recording manager 136 controls recording such that the program $B_{23-3}$ is recorded from 18:00 to 20:00.

Moreover, in the example shown in FIG. 38, at the step of S306 of FIG. 9, the reservation information when it is judged that the program corresponding to the reservation information assigned by the parameter i does not exist in the received EIT (schedule) is shown.

Figure 39:
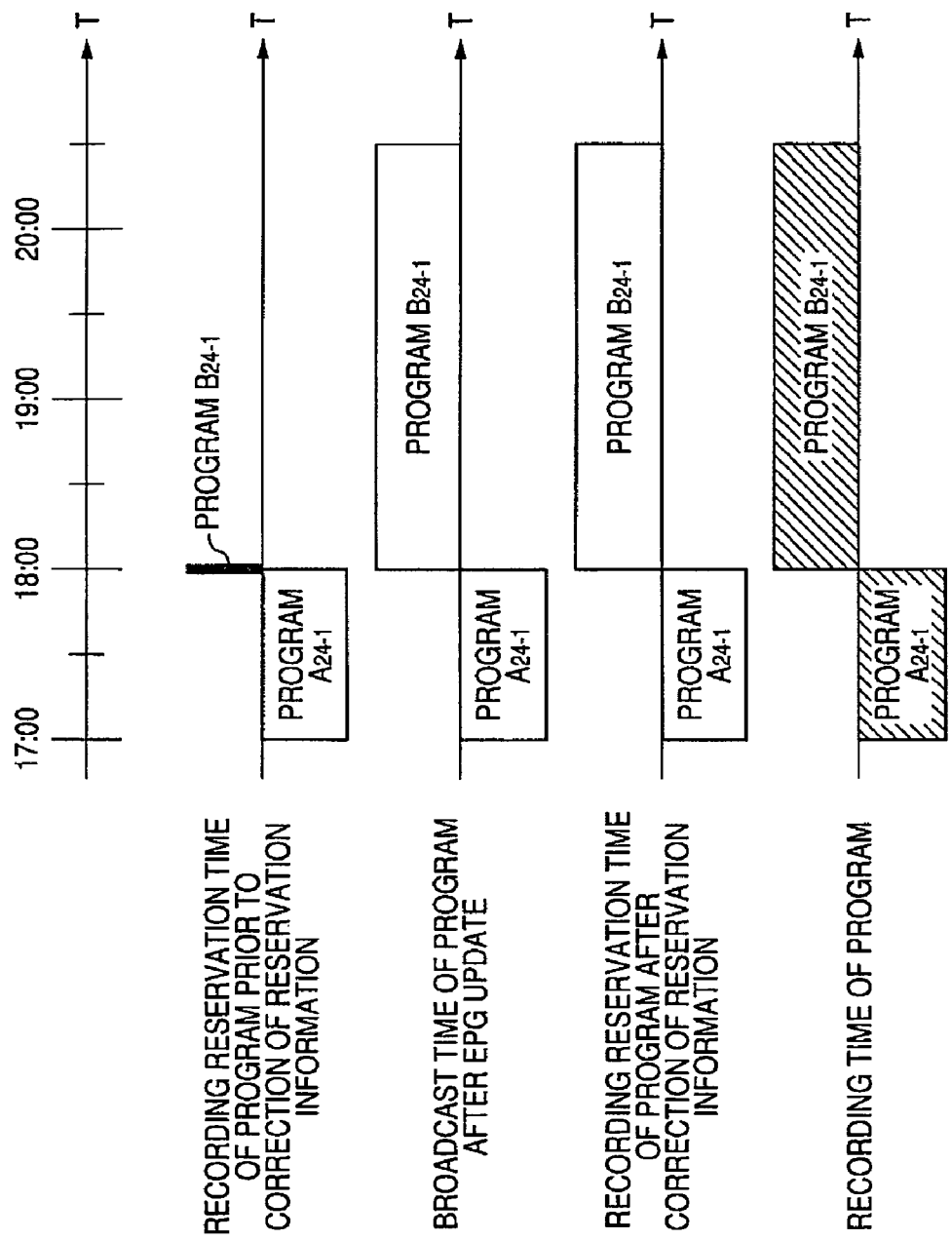
FIG. 39 is a diagram illustrating correction of reservation information on a program whose recording time does not overlap.

In addition, an example of the processing of the step S426 of FIG. 27 will be described. That is, for example, as shown in FIG. 39, it is assumed that, before new EPG data is received, the reservation information of the program $A_{24-1}$ whose recording start time is 17:00 and recording end time is 18:00 is recorded in the reservation information list 163, and the reservation information of the program $B_{24-1}$ whose recording start time is 18:00 and recording end time is 18:00 is recorded in the reservation information list 163.

At this time, it is assumed that, for example, the EIT (schedule) as EPG data is received. In the received EIT (schedule), when broadcast start time of the program $B_{24-1}$ is 18:00 and broadcast end time thereof is 20:30, that is, when broadcast time of the program $B_{24-1}$ after the EPG update is changed from 18:00 to 20:30, in the processing of the step S426, the reservation correction manager 162 corrects recording end time in the reservation information of the program $B_{24-1}$ from 18:00 to 20:30, which is broadcast end time of the program $B_{24-1}$. That is, recording end time in the reservation information of the program $B_{24-1}$ is set to 20:30.

Accordingly, after the correction of the reservation information, recording start time in the reservation information of the program $B_{24-1}$ is 18:00, and recording end time therein is 20:30.

Therefore, the recording manager 136 controls recording such that the program $A_{24-1}$ is recorded from 17:00 to 18:00. The recording manager 136 controls recording such that the program $B_{24-1}$ is recorded from 18:00 to 20:30.

Figure 40:
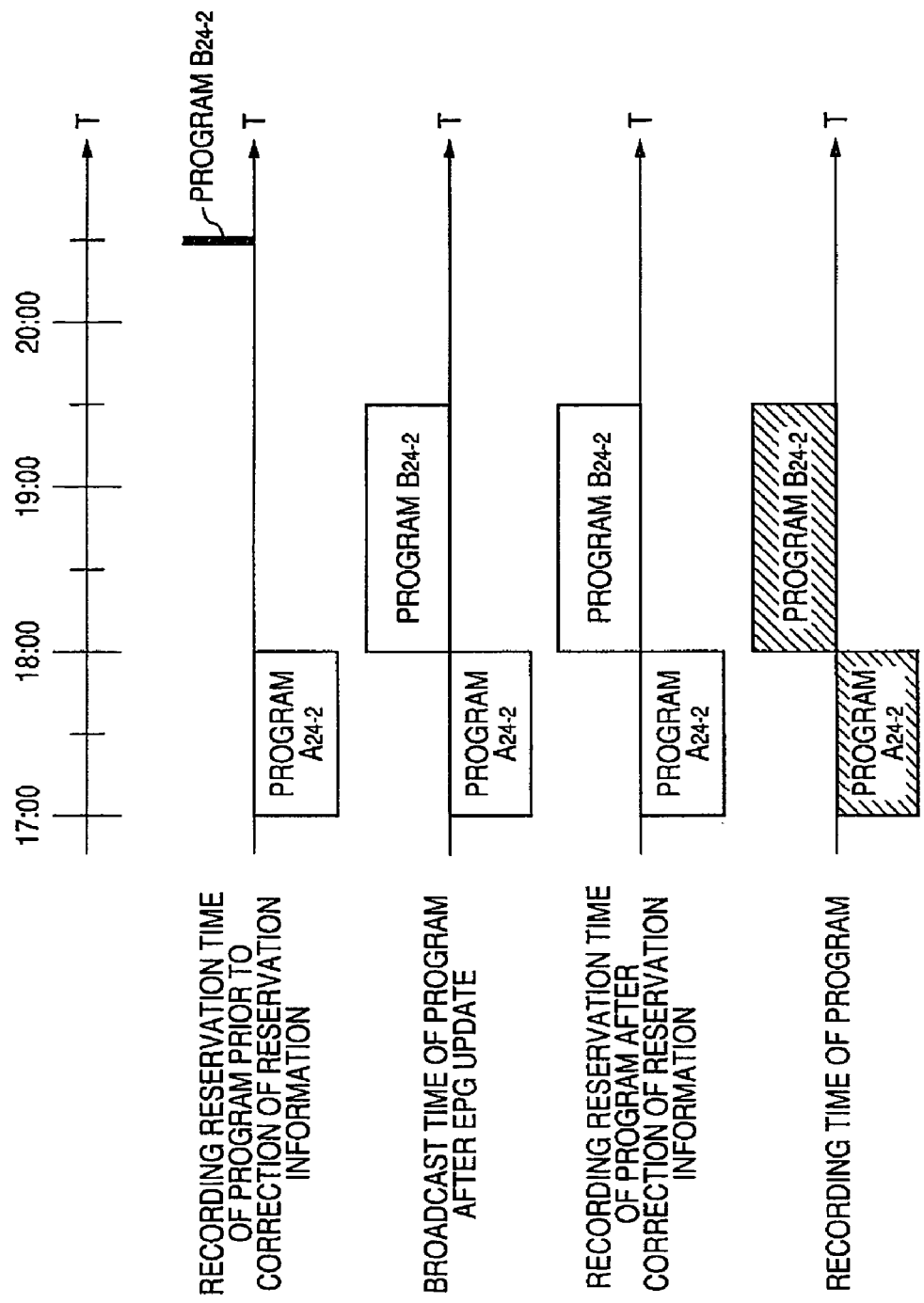
FIG. 40 is a diagram illustrating correction of reservation information on a program whose recording time does not overlap.

Further, for example, as shown in FIG. 40, it is assumed that, before new EPG data is received, the reservation information of the program $A_{24-2}$ whose recording start time is 17:00 and recording end time is 18:00 is recorded in the reservation information list 163, and the reservation information of the program $B_{24-2}$ whose recording start time is 20:30 and recording end time is 20:30 is recorded in the reservation information list 163.

At this time, it is assumed that, for example, the EIT (schedule) as EPG data is received. In the received EIT (schedule), when broadcast start time of the program $B_{24-2}$ is 18:00 and broadcast end time thereof is 19:30, that is, when broadcast time of the program $B_{24-2}$ after the EPG update is changed from 18:00 to 19:30, in the processing of the step S426, the reservation correction manager 162 sets 18:00, which is broadcast start time of the program $B_{24-2}$, as recording start time in the reservation information of the program $B_{24-2}$, and sets 19:30, which is broadcast end time of the program $B_{24-2}$, as recording end time in the reservation information of the program $B_{24-2}$.

Accordingly, after the correction of the reservation information, recording start time in the reservation information of the program $B_{24-2}$ is 18:00, and recording end time therein is 19:30.

Therefore, the recording manager 136 controls recording such that the program $A_{24-2}$ is recorded from 17:00 to 18:00. The recording manager 136 controls recording such that the program $B_{24-2}$ is recorded from 18:00 to 19:30.

Figure 41:
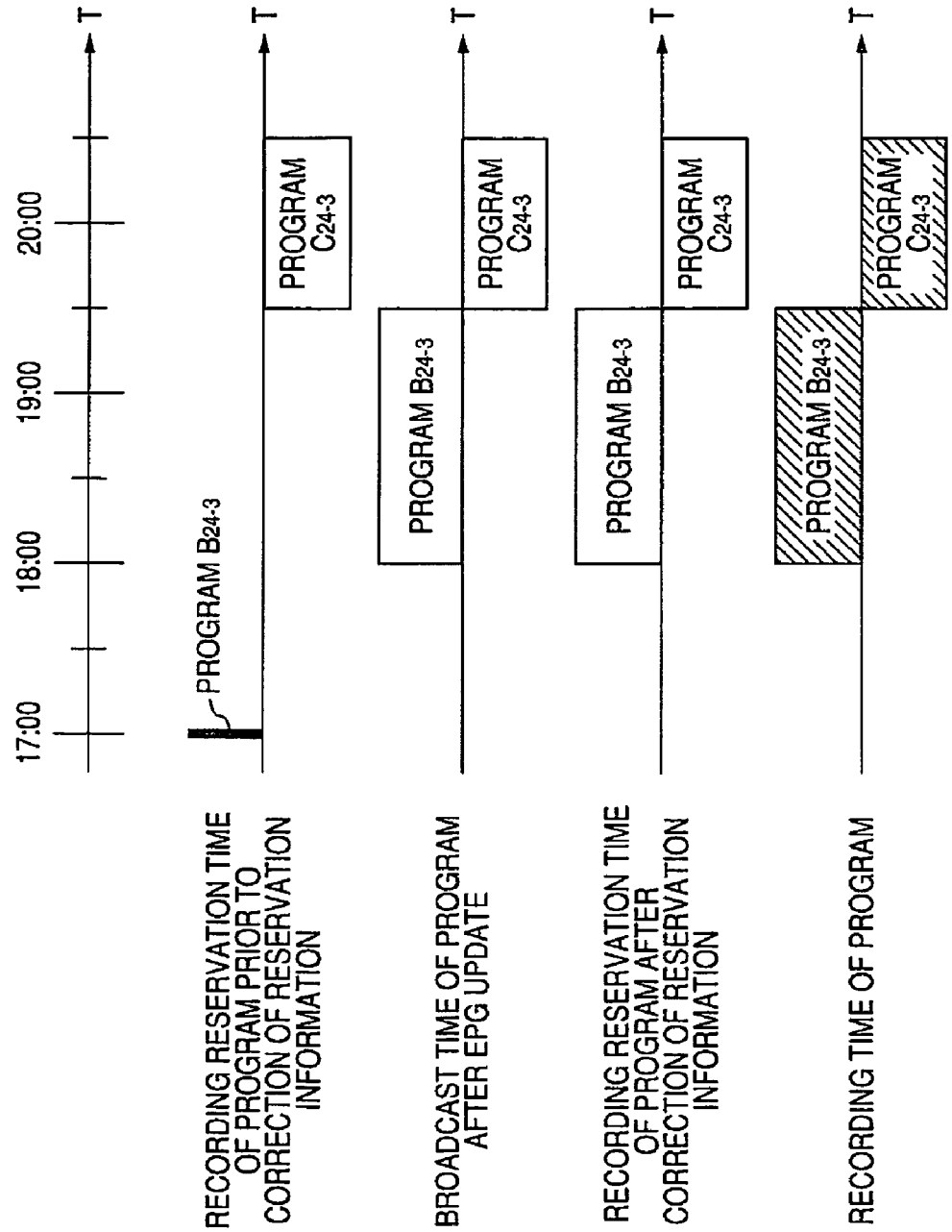
FIG. 41 is a diagram illustrating correction of reservation information on a program whose recording time does not overlap.

For example, as shown in FIG. 41, it is assumed that, before new EPG data is received, the reservation information of the program $B_{24-3}$ whose recording start time is 17:00 and recording end time is 17:00 is recorded in the reservation information list 163, and the reservation information of the program $C_{24-3}$ whose recording start time is 19:30 and recording end time is 20:30 is recorded in the reservation information list 163.

At this time, it is assumed that, for example, the EIT (schedule) as EPG data is received. In the received EIT (schedule), when broadcast start time of the program $B_{24-3}$ is 18:00 and broadcast end time thereof is 19:30, that is, when broadcast time of the program $B_{24-3}$ after the EPG update is changed from 18:00 to 19:30, in the processing of the step S426, the reservation correction manager 162 corrects recording start time in the reservation information of the program $B_{24-3}$ from 17:00 to 18:00, which is broadcast start time of the program $B_{24-3}$, and corrects recording end time therein from 17:00 to 19:30, which is broadcast end time of the program $B_{24-3}$. That is, recording start time in the reservation information of the program $B_{24-3}$ is set to 18:00, and recording end time therein is set to 19:30.

Accordingly, after the correction of the reservation information, recording start time in the reservation information of the program $B_{24-3}$ is 18:00, and recording end time therein is 19:30.

Therefore, the recording manager 136 controls recording such that the program $B_{24-3}$ is recorded from 18:00 to 19:30. The recording manager 136 controls recording such that the program $C_{24-3}$ is recorded from 19:30 to 20:30.

Figure 42:
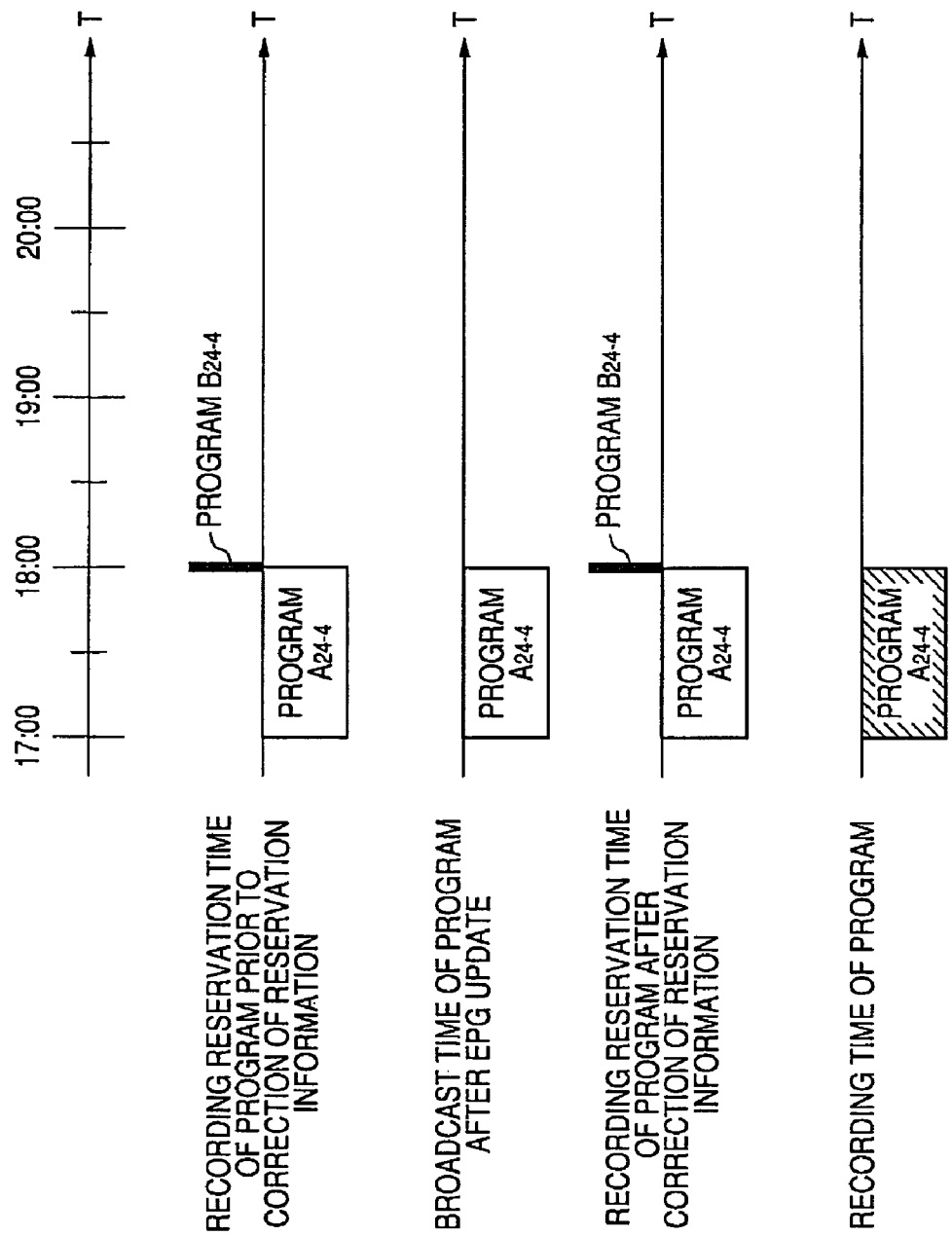
FIG. 42 is a diagram illustrating correction of reservation information on a program whose recording time does not overlap.

For example, as shown in FIG. 42, it is assumed that, before new EPG data is received, the reservation information of the program $A_{24-4}$ whose recording start time is 17:00 and recording end time is 18:00 is recorded in the reservation information list 163, and the reservation information of the program $B_{24-4}$ whose recording start time is 18:00 and recording end time is 18:00 is recorded in the reservation information list 163.

At this time, it is assumed that, for example, the EIT (schedule) as EPG data is received. In the received EIT (schedule), when broadcast start time and broadcast end time of the program $B_{24-4}$ are not included, the reservation correction manager 162 does not correct the reservation information of the program $B_{24-4}$.

Accordingly, after the correction of the reservation information, recording start time in the reservation information of the program $B_{24-4}$ is 18:00, and recording end time therein is 18:00.

Therefore, the recording manager 136 controls recording such that the program $A_{24-4}$ is recorded from 17:00 to 18:00. The recording manager 136 controls recording such that recording of the program $B_{24-4}$ is suppressed. That is, the program $B_{24-4}$ is not recorded.

Moreover, in the example shown in FIG. 42, at the step S306 of FIG. 9, the reservation information when it is judged that the program corresponding to the reservation information assigned by the parameter i does not exist in the received EIT (schedule) is shown.

As such, when there is no program whose recording time overlaps, the reservation information is corrected such that changed broadcast start time is set as recording start time and changed broadcast end time is set as recording end time.

After the step S426, the process returns to the step S309 of FIG. 9, and then the above-described processing is executed.

At the step S422 of FIG. 27, when it is judged that recording reservation of the program with changed broadcast time is caused by automatic recording, the process progresses to a step S427, and the reservation correction manager 162 deletes the reservation information of the program with changed broadcast time by automatic recording.

Figure 43:
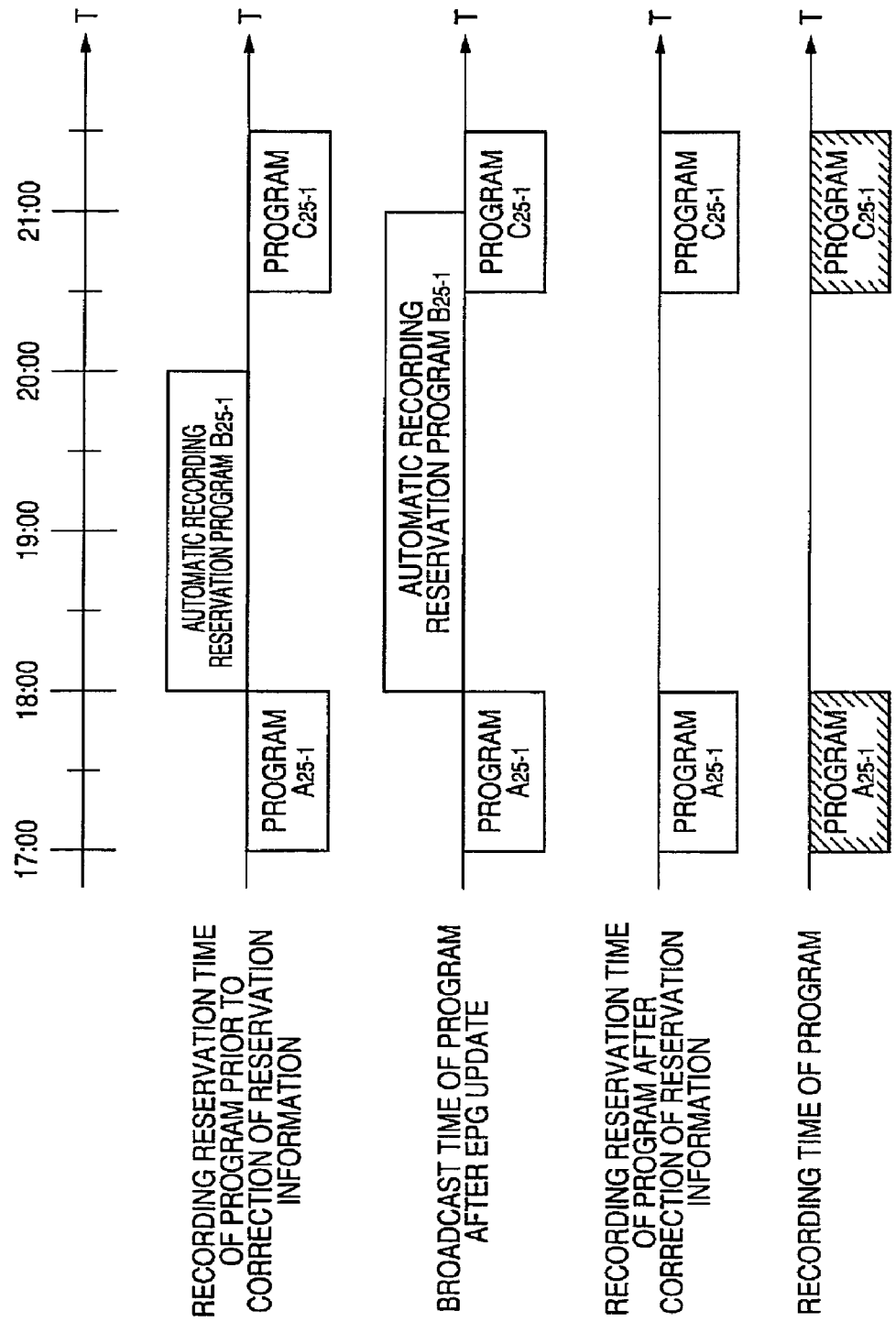
FIG. 43 is a diagram illustrating correction of reservation information of an automatic recording reservation program, which is not in recording.

That is, for example, as shown in FIG. 43, it is assumed that, before new EPG data is received, the reservation information of the program $A_{25-1}$ whose recording start time is 17:00 and recording end time is 18:00 is recorded in the reservation information list 163, the reservation information of the automatic recording reservation program $B_{25-1}$ whose recording start time is 18:00 and recording end time is 20:00 is recorded in the reservation information list 163, and the reservation information of the program $C_{25-1}$ whose recording start time is 20:30 and recording end time is 21:30 is recorded in the reservation information list 163.

At this time, it is assumed that, for example, the EIT (schedule) as EPG data is received. In the received EIT (schedule), when broadcast end time of the automatic recording reservation program $B_{25-1}$ is 21:00, that is, when broadcast time of the automatic recording reservation program $B_{25-1}$ after the EPG update is changed from 18:00 to 21:00, in the processing of the step S427, the reservation correction manager 162 deletes the reservation information of the automatic recording reservation program $B_{25-1}$.

Therefore, the recording manager 136 controls recording such that the program $A_{25-1}$ is recorded from 17:00 to 18:00. The recording manager 136 controls recording such that the program $C_{25-1}$ is recorded from 20:30 to 21:30.

Figure 44:
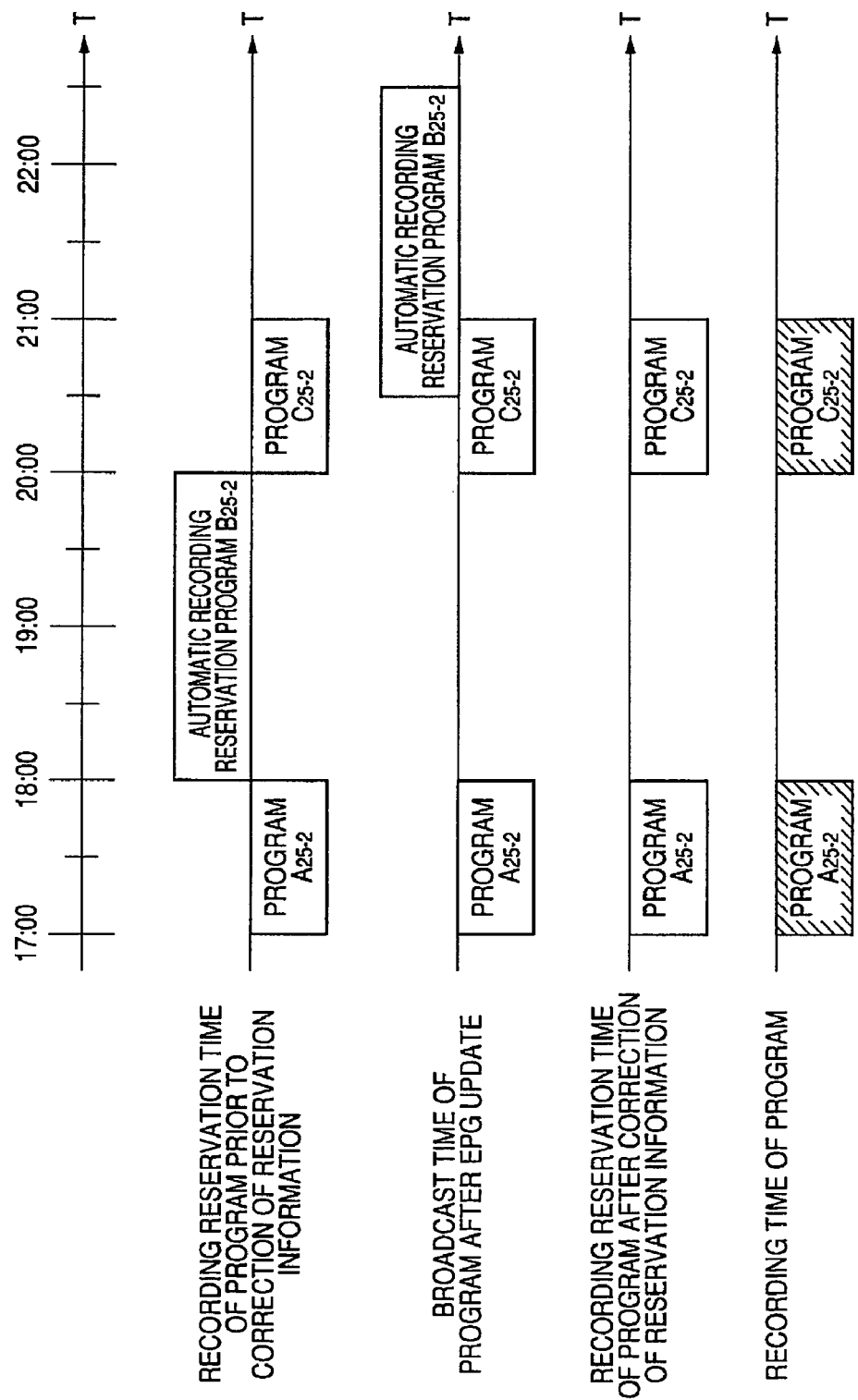
FIG. 44 is a diagram illustrating correction of reservation information of an automatic recording reservation program, which is not in recording.

Further, for example, as shown in FIG. 44, it is assumed that, before new EPG data is received, the reservation information of the program $A_{25-2}$ whose recording start time is 17:00 and recording end time is 18:00 is recorded in the reservation information list 163, the reservation information of the automatic recording reservation program $B_{25-2}$ whose recording start time is 18:00 and recording end time is 20:00 is recorded in the reservation information list 163, and the reservation information of the program $C_{25-2}$ whose recording start time is 20:00 and recording end time is 21:00 is recorded in the reservation information list 163.

At this time, it is assumed that, for example, the EIT (schedule) as EPG data is received. In the received EIT (schedule), when broadcast start time of the automatic recording reservation program $B_{25-2}$ is 20:30 and broadcast end time thereof is 22:30, that is, when broadcast time of the automatic recording reservation program $B_{25-2}$ after the EPG update is changed from 20:30 to 22:30, in the processing of the step S427, the reservation correction manager 162 deletes the reservation information of the automatic recording reservation program $B_{25-2}$.

Therefore, the recording manager 136 controls recording such that the program $A_{25-2}$ is recorded from 17:00 to 18:00. The recording manager 136 controls recording such that the program $C_{25-2}$ is recorded from 20:00 to 21:00.

Figure 45:
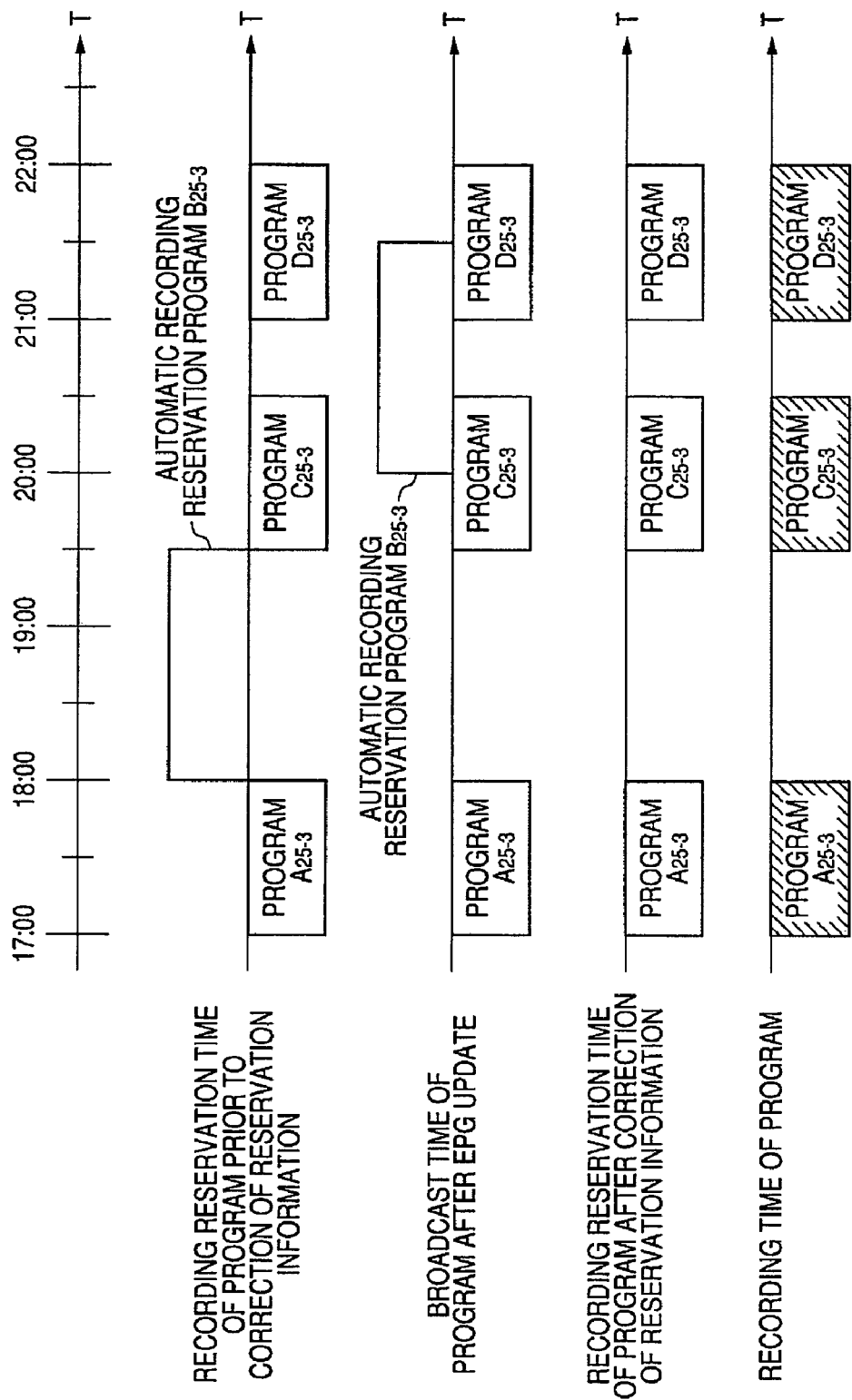
FIG. 45 is a diagram illustrating correction of reservation information of an automatic recording reservation program, which is not in recording.

Further, for example, as shown in FIG. 45, it is assumed that, before new EPG data is received, the reservation information of the program $A_{25-3}$ whose recording start time is 17:00 and recording end time is 18:00 is recorded in the reservation information list 163, the reservation information of the automatic recording reservation program $B_{25-3}$ whose recording start time is 18:00 and recording end time is 19:30 is recorded in the reservation information list 163, the reservation information of the program $C_{25-3}$ whose recording start time is 19:30 and recording end time is 20:30 is recorded in the reservation information list 163, and the reservation information of the program $D_{25-3}$ whose recording start time is 21:00 and recording end time is 22:00 is recorded in the reservation information list 163.

At this time, it is considered that, for example, the EIT (schedule) as EPG data is received. In the received EIT (schedule), when broadcast start time of the automatic recording reservation program $B_{25-3}$ is 20:00 and broadcast end time thereof is 21:30, that is, when broadcast time of the automatic recording reservation program $B_{25-3}$ after the EPG update is changed from 20:00 to 21:30, in the processing of the step S427, the reservation correction manager 162 deletes the reservation information of the automatic recording reservation program $B_{25-3}$.

Therefore, the recording manager 136 controls recording such that the program $A_{25-3}$ is recorded from 17:00 to 18:00. The recording manager 136 controls recording such that the program $C_{25-3}$ is recorded from 19:30 to 20:30. The recording manager 136 controls recording such that the program $D_{25-3}$ is recorded from 21:00 to 22:00.

Figure 46:
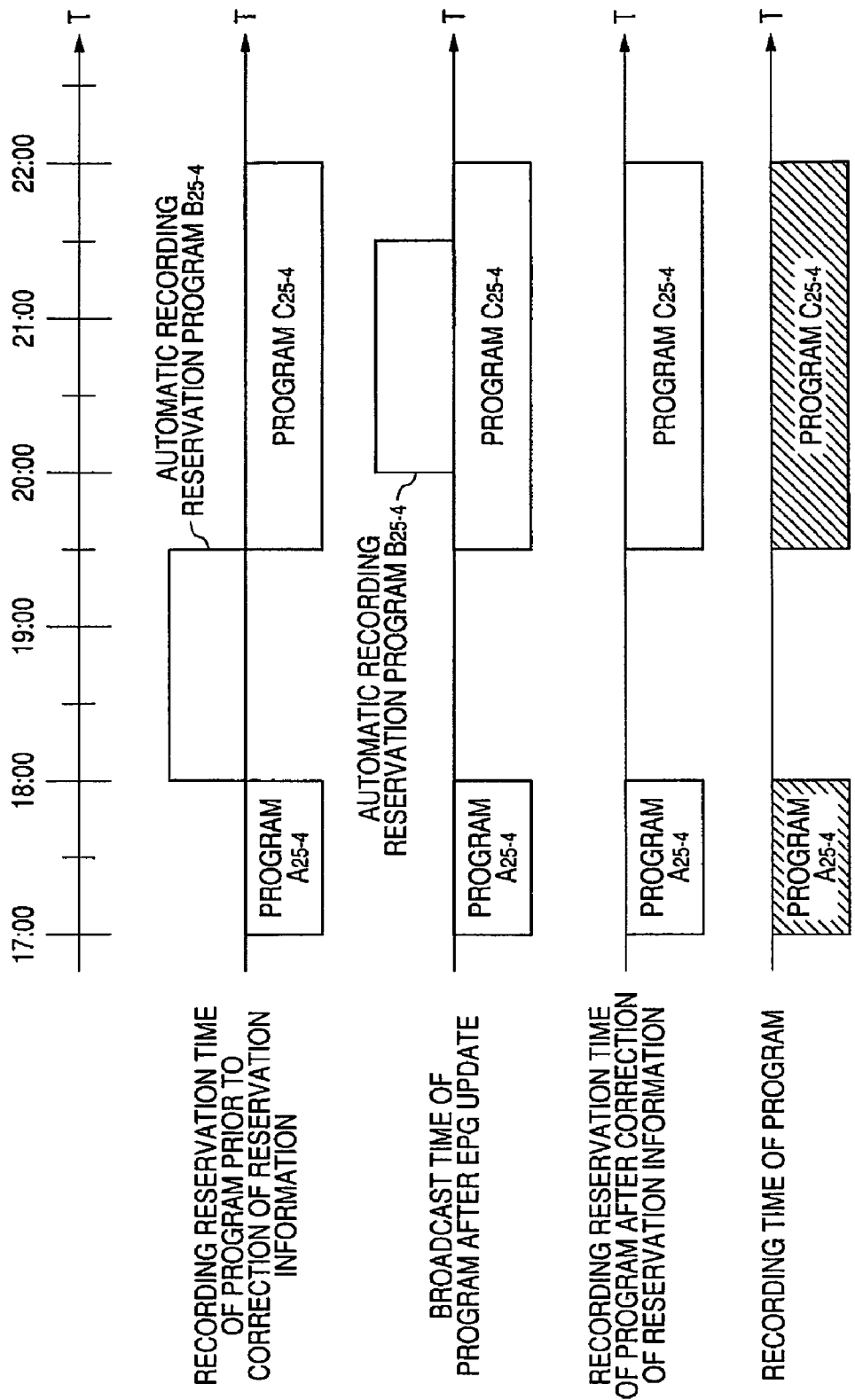
FIG. 46 is a diagram illustrating correction of reservation information of an automatic recording reservation program, which is not in recording.

In addition, for example, as shown in FIG. 46, it is assumed that, before new EPG data is received, the reservation information of the program $A_{25-4}$ whose recording start time is 17:00 and recording end time is 18:00 is recorded in the reservation information list 163, the reservation information of the automatic recording reservation program $B_{25-4}$ whose recording start time is 18:00 and recording end time is 19:30 is recorded in the reservation information list 163, and the reservation information of the program $C_{25-4}$ whose recording start time is 19:30 and recording end time is 22:00 is recorded in the reservation information list 163.

At this time, it is considered that, for example, the EIT (schedule) as EPG data is received. In the received EIT (schedule), when broadcast start time of the automatic recording reservation program $B_{25-4}$ is 20:00 and broadcast end time thereof is 21:30, that is, when broadcast time of the automatic recording reservation program $B_{25-4}$ after the EPG update is changed from 20:00 to 21:30, in the processing of the step S427, the reservation correction manager 162 deletes the reservation information of the automatic recording reservation program $B_{25-4}$.

Therefore, the recording manager 136 controls recording such that the program $A_{25-4}$ is recorded from 17:00 to 18:00. The recording manager 136 controls recording such that the program $C_{25-4}$ is recorded from 19:30 to 22:00.

As such, when the program whose recording time overlaps is the automatic recording reservation program, the reservation information of the automatic recording reservation program is deleted.

After the step S427 of FIG. 27, the process returns to the step S309 of FIG. 9, and then the above-described processing is executed.

At the step S423, when it is judged that program with changed broadcast time is not the charged program, the process progresses to a step S428, and the reservation correction manager 162 executes the reservation information correction processing on the free program, which is not in recording. The details of this processing will be described with reference to a flowchart of FIG. 47. With this processing, one or both of recording stat time and recording end time in the reservation information of the free program, which is not in recording, are corrected.

After the step S428, the process returns to the step S309 of FIG. 9, and then the above-described processing is executed.

Figure 47:
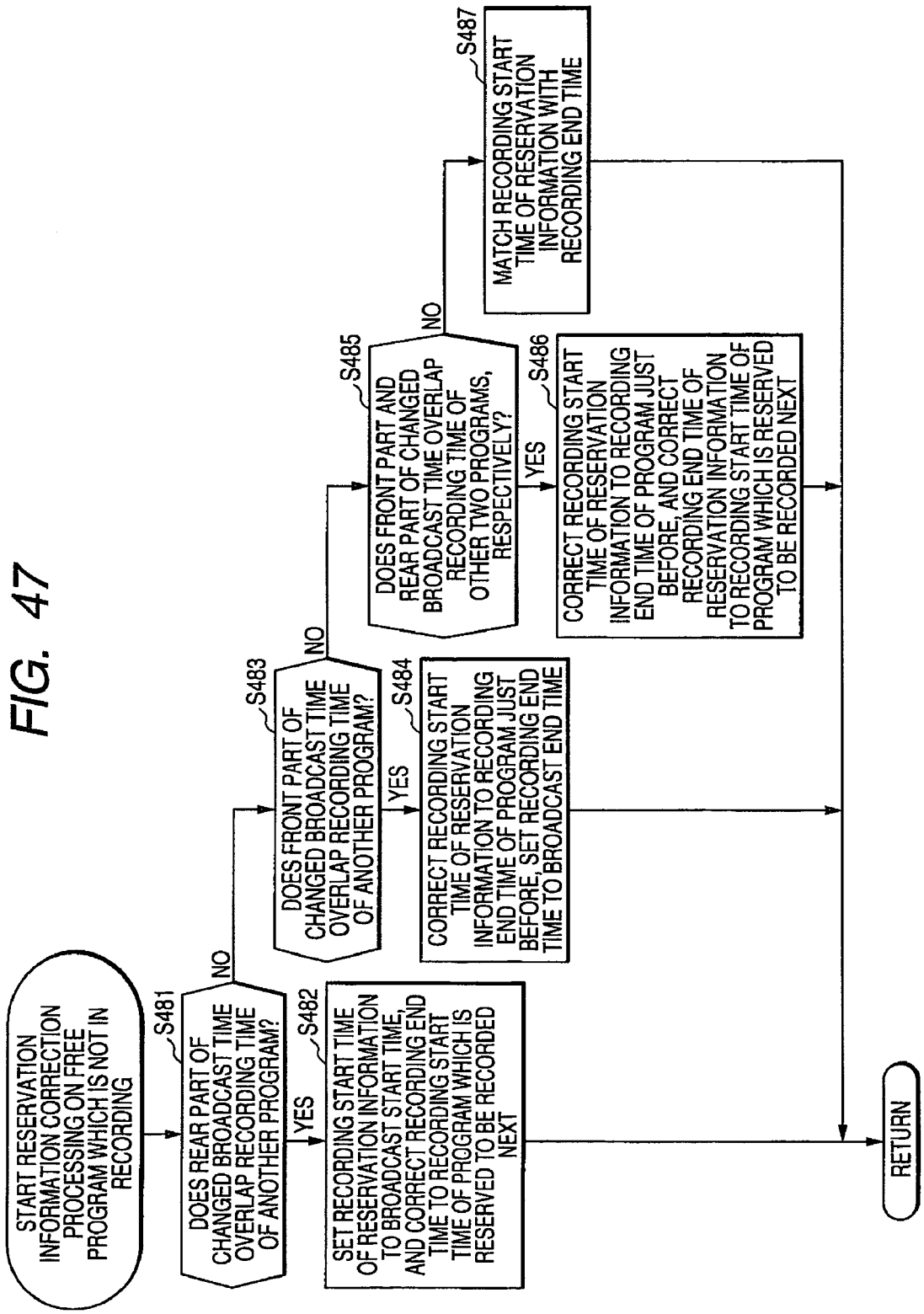
FIG. 47 is a flowchart illustrating reservation information correction processing on a free program, which is not in recording.

With reference to the flowchart of FIG. 47, the reservation information correction processing corresponding to the step S428 of FIG. 27, on the free program, which is not in recording, will be described.

At a step S481, the reservation correction manager 162 judges whether or not the rear part of changed broadcast time overlaps recording time of another program. That is, it is judged whether or not broadcast end time of changed broadcast time is the time within recording time of another program.

More specifically, at the step S481, the reservation correction manager 162 judges whether or not recording end time in recording time when recording is performed from broadcast start time in changed broadcast time to broadcast end time therein is the time within recording time of the program to be reserved for recording by another reservation information.

At the step S481, when it is judged that the rear part of changed broadcast time overlaps recording time of another program, the process progresses to a step S482, and the reservation correction manager 162 sets recording start time of the reservation information to broadcast start time, and corrects recording end time of the reservation information to recording start time of the next program to be reserved (the program whose recording time overlaps and broadcast starts later than broadcast start time of the program to be recorded by the corrected reservation information).

Figure 48:
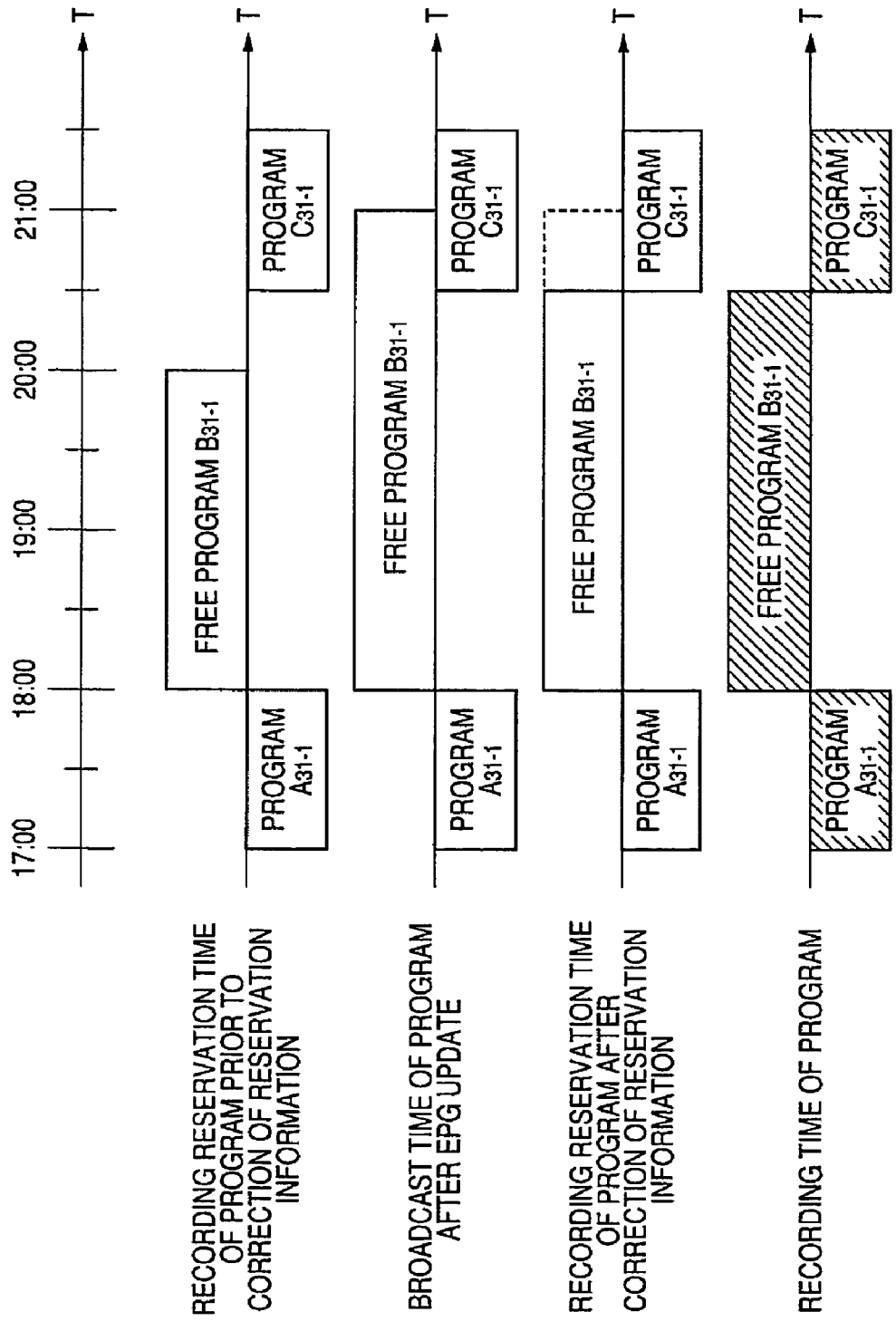
FIG. 48 is a diagram illustrating correction of reservation information on a free program, which is not in recording.

That is, for example, as shown in FIG. 48, it is assumed that, before new EPG data is received, the reservation information of the program $A_{31-1}$ whose recording start time is 17:00 and recording end time is 18:00 is recorded in the reservation information list 163, the reservation information of the free program $B_{31-1}$ whose recording start time is 18:00 and recording end time is 20:00 is recorded in the reservation information list 163, and the reservation information of the program $C_{31-1}$ whose recording start time is 20:30 and recording end time is 21:30 is recorded in the reservation information list 163.

At this time, it is assumed that, for example, the EIT (schedule) as EPG data is received. In the received EIT (schedule), when broadcast end time of the free program $B_{31-1}$ is 21:00, that is, when broadcast time of the free program $B_{31-1}$ after the EPG update is changed from 18:00 to 21:00, in the processing of the step S482, the reservation correction manager 162 leaves recording start time in the reservation information of the free program $B_{31-1}$ as 18:00 unchanged, and sets recording end time therein from 20:00 to 20:30, which is recording start time of the program $C_{31-1}$.

Accordingly, after the correction of the reservation information, recording start time in the reservation information of the free program $B_{31-1}$ is 18:00, and recording end time therein is 20:30.

Therefore, the recording manager 136 controls recording such that the program $A_{31-1}$ is recorded from 17:00 to 18:00. The recording manager 136 controls recording such that the free program $B_{31-1}$ is recorded from 18:00 to 20:30. The recording manager 136 controls recording such that the program $C_{31-1}$ is recorded from 20:30 to 21:30.

Figure 49:
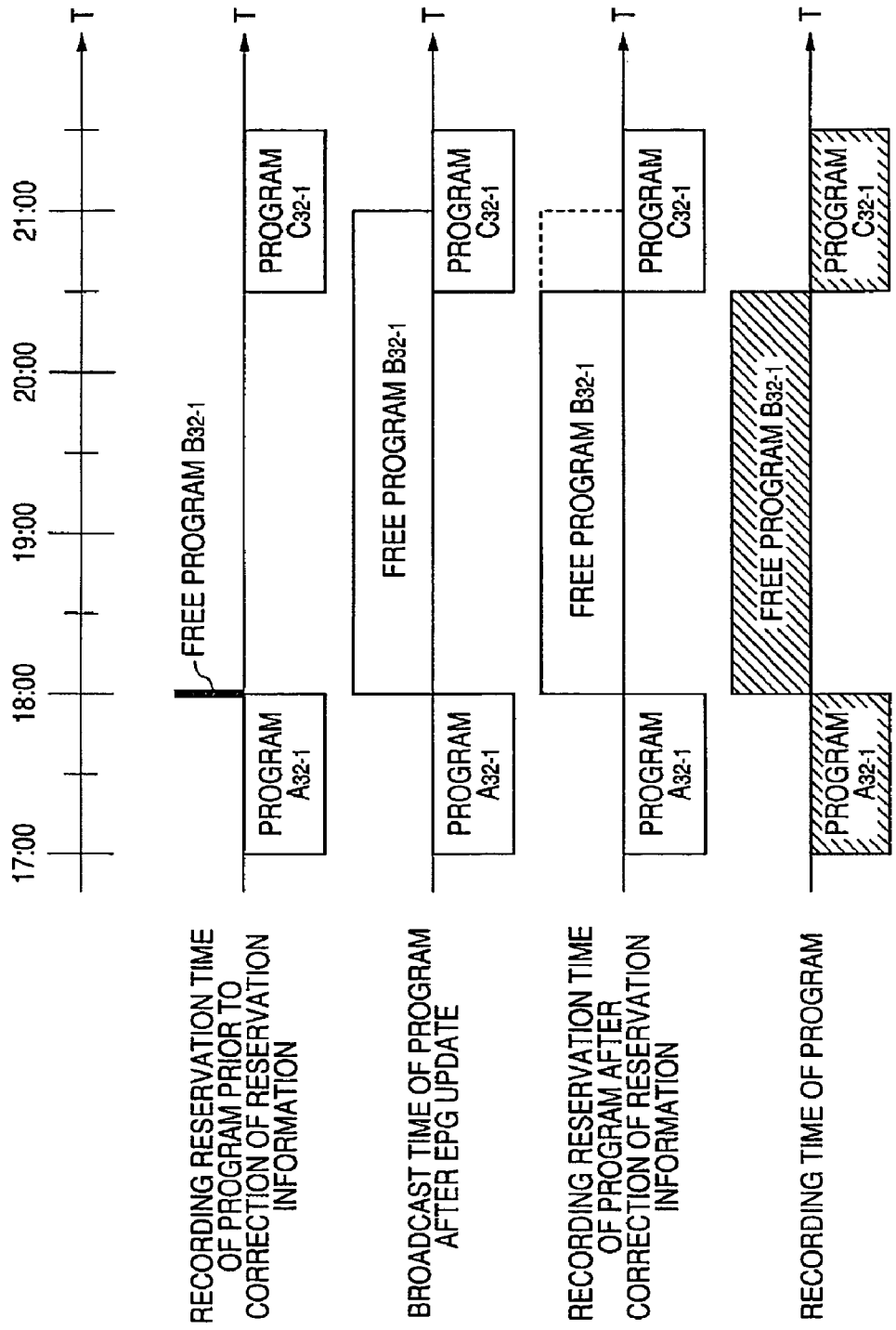
FIG. 49 is a diagram illustrating correction of reservation information on a free program, which is not in recording.

Further, for example, as shown in FIG. 49, it is assumed that, before new EPG data is received, the reservation information of the program $A_{32-1}$ whose recording start time is 17:00 and recording end time is 18:00 is recorded in the reservation information list 163, the reservation information of the free program $B_{32-1}$ whose recording start time is 18:00 and recording end time is 18:00 is recorded in the reservation information list 163, and the reservation information of the program $C_{32-1}$ whose recording start time is 20:30 and recording end time is 21:30 is recorded in the reservation information list 163.

At this time, it is assumed that, for example, the EIT (schedule) as EPG data is received. In the received EIT (schedule), when broadcast end time of the free program $B_{32-1}$ is 21:00, that is, when broadcast time of the free program $B_{32-1}$ after the EPG update is changed from 18:00 to 21:00, in the processing of the step S482, the reservation correction manager 162 leaves recording start time in the reservation information of the free program $B_{32-1}$ as 18:00 unchanged, and corrects recording end time therein from 18:00 to 20:30, which is recording start time of the program $C_{32-1}$. That is, recording end time in the reservation information of the free program $B_{32-1}$ is set to 20:30.

Accordingly, after the correction of the reservation information, recording start time in the reservation information of the free program $B_{32-1}$ is 18:00, and recording end time therein is 20:30.

Therefore, the recording manager 136 controls recording such that the program $A_{32-1}$ is recorded from 17:00 to 18:00. The recording manager 136 controls recording such that the free program $B_{32-1}$ is recorded from 18:00 to 20:30. The recording manager 136 controls recording such that the program $C_{32-1}$ is recorded from 20:30 to 21:30.

Moreover, though not shown, when broadcast start time of the free program $B_{31-1}$ of FIG. 48 is changed to 18:30, not 18:00, through the processing of the step S482, recording start time of the free program $B_{31-1}$ is set from 18:00 to 18:30, which is broadcast start time of the free program $B_{31-1}$.

As such, when broadcast end time in broadcast time after change of the free program prior to recording is the time within recording time of the next program to be reserved for recording, the reservation information is corrected such that recording start time of another program to be reserved for recording is set as recording end time of the free program.

After the step S482, the process returns to the step S309 of FIG. 9, and then the above-described processing is executed.

At the step S481, when it is judged that the rear part of changed broadcast time does not overlap recording time of another program, the process progresses to a step S483, and the reservation correction manager 162 judges whether or not the front part of changed broadcast time overlaps recording time of another program. That is, it is judged whether or not broadcast start time of changed broadcast time is the time within recording time of another program.

More specifically, at the step S483, the reservation correction manager 162 judges whether or not recording start time in recording time when recording is performed from broadcast start time in changed broadcast time to broadcast end time therein is the time within recording time of another program to be reserved for recording by another reservation information.

At the step S483, when it is judged that the front part of changed broadcast time overlaps recording time of another program, the process progresses to a step S484, and the reservation correction manager 162 corrects recording start time of the reservation information to recording end time of the preceding program (the program whose recording time overlaps and broadcast starts earlier than broadcast start time of the program to be recorded by the corrected reservation information), and sets recording end time of the reservation information to broadcast end time.

Figure 50:
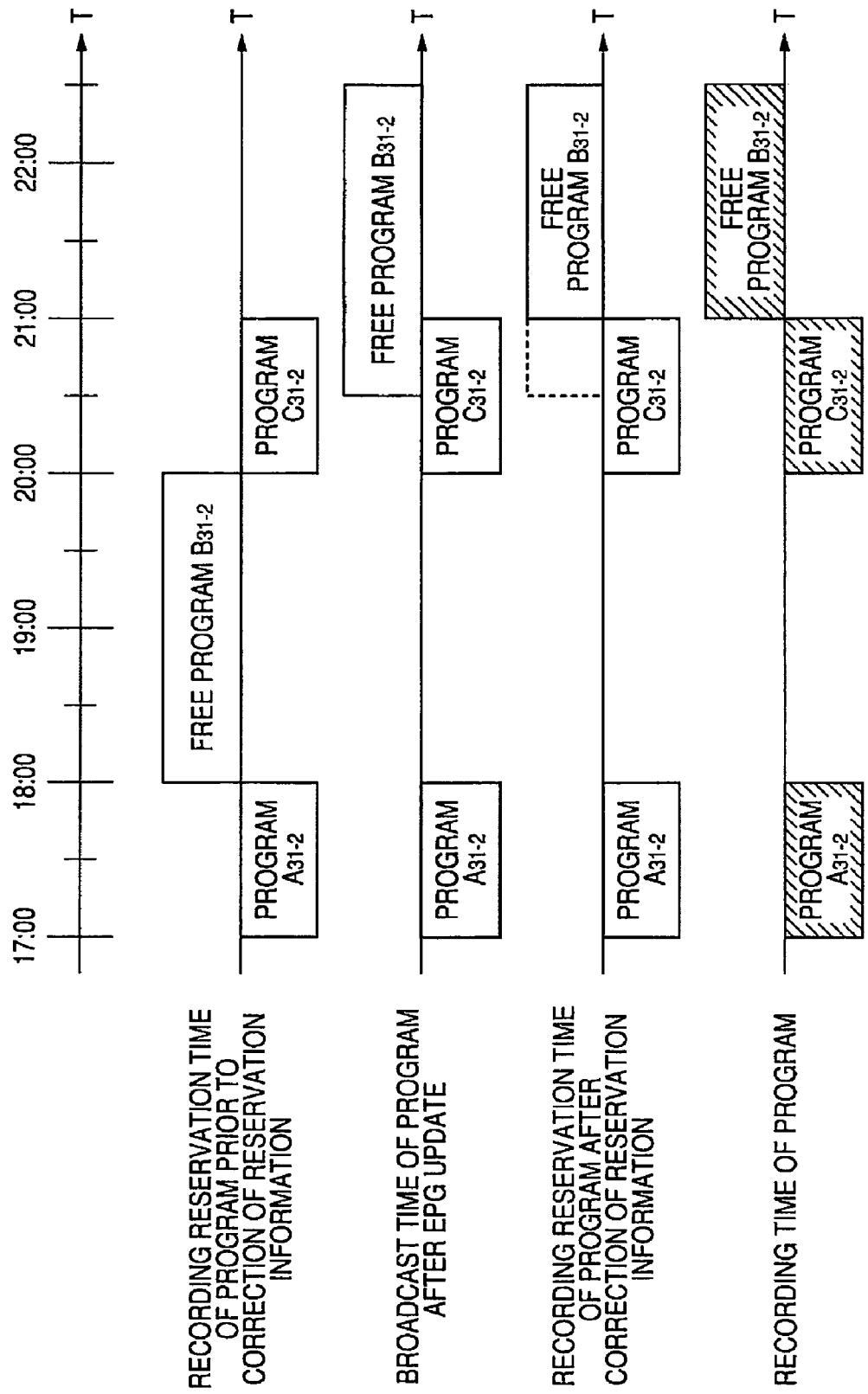
FIG. 50 is a diagram illustrating correction of reservation information on a free program, which is not in recording.

That is, for example, as shown in FIG. 50, it is assumed that, before new EPG data is received, the reservation information of the program $A_{31-2}$ whose recording start time is 17:00 and recording end time is 18:00 is recorded in the reservation information list 163, the reservation information of the free program $B_{31-2}$ whose recording start time is 18:00 and recording end time is 20:00 is recorded in the reservation information list 163, and the reservation information of the program $C_{31-2}$ whose recording start time is 20:00 and recording end time is 21:00 is recorded in the reservation information list 163.

At this time, it is assumed that, for example, the EIT (schedule) as EPG data is received. In the received EIT (schedule), when broadcast start time of the free program $B_{31-2}$ is 20:30 and broadcast end time thereof is 22:30, that is, when broadcast time of the free program $B_{31-2}$ after the EPG update is changed from 20:30 to 22:30, in the processing of the step S484, the reservation correction manager 162 corrects recording start time in the reservation information of the free program $B_{31-2}$ from 18:00 to 21:00, which is recording end time of the program $C_{31-2}$, and corrects recording end time therein from 20:00 to 22:30, which is broadcast end time of the free program $B_{31-2}$. That is, recording start time in the reservation information of the free program $B_{31-2}$ is set to 21:00 and recording end time therein is set to 22:30.

Accordingly, after the correction of the reservation information, recording start time in the reservation information of the free program $B_{31-2}$ is 21:00, and recording end time therein is 22:30.

Therefore, the recording manager 136 controls recording such that the program $A_{31-2}$ is recorded from 17:00 to 18:00. The recording manager 136 controls recording such that the program $C_{31-2}$ is recorded from 20:00 to 21:00. The recording manager 136 controls recording such that the free program $B_{31\text{-}2}$ is recorded from 21:00 to 22:30.

Figure 51:
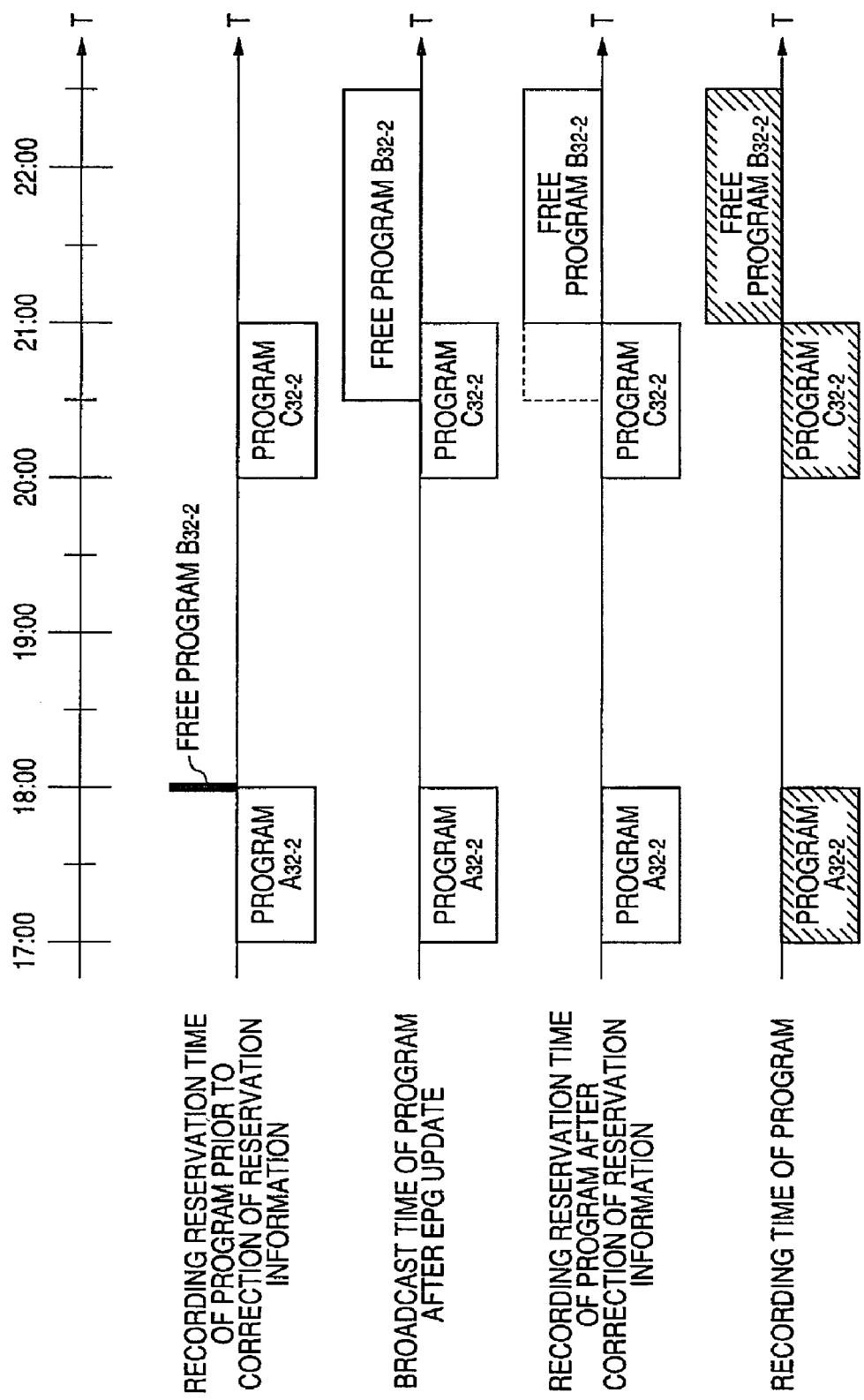
FIG. 51 is a diagram illustrating correction of reservation information on a free program, which is not in recording.

Further, for example, as shown in FIG. 51, it is assumed that, before new EPG data is received, the reservation information of the program $A_{32\text{-}2}$ whose recording start time is 17:00 and recording end time is 18:00 is recorded in the reservation information list 163, the reservation information of the free program $B_{32\text{-}2}$ whose recording start time is 18:00 and recording end time is 18:00 is recorded in the reservation information list 163, and the reservation information of the program $C_{32\text{-}2}$ whose recording start time is 20:00 and recording end time is 21:00 is recorded in the reservation information list 163.

At this time, it is assumed that, for example, the EIT (schedule) as EPG data is received. In the received EIT (schedule), when broadcast start time of the free program $B_{32\text{-}2}$ is 20:30 and broadcast end time thereof is 22:30, that is, when broadcast time of the free program $B_{32\text{-}2}$ after the EPG update is changed from 20:30 to 22:30, the reservation correction manager 162 corrects recording start time in the reservation information of the free program $B_{32\text{-}2}$ from 18:00 to 21:00, which is recording end time of the program $C_{32\text{-}2}$, and corrects recording end time therein from 18:00 to 22:30, which is broadcast end time of the free program $B_{32\text{-}2}$. That is, recording start time in the reservation information of the free program $B_{32\text{-}2}$ is set to 21:00 and recording end time therein is set to 22:30.

Accordingly, after the correction of the reservation information, recording start time in the reservation information of the free program $B_{32\text{-}2}$ is 21:00, and recording end time therein is 22:30.

Therefore, the recording manager 136 controls recording such that the program $A_{32\text{-}2}$ is recorded from 17:00 to 18:00. The recording manager 136 controls recording such that the program $C_{32\text{-}2}$ is recorded from 20:00 to 21:00. The recording manager 136 controls recording such that the free program $B_{32\text{-}2}$ is recorded from 21:00 to 22:30.

As such, when broadcast start time in changed broadcast time of the free program before recording is the time within recording time of another program to be reserved for recording, the reservation information is corrected such that recording end time of another program to be reserved for recording is set as recording start time of the free program.

After the step S484, the process returns to the step S309 of FIG. 9, and then the above-described processing is executed.

At the step S483, when it is judged that the front part of changed broadcast time does not overlap recording time of another program, the process progresses to a step S485, and the reservation correction manager 162 judges whether or not the front and rear parts of changed broadcast time overlap recording time of other two programs, respectively. That is, it is judged whether or not broadcast start time and broadcast end time of changed broadcast time are the time within recording time of other two programs, respectively.

More specifically, at the step S483, the reservation correction manager 162 judges whether or not recording start time in recording time when recording is performed from broadcast start time in changed broadcast time to broadcast end time therein is the time within recording time of the program to be reserved for recording by another reservation information, and recording end time therein is the time within recording time of the program to be reserved for recording by still another reservation information.

At the step S485, when it is judged that the front and rear parts of changed broadcast time overlaps recording time of other two programs, respectively, the process progresses to a step S486, and the reservation correction manager 162 corrects recording start time of the reservation information to recording end time of the preceding program, and corrects recording end time of the reservation information to recording start time of the next program to be reserved.

Figure 52:
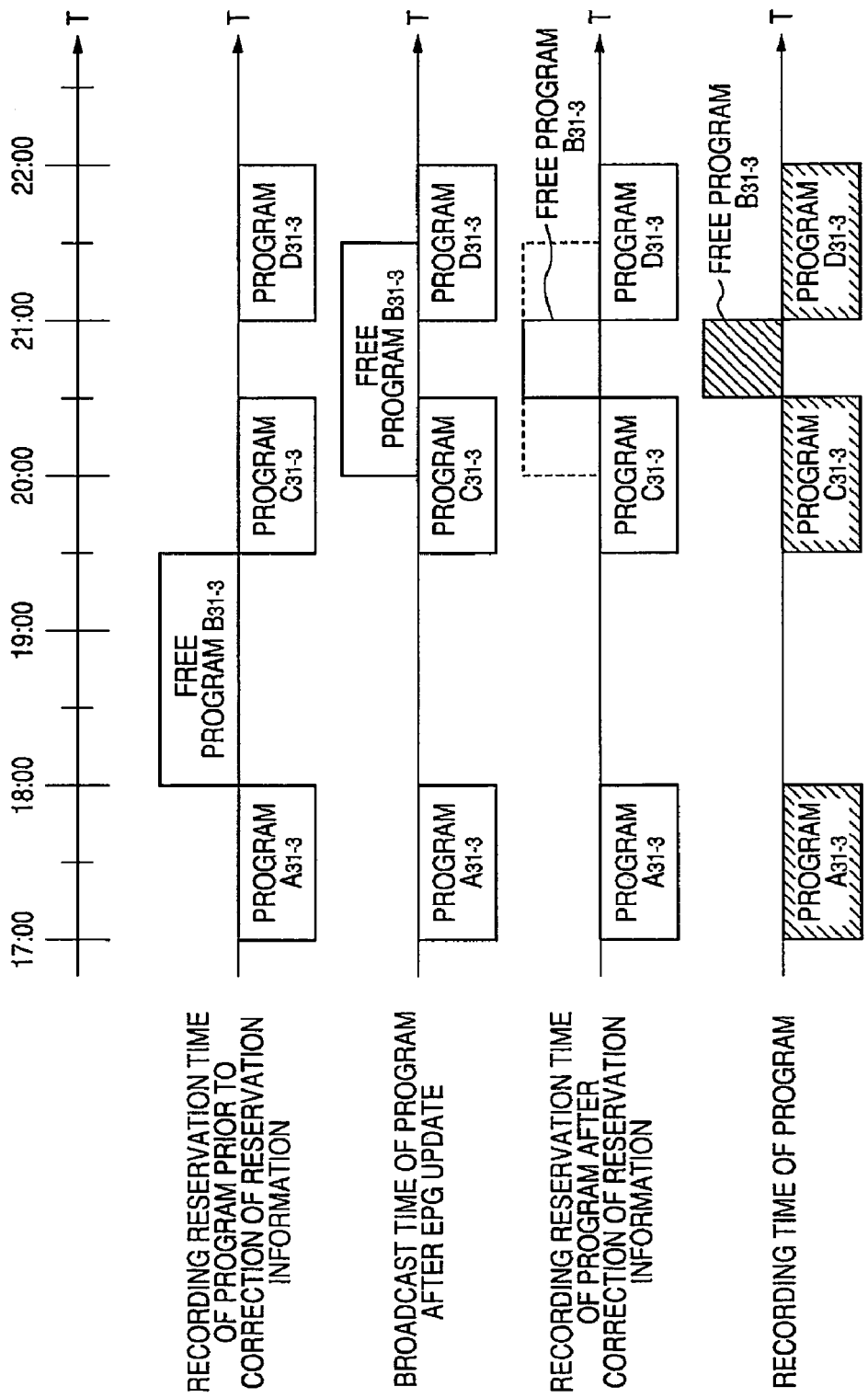
FIG. 52 is a diagram illustrating correction of reservation information on a free program, which is not in recording.

For example, as shown in FIG. 52, it is assumed that, before new EPG data is received, the reservation information of the program $A_{31\text{-}3}$ whose recording start time is 17:00 and recording end time is 18:00 is recorded in the reservation information list 163, the reservation information of the free program $B_{31\text{-}3}$ whose recording start time is 18:00 and recording end time is 19:30 is recorded in the reservation information list 163, the reservation information of the program $C_{31\text{-}3}$ whose recording start time is 19:30 and recording end time is 20:30 is recorded in the reservation information list 163, and the reservation information of the program $D_{31\text{-}3}$ whose recording start time is 21:00 and recording end time is 22:00 is recorded in the reservation information list 163.

At this time, it is assumed that, for example, the EIT (schedule) as EPG data is received. In the received EIT (schedule), when broadcast start time of the free program $B_{31\text{-}3}$ is 20:00 and broadcast end time thereof is 21:30, that is, when broadcast time of the free program $B_{31\text{-}3}$ after the EPG update is changed from 20:00 to 21:30, in the processing of the step S486, the reservation correction manager 162 corrects recording start time in the reservation information of the free program $B_{31\text{-}3}$ from 18:00 to 20:30, which is recording end time of the program $C_{31\text{-}3}$, and corrects recording end time therein from 19:30 to 21:00, which is recording start time of the program $D_{31\text{-}3}$. That is, recording start time in the reservation information of the free program $B_{31\text{-}3}$ is set to 20:30 and recording end time therein is set to 21:00.

Accordingly, after the correction of the reservation information, recording start time in the reservation information of the free program $B_{31\text{-}3}$ is 20:30, and recording end time therein is 21:00.

Therefore, the recording manager 136 controls recording such that the program $A_{31\text{-}3}$ is recorded from 17:00 to 18:00. The recording manager 136 controls recording such that the program $C_{31\text{-}3}$ is recorded from 19:30 to 20:30. The recording manager 136 controls recording such that the free program $B_{31\text{-}3}$ is recorded from 20:30 to 21:00. The recording manager 136 controls recording such that the program $D_{31\text{-}3}$ is recorded from 21:00 to 22:00.

Figure 53:
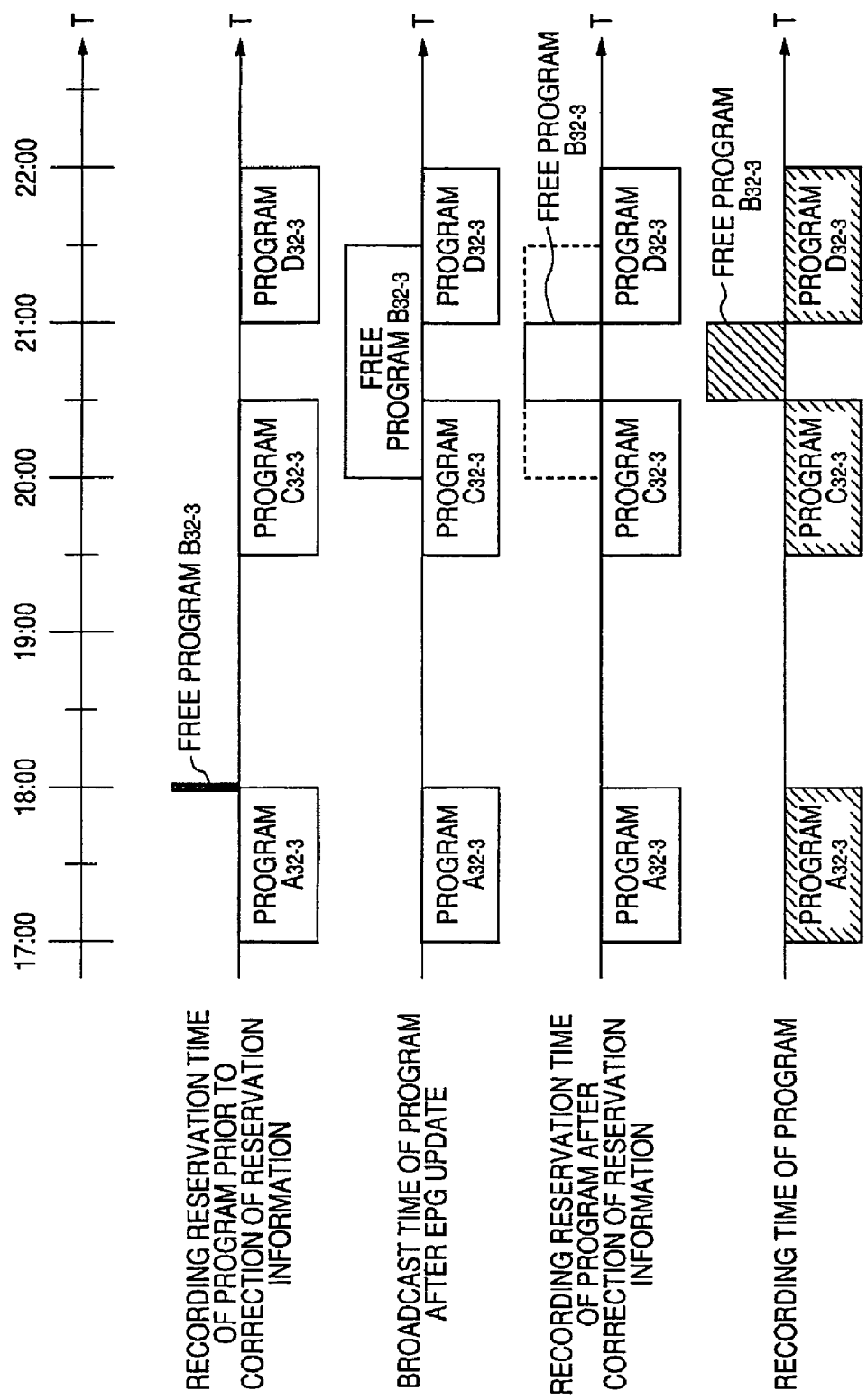
FIG. 53 is a diagram illustrating correction of reservation information on a free program, which is not in recording.

Further, for example, as shown in FIG. 53, it is assumed that, before new EPG data is received, the reservation information of the program $A_{32\text{-}3}$ whose recording start time is 17:00 and recording end time is 18:00 is recorded in the reservation information list 163, the reservation information of the free program $B_{32\text{-}3}$ whose recording start time is 18:00 and recording end time is 18:00 is recorded in the reservation information list 163, the reservation information of the program $C_{32\text{-}3}$ whose recording start time is 19:30 and recording end time is 20:30 is recorded in the reservation information list 163, and the reservation information of the program $D_{32\text{-}3}$ whose recording start time is 21:00 and recording end time is 22:00 is recorded in the reservation information list 163.

At this time, it is assumed that, for example, the EIT (schedule) as EPG data is received. In the received EIT (schedule), when broadcast start time of the free program $B_{32\text{-}3}$ is 20:00 and broadcast end time. thereof is 21:30, that is, when broadcast time of the free program $B_{32\text{-}3}$ after the EPG update is changed from 20:00 to 21:30, the reservation correction manager 162 corrects recording start time in the reservation information of the free program $B_{32\text{-}3}$ from 18:00 to 20:30, which is recording end time of the program $C_{32\text{-}3}$, and corrects recording end time therein from 18:00 to 21:00, which is recording start time of the program $D_{32\text{-}3}$. That is, recording start time in the reservation information of the free program $B_{32\text{-}3}$ is set to 20:30 and recording end time therein is set to 21:00.

Accordingly, after the correction of the reservation information, recording start time in the reservation information of the free program $B_{32\text{-}3}$ is 20:30, and recording end time therein is 21:00.

Therefore, the recording manager 136 controls recording such that the program $A_{32\text{-}3}$ is recorded from 17:00 to 18:00. The recording manager 136 controls recording such that the program $C_{32\text{-}3}$ is recorded from 19:30 to 20:30. The recording manager 136 controls recording such that the free program $B_{32\text{-}3}$ is recorded from 20:30 to 21:00. The recording manager 136 controls recording such that the program $D_{32\text{-}3}$ is recorded from 21:00 to 22:00.

As such, when broadcast start time in changed broadcast time of the free program before recording is the time within recording time of another program to be reserved for recording, the reservation information is corrected such that recording end time of another program to be reserved is set to recording start time of the free program. Further, when broadcast end time in changed broadcast time of the free program before recording is the time within recording time of another program to be reserved for recording, the reservation information is corrected such that recording start time of still another program to be reserved for recording is set to recording end time of the free program.

After the step S486, the process returns to the step S309 of FIG. 9, and then the above-described processing is executed.

At the step S485, when it is judged that the front and rear parts of changed broadcast time do not overlap recording time of other two programs, respectively, since all changed broadcast time overlaps recording time of one program, the process progresses to a step S487, and the reservation correction manager 162 sets recording start time and recording end time of the reservation information equal to each other.

Figure 54:
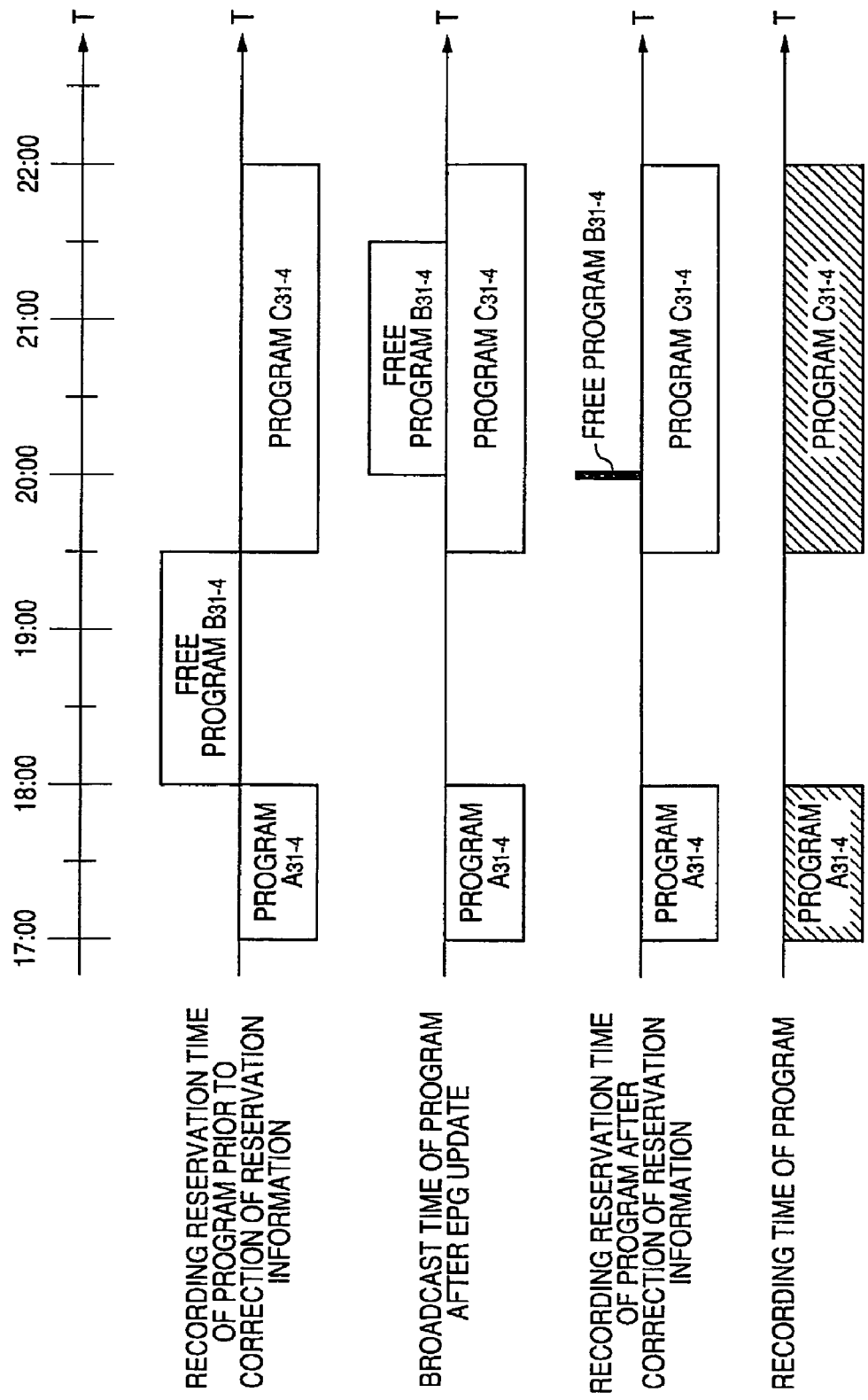
FIG. 54 is a diagram illustrating correction of reservation information on a free program, which is not in recording.

For example, as shown in FIG. 54, it is assumed that, before new EPG data is received, the reservation information of the program $A_{31\text{-}4}$ whose recording start time is 17:00 and recording end time is 18:00 is recorded in the reservation information list 163, the reservation information of the free program $B_{31\text{-}4}$ whose recording start time is 18:00 and recording end time is 19:30 is recorded in the reservation information list 163, and the reservation information of the program $C_{31\text{-}4}$ whose recording start time is 19:30 and recording end time is 22:00 is recorded in the reservation information list 163.

At this time, it is assumed that, for example, the EIT (schedule) as EPG data is received. In the received EIT (schedule), when broadcast start time of the free program $B_{31\text{-}4}$ is 20:00 and broadcast end time thereof is 21:30, that is, when broadcast time of the free program $B_{31\text{-}4}$ after the EPG update is changed from 20:00 to 21:30, the reservation correction manager 162 corrects recording start time in the reservation information of the free program $B_{31\text{-}4}$ from 18:00 to 20:00, which is broadcast start time of the free program $B_{31\text{-}4}$, and corrects recording end time therein from 19:30 to 20:00, which is corrected recording start time of the free program $B_{31\text{-}4}$. That is, recording start time in the reservation information of the free program $B_{31\text{-}4}$ is set to 20:00 and recording end time therein is set to 20:00.

Accordingly, recording start time in the reservation information of the free program $B_{31\text{-}4}$ is 20:00, and recording end time therein is 20:00.

Therefore, the recording manager 136 controls recording such that the program $A_{31\text{-}4}$ is recorded from 17:00 to 18:00. The recording manager 136 controls recording such that the program $C_{31\text{-}4}$ is recorded from 19:30 to 22:00. The recording manager 136 controls recording such that recording of the free program $B_{31\text{-}4}$ is suppressed. That is, the free program $B_{31\text{-}4}$ is not recorded.

Figure 55:
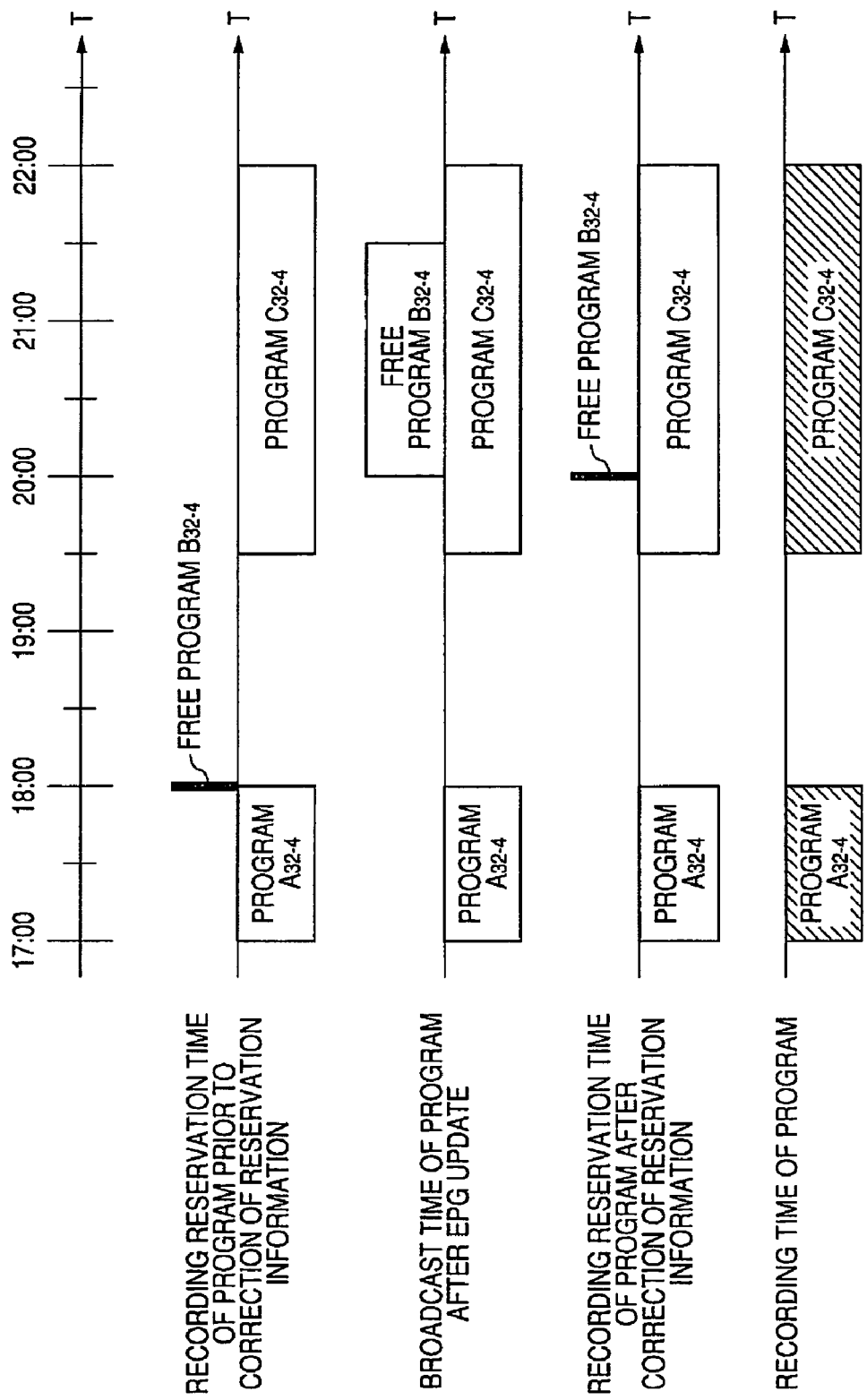
FIG. 55 is a diagram illustrating correction of reservation information on a free program, which is not in recording.

Further, for example, as shown in FIG. 55, it is assumed that, before new EPG data is received, the reservation information of the program $A_{32\text{-}4}$ whose recording start time is 17:00 and recording end time is 18:00 is recorded in the reservation information list 163, the reservation information of the free program $B_{32\text{-}4}$ whose recording start time is 18:00 and recording end time is 18:00 is recorded in the reservation information list 163, and the reservation information of the program $C_{32\text{-}4}$ whose recording start time is 19:30 and recording end time is 22:00 is recorded in the reservation information list 163.

At this time, it is assumed that, for example, the EIT (schedule) as EPG data is received. In the received EIT (schedule), when broadcast start time of the free program $B_{32\text{-}4}$ is 20:00 and broadcast end time thereof is 21:30, that is, when broadcast time of the free program $B_{32\text{-}4}$ after the EPG update is changed from 20:00 to 21:30, the reservation correction manager 162 corrects recording start time in the reservation information of the free program $B_{32\text{-}4}$ from 18:00 to 20:00, which is broadcast start time of the free program $B_{32\text{-}4}$, and corrects recording end time therein from 18:00 to 20:00, which is corrected recording start time of the free program $B_{32\text{-}4}$. That is, recording start time in the reservation information of the free program $B_{32\text{-}4}$ is set to 20:00 and recording end time therein is set to 20:00.

Accordingly, after the correction of the reservation information, recording start time in the reservation information of the free program $B_{32\text{-}4}$ is 20:00, and recording end time therein is 20:00.

Therefore, the recording manager 136 controls recording such that the program $A_{32\text{-}4}$ is recorded from 17:00 to 18:00. The recording manager 136 controls recording such that the program $C_{32\text{-}4}$ is recorded from 19:30 to 22:00. The recording manager 136 controls recording such that recording of the free program $B_{32\text{-}4}$ is suppressed. That is, the free program $B_{32\text{-}4}$ is not recorded.

As such, when all changed broadcast time of the free program before recording is the time within recording time of another program to be reserved for recording, the reservation information is corrected such that recording of the free program is suppressed.

After the step S487, the process returns to the step S309 of FIG. 9, and then the above-described processing is executed.

The above-described operations are collectively described as follows. FIG. 56 is a diagram illustrating the operations when broadcast time of the program does not overlap recording time of another program, and when broadcast time of the program extends, broadcast time is accelerated, recording start time and recording end time in the reservation information are equal to each other, and the information corresponding to the reservation information recorded in the reservation information list 163 is not included in transmitted EPG data.

When broadcast time of the program extends and before the program is recorded, and when recording end time is corrected and the program is in recording, recording end time is corrected. When broadcast time is accelerated and before the program is recorded, and when recording start time and recording end time are corrected and the program is in recording, recording end time is corrected. When recording start time and recording end time in the reservation information are equal to each other and before the program is recorded, recording start time and recording end time are corrected.

Moreover, when recording start time and recording end time in the reservation information are equal to each other, since recording of the program is not executed, there is no need to consider when the program is in recording.

In the case in which the information corresponding to the reservation information recorded in the reservation information list 163 is not included in transmitted EPG data, the reservation information is not corrected before the program is recorded or when the program is in recording.

FIG. 57 is a diagram illustrating the operations when the rear part of broadcast time of the free program overlaps recording time of another program, when the front part of broadcast time of the free program overlaps recording time of another program, when the front and rear parts of broadcast time of the free program overlap recording time of another program, and when all broadcast time of the free program overlap recording time of another program.

In the case in which the rear part of broadcast time of the free program overlaps recording time of another program, that is, broadcast end time of broadcast time of the free program is within recording time of another program, before the free program is recorded, recording end time is corrected, and, when the free program is in recording, recording end time is corrected. In the case in which the front part of broadcast time of the free program overlaps recording time of another program, that is, broadcast start time of broadcast time of the free program is within recording time of another program, before the free program is recorded, recording start time is corrected, and when the free program is in recording, recording stops.

In the case in which the front and rear parts of broadcast time of the free program overlap recording time of another program, that is, broadcast start time and broadcast end time of broadcast time of the free program are within recording time of other two programs, respectively, before the free program is recorded, recording start time and recording end time are corrected, and, when the free program is in recording, recording stops.

In the case in which all broadcast time of the free program overlaps recording time of another program, before the free program is recorded, recording start time and recording end time are corrected equal to each other, and, when the free program is in recording, recording stops.

FIG. 58 is a diagram illustrating the operations when the rear part of broadcast time of the charged program overlaps recording time of another program, when the front part of broadcast time of the charged program overlaps recording time of another program, when the front and rear parts of broadcast time of the charged program overlap recording time of another program, and when all broadcast time of the charged program overlap recording time of another program.

In the case in which the rear part of broadcast time of the charged program overlaps recording time of another program, that is, broadcast end time of broadcast time of the charged program is within recording time of another program, before the charged program is recorded, recording start time and recording end time are corrected equal to each other, and, when the charged program is in recording, recording is continued. In the case in which the front part of broadcast time of the charged program overlaps recording time of another program, that is, broadcast start time of broadcast time of the charged program is within recording time of another program, before the charged program is recorded, recording start time and recording end time are corrected equal to each other, and, when the charged program is in recording, recording is continued.

In the case in which the front part and the rear part of broadcast time of the charged program overlaps recording time of another program, that is, broadcast start time and broadcast end time of broadcast time of the charged program are respectively within recording times of another two programs, before the charged program is recorded, recording start time and recording end time are corrected equal to each other, and, when the charged program is in recording, recording is continued. In the case in which the whole part of broadcast time of the charged program overlaps recording time of another program, before the charged program is recorded, recording start time and recording end time are corrected equal to each other, and, when the charged program is in recording, recording is continued.

FIG. 59 is a diagram illustrating the operations when the rear part of broadcast time of the automatic recording reservation program overlaps recording time of another program, when the front part of broadcast time of the automatic recording reservation program overlaps recording time of another program, when the front and rear parts of broadcast time of the automatic recording reservation program overlap recording time of another program, and when all broadcast time of the automatic recording reservation program overlap recording time of another program.

In the case in which the rear part of broadcast time of the automatic recording reservation program overlaps recording time of another program, that is, broadcast end time of broadcast time of the automatic recording reservation program is within recording time of another program, before the automatic recording reservation program is recorded, the reservation information of the automatic recording reservation program is deleted, and, when the automatic recording reservation program is in recording, recording stops. In the case in which the front part of broadcast time of the automatic recording reservation program overlaps recording time of another program, that is, broadcast start time of broadcast time of the automatic recording reservation program is within recording time of another program, before the automatic recording reservation program is recorded, the reservation information of the automatic recording reservation program is deleted, and, when the automatic recording reservation program is in recording, recording stops.

In the case in which the front and rear parts of broadcast time of the automatic recording reservation program overlap recording time of another program, that is, broadcast start time and broadcast end time of broadcast time of the automatic recording reservation program are within recording time of other two programs, respectively, before the automatic recording reservation program is recorded, the reservation information of the automatic recording reservation program is deleted, and, when the automatic recording reservation program is in recording, recording stops. In the case in which all broadcast time of the automatic recording reservation program overlap recording time of another program, before the automatic recording reservation program is recorded, the reservation information of the automatic recording reservation program is deleted, and, when the automatic recording reservation program is in recording, recording stops.

Figure 60:
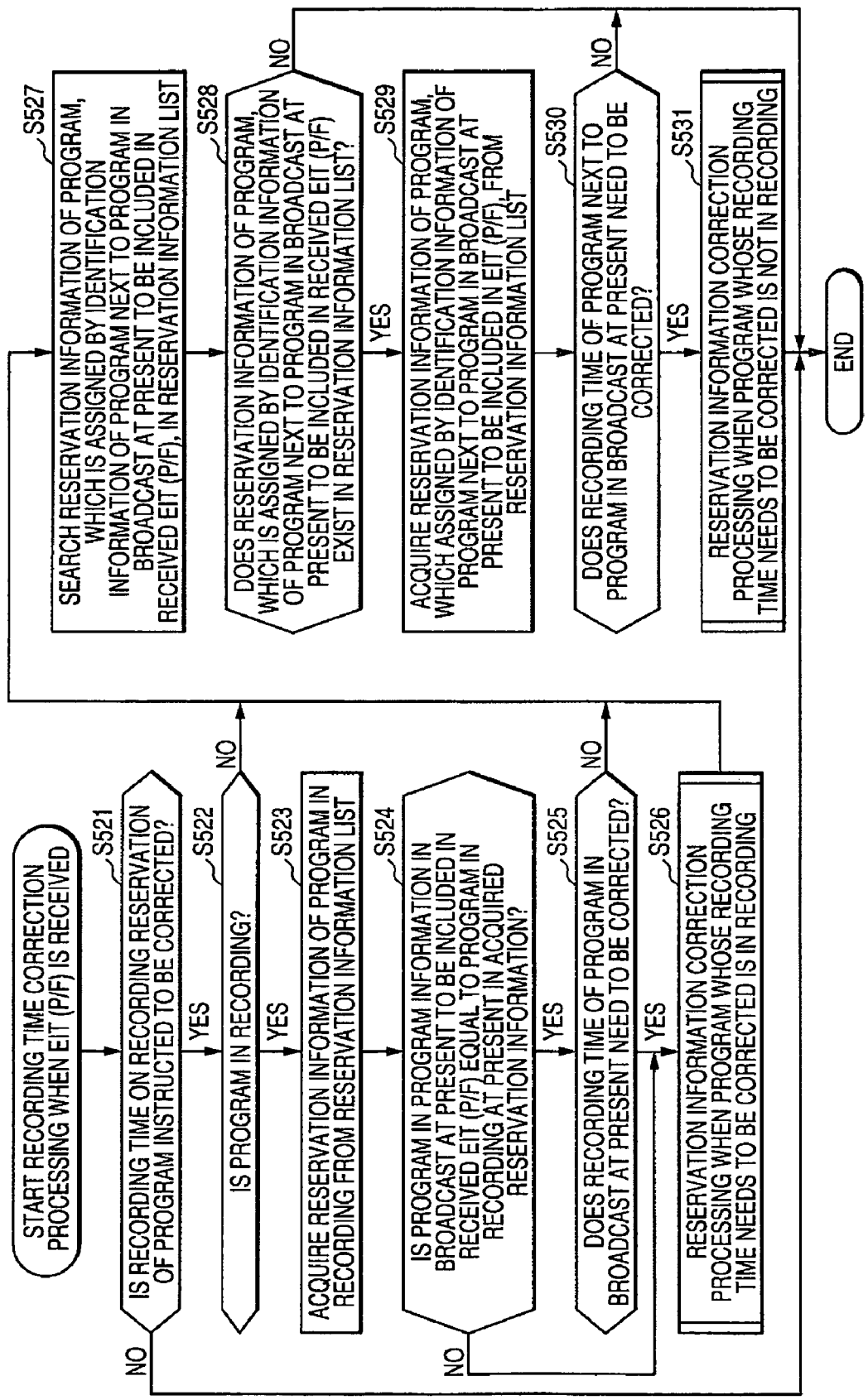
FIG. 60 is a flowchart illustrating a recording time correction processing when an EIT (p/f) is received.

With reference to the flowchart of FIG. 60, the recording time correction processing when the HDD video recorder 1 receives the EIT (p/f) will be described. This processing starts when the HDD video recorder 1 receives the EIT (p/f).

At a step S521, the reservation correction manager 162 judges whether or not the correction of recording time for program recording reservation is instructed. For example, when the correction flag is set to "1" by the user, the correction of recording time is instructed, and, when the correction flag is set to "0", the correction of recording time is not instructed.

At the step S521, when it is judged that the correction of recording time for program recording reservation is instructed, the process progresses to a step S522, and then the reservation correction manager 162 judges whether or not the program is in recording at present. That is, for example, the reservation correction manager 162 acquires all reservation information from the reservation information list 163, and judges whether the reservation information, in which current time is within recording time from recording start time in the reservation information to recording end time therein, exist or not.

At the step S522, when it is judged that the program is in recording at present, the process progresses to a step S523, and then the reservation correction manager 162 acquires (detects) the reservation information of the program in recording at present from the acquired reservation information of the reservation information list 163.

At a step S524, the reservation correction manager 162 judges whether or not the program (in the program information) in broadcast at present included in the received EIT (p/f) and the program in recording at present in the reservation information acquired (detected) through the processing of the step S523 are equal to each other.

That is, for example, when the event ID is included in the reservation information, it is judged whether or not the event ID of the program in recording at present in the reservation information and the event ID in the program information of the program in broadcast at present included in the EIT (p/f) are equal to each other.

Further, for example, at the step S524, when the program name is included in the reservation information, it is judged whether or not the program name of the program in recording at present in the reservation information and the program name in the program information of the program in broadcast at present included in the EIT (p/f) are equal to each other.

At the step S524, when it is judged that the program (in the program information) in broadcast at present included in the received EIT (p/f) and the program in recording at present in the acquired reservation information are equal to each other, the process progresses to a step S525, and then the reservation correction manager 162 judges whether or not recording time of the program in broadcast at present needs to be corrected. That is, for example, at the step S525, it is judged whether or not recording start time in the reservation information and broadcast start time of the program in broadcast at present in the EIT, and recording end time in the reservation information and broadcast end time of the program in broadcast at present in the EIT are equal to each other.

At the step S525, when it is judged that recording time of the program in broadcast at present needs to be corrected, the process progresses to a step S526, and, when the program whose recording time needs to be corrected is in recording, the reservation information correction processing is executed. This processing is the same as the processing of the step S322 of FIG. 13, that is, the processing described above with reference to FIG. 14, and thus the description thereof will be omitted.

Figure 13:
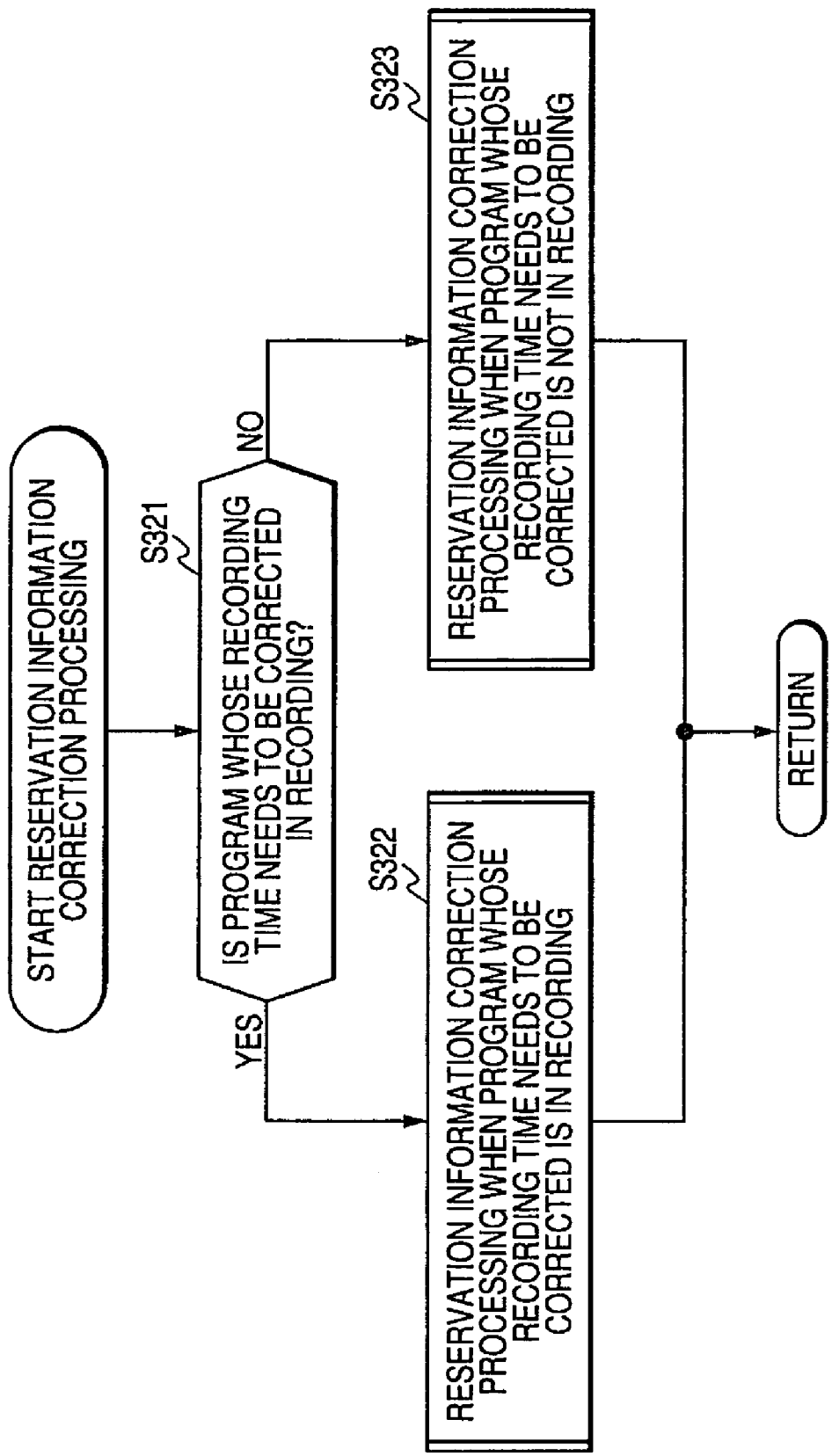
FIG. 13 is a flowchart illustrating a reservation information correction processing.

Moreover, at the step S322 of FIG. 13, it has been described such that the processing is executed on the basis of broadcast start time and broadcast end time of the program included in the EIT (schedule), but, at the step S526, the processing is executed on the basis of broadcast start time and broadcast end time of the program in broadcast at present included in the EIT (p/f). Further, at this time, the recording manager 136 are supplied from the reservation correction manager 162 with all reservation information including the reservation information acquired (detected) from the reservation information of the reservation information list 163 through the processing of the step S523 and the program information of the program in broadcast at present of the EIT (p/f), and executes the processing of the step S526 of FIG. 60 on the basis of the supplied reservation information and EIT (p/f).

After the step S526, the process progresses to a step S527.

At the step S527, the reservation correction manager 162 searches for the reservation information of the program assigned by the identification information of the program to be broadcasted next to the program in broadcast at present included in the received EIT (p/f) in the reservation information of the reservation information list 163.

Here, for example, when the program name is recorded in the reservation information, the identification information of the program to be broadcasted next to the program in broadcast at present represents the program name of the program to be broadcasted next to the program in broadcast at present included in the EIT (p/f). Further, for example, when the event ID is included in the reservation information, the identification information of the program to be broadcasted next to the program in broadcast at present represents the event ID of the program to be broadcasted next to the program in broadcast at present included in the EIT (p/f).

At a step S528, the reservation correction manager 162 judges whether or not the reservation information of the program assigned by the identification information of the program to be broadcasted next to the program in broadcast at present included in the received EIT (p/f) is the reservation information of the reservation information list 163.

At the step S528, when the reservation information of the program assigned by the program in broadcast at present included in the received EIT (p/f) is the reservation information of the reservation information list 163, the process progresses to a step S529, and then the reservation correction manager 162 acquires (detects) the reservation information of the program assigned by the identification information of the program to be broadcasted next to the program in broadcast at present included in the received EIT (p/f) from the reservation information of the reservation information list 163.

At a step S530, the reservation correction manager 162 judges whether or not recording time of the program to be broadcasted next to the program in broadcast at present needs to be corrected. That is, for example, at the step S530, it is judged whether or not recording start time in the reservation information and broadcast start time of the program to be broadcasted next to the program in broadcast at present in the EIT, and recording end time in the reservation information and broadcast end time of the program to be broadcasted next to the program in broadcast at present in the EIT are equal to each other.

At the step S530, when it is judged that recording time of the program to be broadcasted next to the program in broadcast at present needs to be corrected, the process progresses to a step S531, and, when the program whose recording time needs to be corrected is not in recording, the reservation information correction processing is executed. This processing is the same as the processing of the step S323 of FIG. 13, that is, the processing described above with reference to FIG. 27, and the description thereof will be omitted.

Moreover, at the step S323 of FIG. 13, it has been described that the processing is executed on the basis of broadcast start time and broadcast end time of the program included in the EIT (schedule), but, at the step S531, the reservation correction manager 162 executes the processing on the basis of all reservation information including the reservation information acquired (detected) through the processing of the step S529 and broadcast start time and broadcast end time of the program to be broadcasted next to the program in broadcast at present included in the EIT (p/f).

After the step S531, the processing ends.

At the step S530, when it is judged that recording time of the program to be broadcasted next to the program in broadcast at present does not need to be corrected, the processing ends.

At the step S528, when the reservation information of the program assigned by the identification information of the program to be broadcasted next to the program in broadcast at present included in the received EIT (p/f) does not exist in the reservation information of the reservation information list 163, the processing ends.

At the step S525, when it is judged that recording time of the program in broadcast at present does not need to be corrected, the process progresses to the step S527, and then the above-described processing is executed.

At the step S524, when it is judged that the program (in the program information) in broadcast at present included in the received EIT (p/f) and the program in recording at present in the acquired (detected) reservation information are not equal to each other, the process progresses to the step S526. Further, at this time, when the processing of the step S526 is executed, the processing start from the step S342 of FIG. 14.

Figure 14:
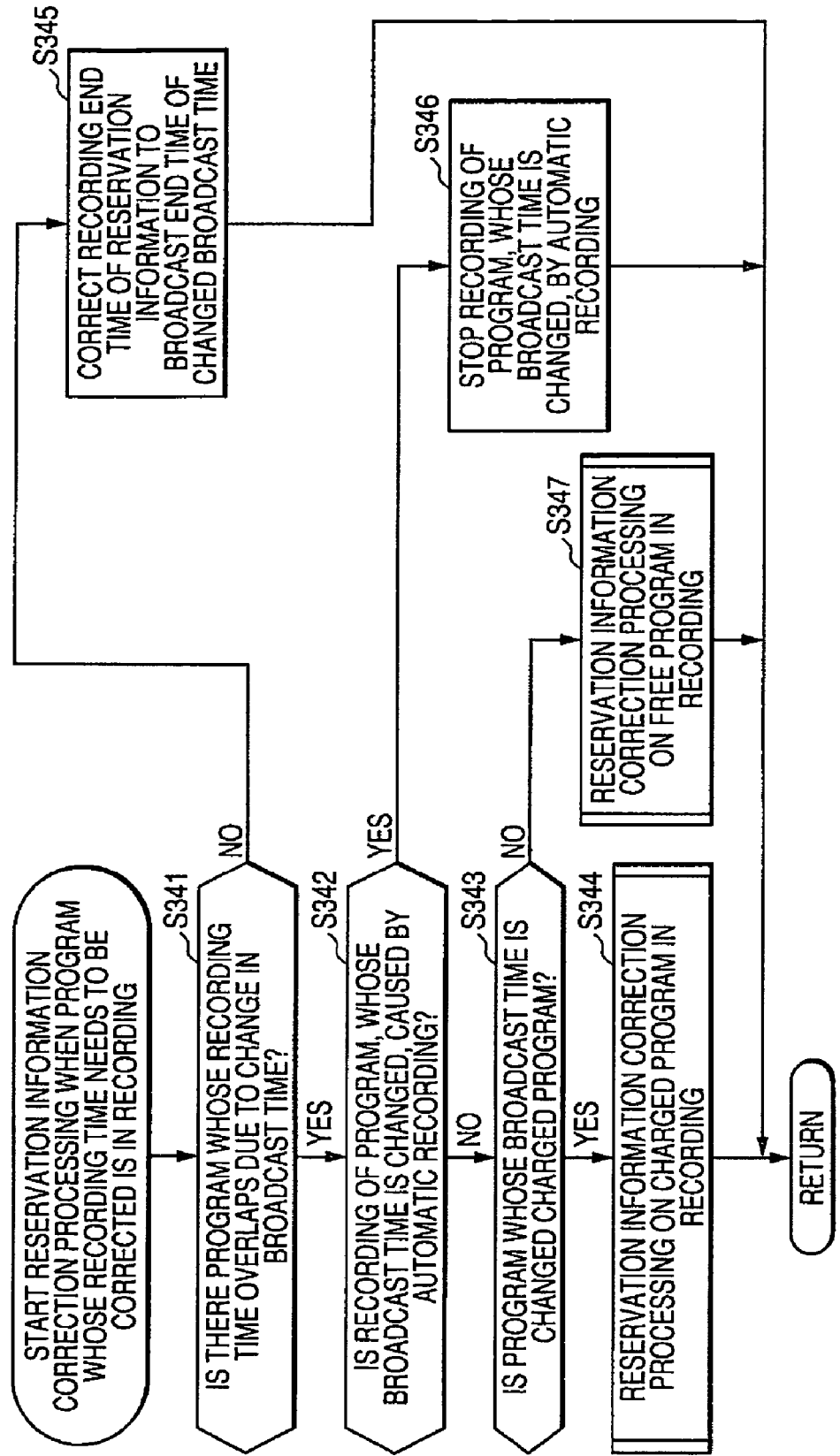
FIG. 14 is a flowchart illustrating a reservation information correction processing when a program whose recording time needs to be corrected is in recording.

Here, the reason why the processing starts from the step S342 of FIG. 14 is that, since the program in broadcast at present in the program information included in the received EIT (p/f) and the program in recording at present in the acquired reservation information are not equal to each other, that is, the program in recording at present is not the program, which is desired to be recorded by the user, in the processing of the step S347 of FIG. 14 (the step S393 of FIG. 22), recording of the program in recording stops.

At the step S522, when it is judged that the program is not in recording, the process progresses to the step S527, and then the above-described processing is executed.

At the step S521, when it is judged that the correction of recording time for program recording reservation is not instructed, the user does not desires recording time to be automatically corrected, and thus the processing ends.

As described above, since the reservation information of the reservation information list 163 recorded in the HDD video recorder 1 is corrected on the basis of EPG data (EIT) to be regularly transmitted, the user can suitably correct recording time (recording start time and recording end time) to proper time without individually confirming the composition of program broadcast time. That is, the user's load can be reduced, and the program to be reserved for recording can be recorded more reliably and more suitably.

Further, as described above, since the reservation information in the reservation information list 163 is sequentially corrected from late recording start time of the reservation information, the reservation information can be more rapidly corrected.

In addition, when program recording reservation is cancelled due to overlap broadcast time of the program, recording start time and recording end time of the program are set equal to each other. Therefore, the reservation information of the reservation information list 163 recorded in the HDD video recorder 1 is corrected again on the basis of transmitted EPG data (EIT). Further, when the program whose recording reservation was cancelled is restored, that is, when overlap broadcast time of the program does not exist, one or both of recording start time and recording end time in the reservation information, which are set equal to each other, are just corrected, such that cancelled program reservation can be restored.

Accordingly, for example, a device (function) for performing a processing of holding (managing) the history of the cancellation of program recording reservation and, after the change of broadcast time again, of restoring cancelled program recording reservation does not need to be provided. Therefore, the user's load can be reduced, and program recording reservation, which was cancelled once, can be restored by a simple processing.

With reference to a flowchart of FIG. 61, a recording processing by the CPU 21, which executes the reserved recording program 121, will be described. At a step S601, the recording manager 136 acquires one of the reservation information of the reservation information list 163.

At a step S602, the recording manager 136 judges whether or not current time is the time at which recording of the program to be reserved starts. That is, at the step S602, on the basis of recording start time of the reservation information acquired at the step S601, it is judged whether or not current time to be outputted from the real time clock 25 is the time at which recording of the program starts.

At the step S602, when it is judged that it is the time to start recording of the program to be reserved, the process progresses to a step S603, and then the recording manager 136 judges whether or not recording start time and recording end time in the reservation information acquired through the processing of the step S601 are equal to each other.

At the step S603, when it is judged that recording start time and recording end time are not equal to each other, the process progresses to a step S604, and then the recording manager 136 performs the control such that recording of the program to be reserved starts.

At a step S605, the recording manager 136 judges whether or not it is the time to end recording of the program to be reserved. That is, the recording manager 136 judges whether or not it is the time to end recording of the program, on the basis of recording end time of the reservation information acquired through the step S601.

At the step S605, when it is judged that it is time to end recording of the program to be reserved, the process progresses to a step S606, and then the recording manager 136 performs the control such that recording of the program to be reserved ends.

After the step S606, the process returns to the step S601, and then the above-described processing is executed.

At the step S603, when it is judged that recording start time and recording end time are equal to each other, the process progresses to a step S607, and then, since recording start time and recording end time in the reservation information are equal to each other and recording time is zero minute, the recording manager 136 notices the user that the program is suppressed, that is, the program is not recorded. At the step S607, the recording manager 136 performs the control trough the communication unit 43 such that a message of the content "PROGRAM A IS NOT RECORDED BECAUSE BROADCAST TIME IS CHANGED" or the like is transmitted to a mail address of a cellular phone of the user registered in advance, for example.

As such, when recording start time and recording end time in the reservation information are equal to each other, the recording manager 136 performs the control such that recording of the program is suppressed. That is, the program whose recording start time and recording end time in the reservation information are equal to each other is not recorded.

At the step S608, the recording manager 136 judges whether or not the program is in recording at present. At the step S608, when it is judged that the program is not in recording, the process returns to the step S601, and then the above-described processing is executed.

At the step S605, when it is judged that it is not the time to end recording of the program to be reserved, the process progresses to a step S609, and then one of the reservation information of the reservation information list 163 is acquired. At this time, the reservation information acquired through the processing of the step S609 is the reservation information separate from the reservation information acquired through the processing of the step S601.

At a step S610, the recording manager 136 judges whether or not recording start time and recording end time of the reservation information acquired through the processing of the step S609, and current time to be outputted from the real time clock 25 are equal to one another.

At the step S610, when it is judged that recording start time and recording end time of the reservation information acquired through the processing of the step S609, and current time to be outputted from the real time clock 25 are equal to one another, the process returns to the step S605, and then the above-described processing is executed. That is, until it is the time to end recording of the program to be reserved, the processing of the step S605, the step S609, and the step S610 is repeatedly executed.

At the step S610, when it is judged that recording start time and recording end time of the reservation information acquired through the processing of the step S609, and current time to be outputted from the real time clock 25 are equal to one another, the process returns to the step S607, and then the above-described processing is executed.

At the step S608, when it is judged that the program is in recording, the process returns to the step S605, and then the above-described processing is executed.

At the step S602, when it is judged that it is not the time to start recording of the program to be reserved, the process returns to the step S601, and then the above-described processing is executed. That is, the reservation information, which is separate from the reservation information acquired through the processing of the previous step S601, is acquired.

Moreover, the reservation information of the program, whose recording ends, may be deleted.

As such, when recording start time and recording end time in the reservation information are equal to each other, recording time becomes zero minute, and thus recording of the program is not executed. Further, when recording start time and recording end time are equal to each other due to the change in broadcast time of the program, and the program is not recorded, the purport is noticed to the user, and thus the user can rapidly confirm that the program to be reserved for recording is not recorded. Accordingly, the user can stop recording of the program in broadcast time at present in the HDD video recorder 1, set again such that the program whose recording time is zero minute is recorded, and record a desired program.

The embodiment of the recording control device according to an embodiment of the present invention is not limited to the HDD video recorder 1 shown in FIG. 1, and a recording control device which can perform the control recording and reading of a recording medium may be used. Specifically, for example, various embodiments, such as a personal computer, a personal digital assistant (PDA), a cellular phone, a digital electronic apparatus (for example, a DVD recorder or a video cassette tape recorder), and the like may be implemented.

As such, when it is configured such that recording of the program can be reserved, the user can record the program, without waiting in front of a device having a recording function (without paying attention to the time of broadcast time of the program) in order to start recording at the time at which a desired program to be reserved starts. When it is judged that the program is not recorded after recording is reserved, the time, which is the same as the time, indicated by recording start time information, at which recording starts, is set as recording end time information of reservation information for recording the program. When the time, indicated by the recording start time information, at which recording starts, is the same as the time, indicated by the recording end time information, at which recording ends, recording of the program is controlled such that recording of the program is suppressed. After the time, which is the same as the time, indicated by the recording start time information, at which recording starts, is set to as the recording end time information of the reservation information, when it is judged that the program is recorded, and when the time later than the time, indicated by the recording start time information, at which recording starts, is set as the recording end time information of the reservation information, cancelled recording reservation can be restored by a simpler processing.

A series of processing described above may be executed by hardware or may be executed by software. When a series of processing is executed by software, a program constituting software is installed from a recording medium on a computer, which is incorporated into a dedicated hardware, or a general personal computer which can execute various functions by installing various programs thereon.

The recording medium includes a package medium, such as a magnetic disc (including a flexible disc), an optical disc (including CD-ROM (Compact Disk Read-Only Memory), DVD (Digital Versatile Disc)), a magneto-optical disc (including MD (MiniDisc (Trademark)), or a semiconductor memory, on which the program is recorded and which is distributed to provide the program to the user, separately from the computer, like the removable medium 46 shown in FIG. 1. Further, the recording medium includes the ROM or a hard disc, on which the program to be provided to the user in a state of being incorporated into the computer is recorded.

Moreover, the program, which causes a series of processing to be executed, may be installed on the computer through a wired or wireless communication medium, such as a local area network, Internet, a digital satellite broadcast, if necessary, through an interface, such as a router, a modem, or the like.

Further, in the present specification, the step of describing the program stored in the recording medium includes the processing which is performed in time series in description order or the processing which is executed in parallel or individually, although not processed in time series.

It should be understood by those skilled in the art that various modifications, combinations, sub-combinations and alterations may occur depending on design requirements and other factors insofar as they are within the scope of the appended claims or the equivalents thereof.

What is claimed is:

1. A recording control device which records a program to be reserved for recording on the basis of reservation information including recording start time information indicating a time, at which recording starts, and recording end time information indicating a time, at which recording ends, the recording control device comprising:

a setting unit that, when it is judged that the program is not recorded after recording is reserved, sets the same time as the time, indicated by the recording start time information, at which recording starts, in the recording end time information of the reservation information for recording the program; and a recording control unit that, when the time, indicated by the recording start time information, at which recording starts, is the same as the time, indicated by the recording end time information, at which recording ends, controls recording of the program such that recording of the program is suppressed, wherein, after setting the same time as the time, indicated by the recording start time information, at which recording starts, in the recording end time information of the reservation information, when it is judged that the program is recorded, the setting unit sets a time later than the time, indicated by the recording start time information, at which recording starts, in the recording end time information of the reservation information.

2. The recording control device according to claim 1, wherein, when the time, indicated by the recording start time information, at which recording starts, is the same as the time, indicated by the recording end time information, at which recording ends, the recording control unit gives, to a user, a notice that recording of the program is controlled such that recording of the program is suppressed.

3. A recording control device comprising, a first recording control unit that controls recording of first recording start time at which recording of a first contents starts and first recording end time at which recording of the first contents ends, and second recording start time at which recording of a second contents starts and second recording end time at which recording of the second contents ends;

a reception control unit that controls reception of first distribution time information indicating first distribution start time at which distribution of the first contents starts and first distribution end time at which the distribution of the first contents ends;

a correcting unit that, when all or a part of distribution time from first distribution start time to first distribution end time overlaps recording time from second recording start time to second recording end time, corrects one or both of first recording start time and first recording end time of the first contents to predetermined time within distribution time; and a second recording control unit that controls recording of the first contents on the basis of corrected first recording start time and second recording end time, wherein, when all or a part of distribution time from first distribution start time to first distribution end time overlaps recording time from second recording start time to second recording end time, the second recording start time, at which recording starts, is set to be the same as the second recording end time of the reservation information for recording the program, whereby recording of the second contents is suppressed.

4. The recording control device according to claim 3, wherein the first recording control unit controls recording of first identification information for identifying the first contents, first contents information including information of first recording start time and information of first recording end time, second identification information for identifying the second contents, and second contents information including information of second recording start time and information of second recording end time in a predetermined list, the reception control unit controls reception of the first distribution time information indicating first distribution start time and first distribution end time of the first contents, and second distribution time information indicating second distribution start time at which distribution of the second contents starts and second distribution end time at which the distribution of the second contents ends, and when the second distribution time information is received, first recording start time of the first contents information recorded in the list is later than second recording start time of the second contents information, and all or a part of distribution time from first distribution start time to first distribution end time overlaps recording time from second recording start time to second recording end time, the correcting unit corrects one or both of first recording start time and first recording end time of the first contents to predetermined time within distribution time.

5. The recording control device according to claim 3, wherein, when recording of the first content starts, the first distribution time information is received, first distribution end time in the first distribution time information is a time within recording time of the second contents, and a recording priority of the first contents is higher than that of the second contents, the second recording control unit corrects first recording end time to first distribution end time, which is the time within recording time of the second contents.

6. The recording control device according to claim 3, wherein, when recording of the first contents does not start, the first distribution time information is received, first distribution start time in the first distribution time information is a time within recording time of the second contents, and a recording priority of the second contents is higher than that of the first contents, the correcting unit corrects first recording start time to second recording end time of the second contents.

7. The recording control device according to claim 3, wherein, when recording of the first contents does not start, the first distribution time information is received, first distribution end time in the first distribution time information is a time within recording time of the second contents, and a recording priority of the second contents is higher than that of the first contents, the correcting unit corrects first recording end time to second recording start time of the second contents.

8. A non-transitory computer-readable medium containing instructions that, when executed by a computer, perform a recording control method of a recording control device which records a program to be reserved for recording on the basis of reservation information including recording start time information indicating a time, at which recording starts, and recording end time information indicating a time, at which recording ends, the recording control method comprising the steps of:

when it is judged that the program is not recorded after recording is reserved, setting the same time as the time, indicated by the recording start time information, at which recording starts, in the recording end time information of the reservation information for recording the program; and when the time, indicated by the recording start time information, at which recording starts, is the same as the time, indicated by the recording end time information, at which recording ends, controlling recording of the program such that recording of the program is suppressed, wherein, in the setting, after setting the same time as the time, indicated by the recording start time information, at which recording starts, in the recording end time information of the reservation information, when it is judged that the program is recorded, setting a time later than the time, indicated by the recording start time information, at which recording starts, in the recording end time information of the reservation information.

9. The non-transitory computer-readable medium of claim 8, wherein the recording control method further comprises,
wherein, when the time, indicated by the recording start time information, at which recording starts, is the same as the time, indicated by the recording end time information, at which recording ends, in the controlling, a notice that recording of the program is controlled such that recording of the program is suppressed is given to a user.

10. A non-transitory computer-readable medium containing instructions that, when executed by a computer, perform a recording control method of a recording control device, comprising the steps of:
controlling recording of first recording start time at which recording of a first contents starts and first recording end time at which recording of the first contents ends, and second recording start time at which recording of a second contents starts and second recording end time at which recording of the second contents ends;
controlling reception of first distribution time information indicating first distribution start time at which distribution of the first contents starts and first distribution end time at which the distribution of the first contents ends;
when all or a part of distribution time from first distribution start time to first distribution end time overlaps recording time from second recording start time to second recording end time, correcting one or both of first recording start time and first recording end time of the first contents to predetermined time within distribution time; and
controlling recording of the first contents on the basis of corrected first recording start time and second recording end time, wherein, when all or a part of distribution time from first distribution start time to first distribution end time overlaps recording time from second recording start time to second recording end time, the second recording start time, at which recording starts, is set to be the same as the second recording end time of the reservation information for recording the program, whereby recording of the second contents is suppressed.

11. The non-transitory computer-readable medium of claim 10, wherein the recording control method further comprises,
wherein, in the controlling recording of first recording start time and first recording end time, and second recording start time and second recording end time, recording of first identification information for identifying the first contents, first contents information including information of first recording start time and information of first recording end time, second identification information for identifying the second contents, and second contents information including information of second recording start time and information of second recording end time in a predetermined list is controlled,
in the controlling the reception of the first distribution time information, reception of the first distribution time information indicating first distribution start time and first distribution end time of the first contents, and second distribution time information indicating second distribution start time at which distribution of the second contents starts and second distribution end time at which the distribution of the second contents ends is controlled, and
in the correcting, when the second distribution time information is received, first recording start time of the first contents information recorded in the list is later than second recording start time of the second contents information, and all or a part of distribution time from first distribution start time to first distribution end time overlaps recording time from second recording start time to second recording end time, one or both of first recording start time and first recording end time of the first contents are corrected to predetermined time within distribution time.

12. The non-transitory computer-readable medium of claim 10, wherein the recording control method further comprises,
wherein, in the controlling recording of the first contents, when recording of the first content starts, the first distribution time information is received, first distribution end time in the first distribution time information is a time within recording time of the second contents, and a recording priority of the first contents is higher than that of the second contents, first recording end time is corrected to first distribution end time, which is the time within recording time of the second contents.

13. The non-transitory computer-readable medium of claim 10, wherein the recording control method further comprises,
wherein, in the correcting, when recording of the first contents does not start, the first distribution time information is received, first distribution start time in the first distribution time information is a time within recording time of the second contents, and a recording priority of the second contents is higher than that of the first contents, first recording start time is corrected to second recording end time of the second contents.

14. The non-transitory computer-readable medium of claim 10, wherein the recording control method further comprises,
wherein, in the correcting, when recording of the first contents does not start, the first distribution time information is received, first distribution end time in the first distribution time information is a time within recording time of the second contents, and a recording priority of the second contents is higher than that of the first contents, first recording end time is corrected to second recording start time of the second contents.

* * * * *